(12) United States Patent
Kotov et al.

(10) Patent No.: US 12,132,169 B2
(45) Date of Patent: Oct. 29, 2024

(54) CORRUGATED STRUCTURAL ZINC BATTERIES HAVING A SOLID-STATE ELECTROLYTE

(71) Applicant: THE REGENTS OF THE UNIVERSITY OF MICHIGAN, Ann Arbor, MI (US)

(72) Inventors: Nicholas A. Kotov, Ypsilanti, MI (US); Mingqiang Wang, Harbin (CN); Ahmet Emrehan Emre, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 409 days.

(21) Appl. No.: 17/420,331

(22) PCT Filed: Jan. 6, 2020

(86) PCT No.: PCT/US2020/012382
§ 371 (c)(1),
(2) Date: Jul. 1, 2021

(87) PCT Pub. No.: WO2020/176162
PCT Pub. Date: Sep. 3, 2020

(65) Prior Publication Data
US 2022/0069349 A1 Mar. 3, 2022

Related U.S. Application Data

(60) Provisional application No. 62/788,535, filed on Jan. 4, 2019.

(51) Int. Cl.
| | |
|---|---|
| *H01M 10/0565* | (2010.01) |
| *H01M 4/50* | (2010.01) |
| *H01M 12/08* | (2006.01) |
| *H01M 50/414* | (2021.01) |
| *H01M 50/423* | (2021.01) |
| *H01M 50/497* | (2021.01) |

(52) U.S. Cl.
CPC ....... *H01M 10/0565* (2013.01); *H01M 4/502* (2013.01); *H01M 12/08* (2013.01); *H01M 50/414* (2021.01); *H01M 50/423* (2021.01); *H01M 50/497* (2021.01); *H01M 2300/0082* (2013.01)

(58) Field of Classification Search
None
See application file for complete search history.

(56) References Cited

U.S. PATENT DOCUMENTS

| | | | |
|---|---|---|---|
| 4,801,359 A | 1/1989 | Jeanne et al. | |
| 5,156,225 A | 10/1992 | Murrin | |
| 2003/0049537 A1 | 3/2003 | Wadley et al. | |
| 2003/0162095 A1* | 8/2003 | Huang | H01M 4/38 |
| | | | 429/246 |
| 2004/0041542 A1* | 3/2004 | Phillips | H01M 10/44 |
| | | | 320/160 |
| 2013/0230774 A1* | 9/2013 | Ortega | H01M 4/505 |
| | | | 429/223 |
| 2015/0147675 A1 | 5/2015 | Oi et al. | |
| 2015/0155592 A1 | 6/2015 | Pratt | |
| 2016/0254567 A1* | 9/2016 | Cai | H01M 10/0564 |
| | | | 429/306 |
| 2017/0005504 A1* | 1/2017 | Rho | G04C 10/00 |
| 2017/0062786 A1 | 3/2017 | Kotov et al. | |
| 2017/0288258 A1 | 10/2017 | Rho et al. | |
| 2018/0090730 A1* | 3/2018 | Ai | H01M 50/209 |
| 2018/0309156 A1 | 10/2018 | Smith et al. | |

FOREIGN PATENT DOCUMENTS

WO   WO2017/117376   *   7/2017

OTHER PUBLICATIONS

Tung, S.-O., Ho, S., Yang, M., Zhang, R., Kotov, N.A.—A dendrite-supressing composite ion conductor from aramid nanofibers, Nature Communications, published on Jan. 27, 2015 (Year: 2015).*

International Search Report and Written Opinion of the International Searching Authority issued in PCT/US2020/012382, mailed on Sep. 11, 2020; ISA/US.

Rathika et al., "Electrical conductivity and dielectric relaxation behavior of PEO/PVdF-based solid polymer blend electrolytes for zinc battery applications." Ionics 24.1(2018): 243-255.

Fu, J.; Zhang, J.; Song, X.; Zarrin, H.; Tian, X.; Qiao, J.; Rasen, L.; Li, K.; Chen, Z. A Flexible Solid-State Electrolyte for Wide-Scale Integration of Rechargeable Zinc-air Batteries. Energy Environ. Sci. 2016, 9, 663-670.

Xu, Y.; Zhang, Y.; Guo, Z.; Ren, J.; Wang, Y.; Peng, H. Flexible, Stretchable, and Rechargeable Fiber-Shaped Zinc-Air Battery Based on Cross-Stacked Carbon Nanotube Sheets. *Angew. Chemie—Int. Ed.* 2015, 54, 15390-15394.

(Continued)

*Primary Examiner* — Anca Eoff
(74) *Attorney, Agent, or Firm* — Harness, Dickey & Pierce, P.L.C.

(57) ABSTRACT

A composite solid electrolyte for a solid-state electrochemical cell is provided. The electrolyte may include a plurality of aramid nanofibers, such as a branched aramid nanofiber network, an ionically conductive polymer, such as poly (ethylene oxide) or quaternary ammonia functionalized polyvinyl alcohol (QAFPVA), and an optional divalent ion salt. The electrolyte is particularly suitable for use with zinc ions, where the divalent ion salt may comprise zinc trifluoromethanesulfonate $Zn(CF_3SO_3)_2$. An electrochemical cell or battery is provided incorporating such a composite solid electrolyte that cycles ions, such as zinc ions or hydroxide ions, suppresses or minimizes dendrite formation, while having good ionic conductivity and being flexible. This flexibility provides the ability to create deformations in the electrochemical cell, such as protrusions and recesses that may define a corrugated pattern. Such a battery may be a rechargeable structural battery with a corrugated surface profile that can be used to form load-bearing structural components.

21 Claims, 31 Drawing Sheets

(56) References Cited

OTHER PUBLICATIONS

Wang. X.; Wang, F.; Wang, L.; Li, M.; Wang, Y.; Chen, B.; Zhu, Y.; Fu, L.; Zha, L.; Zhang, L.; Wu, Y.; Huang, W. An Aqueous Rechargeable Zn//Co3O4 Battery with High Energy Density and Good Cycling Behavior. *Adv. Mater.* 2016, 4904-4911.

Liu, J.; Guan, C.; Zhou, C.; Fan, Z.; Ke, Q.; Zhang, G.; Liu, C.; Wang, J. A Flexible Quasi-Solid-State Nickel-zinc Battery with High Energy and Power Densities Based on 3D Electrode Design. *Adv. Mater.* 2016, 28, 8732-8739.

Chew, S. Y.; Ng, S. H.; Wang, J.; Novák, P.; Krumeich, F.; Chou, S. L.; Chen, J.; Liu, H. K. Flexible Free-Standing Carbon Nanotube Films for Model Lithium-Ion Batteries. *Carbon N. Y.* 2009, 47, 2976-2983.

Mukherjee, R.; Thomas, A. V.; Krishnamurthy, A.; Koratkar, N. Photothermally Reduced Graphene as High-Power Anodes for Lithium-Ion Batteries. *ACS Nano* 2012, 6, 7867-7878.

Jia, X.; Yan, C.; Chen, Z.; Wang, R.; Zhang, Q.; Guo, L.; Wei, F.; Lu, Y. Direct Growth of Flexible LiMn2O4/CNT Lithium-Ion Cathodes. *Chem. Commun.* 2011, 47, 9669.

Li, N.; Zhou, G.; Fang, R.; Cheng, H.; Li, F.; Cheng, H. TiO2/Graphene Sandwich Paper as an Anisotropic Electrode for High Rate Lithium Ion Batteries. *Nanoscale* 2013, 5, 3-6.

Yu, A.; Park, H. W.; Davies, A.; Higgins, D. C.; Chen, Z.; Xiao, X. Free-Standing Layer-By-Layer Hybrid Thin Film of Graphene-MnO2 Nanotube as Anode for Lithium Ion Batteries. *J. Phys. Chem. Lett.* 2011, 2, 1855-1860.

Dai, Y.; Cai, S.; Yang, W.; Gao, L.; Tang, W.; Xie, J.; Zhi, J.; Ju, X. Fabrication of Self-Binding Noble Metal/Flexible Graphene Composite Paper. *Carbon N. Y.* 2012, 50, 4648-4654.

Wang, D.; Kou, R.; Choi, D.; Yang, Z.; Nie, Z.; Li, J.; Saraf, L. V. Ternary Self-Assembly of Ordered Metal Oxide-graphene Nanocomposites for Electrochemical Energy Storage. *ACS Nano* 2010, 4, 1587-1595.

Lee, J. W.; Lim, S. Y.; Jeong, H. M.; Hwang. T. H.; Kang, J. K.; Choi, J. W. Extremely Stable Cycling of Ultra-Thin V2O5 Nanowire-graphene Electrodes for Lithium Rechargeable Battery Cathodes. *Energy Environ. Sci.* 2012, 5, 9889.

Thieme, S.; Brueckner, J.; Bauer, I.; Oschatz, M.; Borchardt, L.; Althues, H.; Kaskel, S. High Capacity Micro-Mesoporous Carbon-Sulfur Nanocomposite Cathodes with Enhanced Cycling Stability Prepared by a Solvent-Free Procedure. *J. Mater. Chem. A* 2013, 1, 9225-9234.

Hu, L.; Wu, H.; La Mantia, F.; Yang, Y.; Cui, Y. Thin, Flexible Secondary Li-Ion Paper Batteries. *ACS Nano* 2010, 4, 5843-5848.

Pan, R.; Wang, Z.; Sun, R.; Lindh, J.; Edström, K.; Strømme, M.; Nyholm, L. Thickness Difference Induced Pore Structure Variations in Cellulosic Separators for Lithium-Ion Batteries. *Cellulose* 2017, 24, 2903-2911.

Pan, R.; Cheung, O.; Wang, Z.; Tammela, P.; Huo, J.; Lindh, J.; Edström, K.; Strømme, M.; Nyholm, L. Mesoporous Cladophora Cellulose Separators for Lithium-Ion Batteries. *J. Power Sources* 2016, 321, 185-192.

Leijonmarck, S.; Cornell, A.; Lindbergh, G.; Wågberg, L. Single-Paper Flexible Li-Ion Battery Cells through a Paper-Making Process Based on Nano-Fibrillated Cellulose. *J. Mater. Chem. A* 2013, 1, 4671.

Pan, H.; Shao, Y.; Yan, P.; Cheng, Y.; Han, K. S.; Nie, Z.; Wang, C.; Yang, J.; Li, X.; Bhattacharya, P.; Mueller, K. T.; Liu, J. Reversible Aqueous Zinc/Manganese Oxide Energy Storage from Conversion Reactions. *Nat. Energy* 2016, 1, 16039.

Li, H.; Han, C.; Huang, Y.; Huang, Y.; Zhu, M.; Pei, Z.; Xue, Q.; Wang, Z.; Liu, Z.; Tang, Z.; Wang, Y.; Kang, F.; Li, B.; Zhi, C. Environmental Science An Extremely Safe and Wearable Solid-State Zinc Polymer Electrolyte. 2018, 941-951.

Xu, C.; Li, B.; Du, H.; Kang, F. Energetic Zinc Ion Chemistry: The Rechargeable Zinc Ion Battery. *Angew. Chemie—Int. Ed.* 2012, 51, 933-935.

Zhang, N.; Cheng, F.; Liu, J.; Wang, L.; Long, X.; Liu, X.; Li, F.; Chen, J. Rechargeable Aqueous Zinc-Manganese Dioxide Batteries with High Energy and Power Densities. *Nat. Commun.* 2017, 8, 1-9.

Zhang, N.; Cheng, F.; Liu, Y.; Zhao, Q.; Lei, K.; Chen, C.; Liu, X.; Chen, J. Cation-Deficient Spinel ZnMn2O4 Cathode in Zn(CF3SO3)2 Electrolyte for Rechargeable Aqueous Zn-Ion Battery. *J. Am. Chem. Soc.* 2016, 138, 12894-12901.

Kundu, D.; Adams, B. D.; Duffort, V.; Vajargah, S. H.; Nazar, L. F. A High-Capacity and Long-Life Aqueous Rechargeable Zinc Battery Using a Metal Oxide Intercalation Cathode. *Nat. Energy* 2016, 1, 16119.

Senguttuvan, P.; Han, S. D.; Kim, S.; Lipson, A. L.; Tepavcevic, S.; Fister, T. T.; Bloom, I. D.; Burrell, A. K.; Johnson, C. S. A High Power Rechargeable Nonaqueous Multivalent Zn/V2O5 Battery. *Adv. Energy Mater.* 2016, 6.

He, P.; Yan, M.; Zhang, G.; Sun, R.; Chen, L.; An, Q.; Mai, L. Layered VS2 Nanosheet-Based Aqueous Zn Ion Battery Cathode. *Adv. Energy Mater.* 2017, 7, 2-6.

* cited by examiner

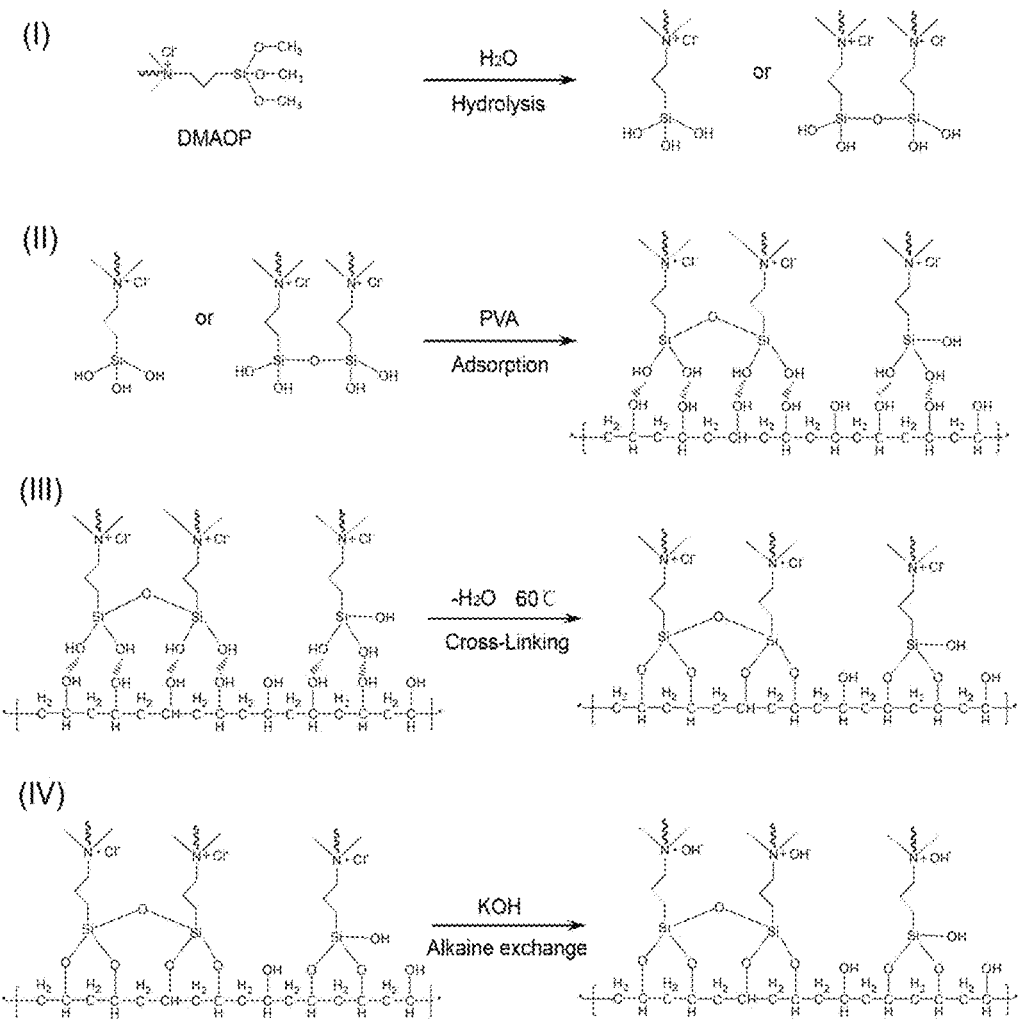
FIG. 30
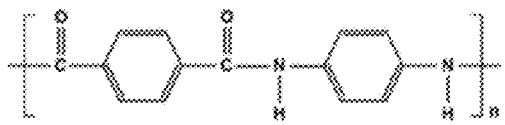
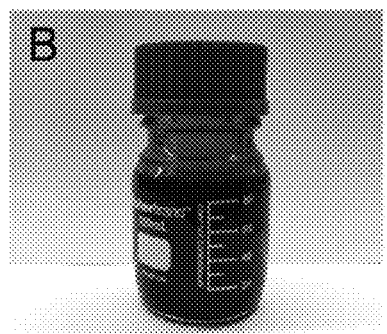
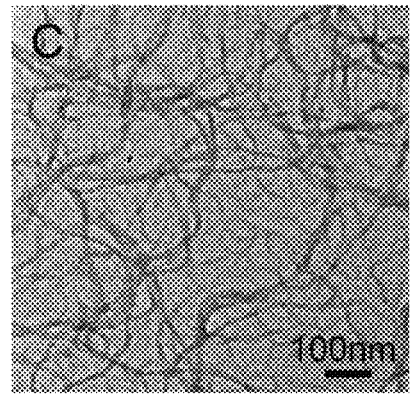
FIGS. 31A–31C

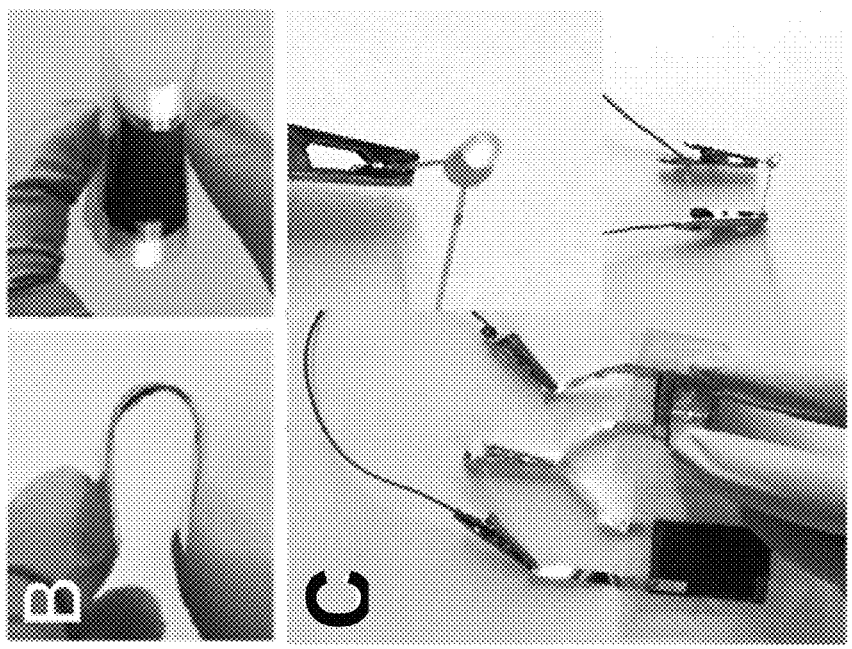
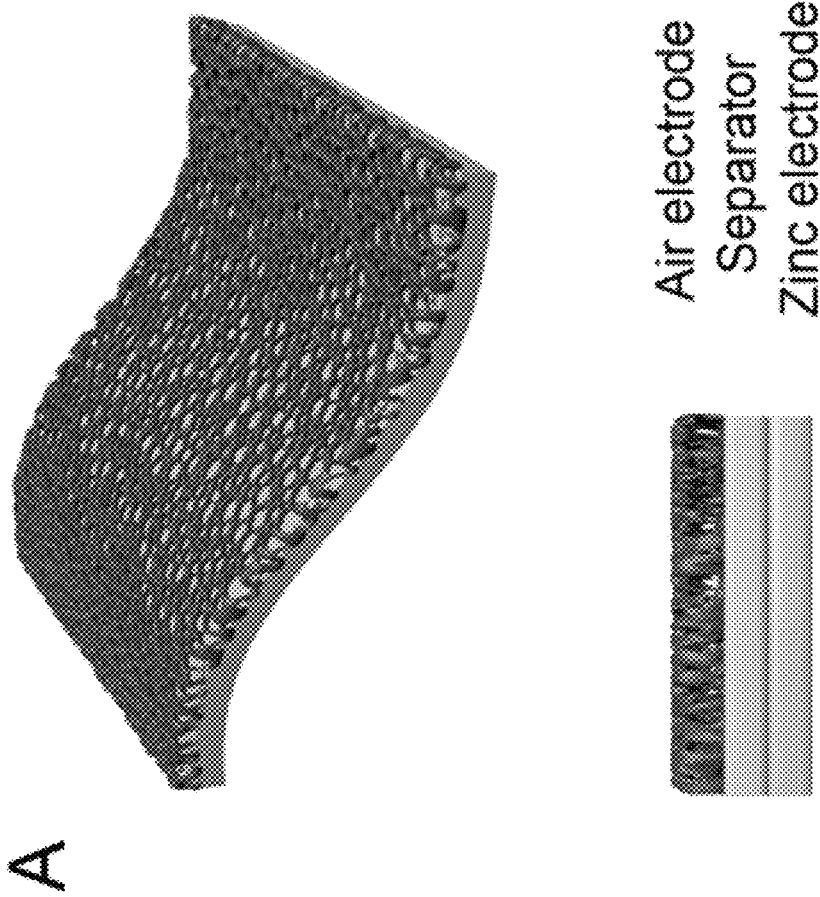
FIGS. 40A–40C

CORRUGATED STRUCTURAL ZINC BATTERIES HAVING A SOLID-STATE ELECTROLYTE

CROSS-REFERENCE TO RELATED APPLICATIONS

This application is the U.S. National Phase Application under 35 U.S.C. 371 of International Application No. PCT/US2020/012382 filed on Jan. 6, 2020, which claims the benefit of U.S. Provisional Application No. 62/788,535, filed on Jan. 4, 2019. The entire disclosures of the above applications are incorporated herein by reference.

GOVERNMENT SUPPORT

This invention was made with government support under FA9550-16-1-0265 awarded by the Air Force Office of Scientific Research and under 1538180 awarded by the National Science Foundation. The Government has certain rights in the invention. The Government has certain rights in the invention.

FIELD

The present disclosure relates to flexible, high-ionic conductivity, solid-state electrolytes for electrochemical cells, like batteries that cycle divalent ions, such as zinc.

BACKGROUND

This section provides background information related to the present disclosure which is not necessarily prior art.

Structural energy storage is expected to be an essential part of a future robotics technologies, body prosthetics, and transportation solutions, among other technological area. Successful realization for high-energy batteries, such as zinc-air batteries requires development of a new class of ion-conductors that can display high mechanical, ion-transport, and solvation-expansion characteristics, which currently have been difficult to design and produce. Electrochemical cells, like batteries, having dual functionalities—namely energy storage devices and load-bearing components—can transfigure engineering of ground robotics, unmanned aerial vehicles (UAVs) or drones, transportation, prosthetic devices, satellites, and the like. For example, dual functionality batteries can extend the range of such devices, while reducing total weight. Batteries based on zinc and other divalent metals have greater safety, reliability, and natural availability, as compared to lithium. Having theoretical energy densities similar to those of lithium-ion batteries, such zinc-based electroactive materials are attractive as energy storage solutions for many applications. Zinc-air rechargeable batteries are particularly attractive for this purpose because of the well-known high theoretical energy density of 1,084 Wh/kg, exceeding the current lithium-ion batteries by five times. Further, the mechanical properties of zinc electrodes afford their direct utilization in load bearing components. They are also environmentally friendly, because both cathode and anode can be transition-metal-free. However, the iconic alkaline batteries with a zinc (Zn) anode, a manganese oxide ($MnO_2$) cathode and concentrated KOH (6 mol/L) electrolyte are bulky and non-rechargeable. Further, these batteries can leak corrosive fluid and have energy densities that are approximately 7-10 times lower than lithium-ion batteries. Early studies on rechargeable $Zn/MnO_2$ batteries showed severe capacity fade due to the formation of byproducts, irreversible cathode chemistry in alkaline media, and the growth of dendrites.

Solid electrolytes with Young's moduli comparable to those of the zinc dendrites have the potential to eliminate these problems, even if quasi-solid separators based on gels and porous polymers cannot. However, few organic or inorganic solids with efficient ion transport of divalent ions, like zinc, are known. Thus, the realization of zinc in battery cells emphasizing dual functionalities is particularly difficult due to lack of suitable high-strength high ion-conductance membranes.

SUMMARY

This section provides a general summary of the disclosure, and is not a comprehensive disclosure of its full scope or all of its features.

In certain aspects, the present disclosure relates to a composite solid electrolyte comprising a plurality of branched nanofibers comprising an aromatic polyamide polymer; and an ionically conductive polymer. The composite solid electrolyte has an ionic conductivity of greater than or equal to about 0.001 mS/cm.

In one aspect, the composite solid electrolyte has an ionic conductivity of greater than or equal to about 55 mS/cm.

In one aspect, the plurality of branched nanofibers has an average diameter of greater than or equal to about 25 nm to less than or equal to about 300 nm.

In one aspect, the composite solid electrolyte comprises a plurality of pores with an average pore size diameter of less than or equal to about 50 nm.

In one aspect, the composite solid electrolyte has an ion exchange capacity (IEC) of greater than or equal to about 2.9 mmol $g^{-1}$ and an ion concentration of greater than or equal to about 1 mmol $cm^{-3}$.

In one aspect, the composite solid electrolyte has a Young's modulus of less than or equal to about 6.5 GPa and an ultimate tensile strength of greater than or equal to about 110 MPa.

In one aspect, the composite solid electrolyte further comprises a divalent ion salt.

In one further aspect, the divalent ion salt comprises zinc trifluoromethanesulfonate $Zn(CF_3SO_3)_2$ and a ratio of the ionically conductive polymer to the divalent ion salt to the plurality of nanofibers is about 9:3:1.

In one aspect, the ionically conductive polymer comprises poly(ethylene oxide) or quaternary ammonia functionalized polyvinyl alcohol (QAFPVA).

In one aspect, the ionically conductive polymer is present at greater than or equal to about 15 weight % to less than or equal to about 95 weight % in the composite solid electrolyte and the plurality of branched nanofibers is present at greater than or equal to about 1 weight % to less than or equal to about 60 weight % of the composite solid electrolyte.

In certain other aspects, the present disclosure relates to an electrochemical cell comprising a negative electrode comprising zinc, a positive electrode, and a composite solid electrolyte comprising a plurality of branched nanofibers comprising an aromatic polyamide polymer and an ionically conductive polymer. The composite solid electrolyte is disposed between the negative electrode and the positive electrode and has an ionic conductivity of greater than or equal to about 0.001 mS/cm. The composite solid electrolyte has an ionic conductivity of greater than or equal to about 55 mS/cm.

In one aspect, the ionically conductive polymer comprises poly(ethylene oxide) or quaternary ammonia functionalized polyvinyl alcohol (QAFPVA).

In one aspect, the composite solid electrolyte further comprises zinc trifluoromethanesulfonate $Zn(CF_3SO_3)_2$.

In one further aspect, a ratio of the ionically conductive polymer to the divalent ion salt to the plurality of branched nanofibers is about 9:3:1.

In one aspect, the positive electrode comprises manganese dioxide ($MnO_2$) and the electrochemical cell is a zinc-manganese dioxide battery.

In one aspect, the positive electrode is an air electrode comprising at least one catalyst and the electrochemical cell is a zinc-air battery.

In one aspect, the solid-state electrochemical cell is rechargeable and is capable of reversibly cycling zinc ions between the positive electrode and the negative electrode.

In certain other aspects, the present disclosure relates to a corrugated solid-state electrochemical cell comprising a negative electrode comprising zinc, a positive electrode, and a flexible composite solid electrolyte. The solid electrolyte comprises a plurality of branched nanofibers comprising an aromatic polyamide polymer and an ionically conductive polymer. The composite solid electrolyte has an ionic conductivity of greater than or equal to about 0.001 mS/cm. The negative electrode, the positive electrode, the composite solid electrolyte together define at least one protruding region and at least one recessed region.

In one aspect, the corrugated solid-state electrochemical cell comprises a plurality of protruding regions and a plurality of recessed regions that define a corrugated pattern so that the corrugated solid-state electrochemical cell is load bearing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1A-1F are SEM images: (A) SEM image of zinc dendrites penetrating through a CELGARD™ 2400 separator. (B) SEM images of the tip of a zinc dendrite. (C and D) SEM images of branched Aramid Nanofibers (BANFs). (E) SEM image of the cross-section, and (F) photograph of a free-standing composite electrolyte prepared in accordance with certain aspects of the present disclosure comprising Poly(ethylene oxide)-Zinc trifluoromethanesulfonate [$Zn(CF_3SO_3)_2$]-branched Aramid Nanofibers (BANFs) (PZB) (here, PZB-931 having a ratio of 9:3:1 ratio of polymer to salt to nanofibers) composite electrolyte.

FIGS. 2A-2F: (A) Cyclic voltammetry (CV) of a 7n/PZB-931/γ-$MnO_2$ battery scanned at 0.1 mVs$^{-1}$. In cathodic scans, a peak at 1.2 V is attributed to the electrochemical intercalation of $Zn^{2+}$ ions into γ-$MnO_2$. In anodic scans, a peak at 1.65 V is attributed to extraction of $Zn^{2+}$ ions. CV curves remain unchanged after five cycles, demonstrating nearly ideal reversibility of the cathode material between Zn-rich and Zn-depleted states. (B and D) Galvanistatically charge and discharge curves and rate capability of the Zn/PZB-931/γ-$MnO_2$ battery cycling within the voltage range of 1 V-1.8 V at current density from 0.1 C to 1.0 C (1 C=150 mAg$^{-1}$). (C) The voltage-time curve for the Zn/PZB-931/γ-$MnO_2$ battery discharge and charge at 0.2 C. (E) Cycling performance of the Zn/PZB-931/γ-$MnO_2$ battery at 0.2 C.

FIGS. 3A-3H: (A) Configuration of the symmetrical Zn/electrolyte/Zn cell. (B to D) galvanostatic cycling curves of the cells with different polymer film separators of (B) PEO film (with $Zn(CF_3SO_3)_2$ salt), (C) PZB-931 film (with $Zn(CF_3SO_3)_2$ salt), and (D) CELGARD™ 2400 separator (3 mol L$^{-1}$ $Zn(CF_3SO_3)_2$ N-methyl pyrrolidone (NMP) solution) at current densities of 0.2 mA cm$^{-2}$. The current direction was changed every 0.5 h. (E to H) SEM images of the zinc electrode surface before and after 500 h of cycling under different electrochemical conditions, (E) original zinc foil surface. (F) Zinc foil surface after cycled with PEO separator (neat, no $Zn(CF_3SO_3)_2$), (G) Zinc foil surface after cycled with PZB-931 separator (neat, no $Zn(CF_3SO_3)_2$), and (H) Zinc foil surface after cycled with CELGARD™ 2400 separator with a liquid electrolyte, namely 3 mol L−1 $Zn(CF_3SO_3)_2$ NMP solution. Prior to SEM imaging, the zinc electrode surface of CELGARD™ 2400 film was thoroughly washed with NMP solution to remove any electrolytes or salt residues. Scale bar 5 μm.

FIGS. 4A-4J: (A). Schematic of the mold used for plastic deformation studies. (B to F) Different plastically deformed shapes of Zn battery with solid-state biomimetic electrolyte PZB-931. (G) Open circuit voltage of Zn/PZB-931/γ-$MnO_2$ battery with square wave shape plastic deformation. (H) LED light powered by the two serial structural batteries. (I) Galvanostatic charge and discharge curves of Zn/PZB-931/γ-$MnO_2$ at 0.2 C for the corrugation batteries in B-F. (J) Comparison of EIS curves for original and plastically deformed corrugation batteries in B-F. No change in FIS can be observed even for high degree of plastic deformation as in (B) indicating high damage tolerance.

FIGS. 5A-5D: (A) Tested UAV without cover. (B, C, D) Three different designs of corrugated Zn/γ-$MnO_2$ battery pack as a replacement for the original device cover to supplement main power source of UAVs. All modified drone models with Zn/PZB-931/$MnO_2$ structural batteries installed were demonstrated to successfully take off even under low ambient temperature.

FIG. 6: Characterization of ionic conductivity and tensile strength of PZB composites with different $Zn(CF_3SO_3)_2$ loadings based on the PEO weight; the weight ratio of PEO:$Zn(CF_3SO_3)_2$ is from 10:1 to 3:1. The $Zn(CF_3SO_3)_2$ salt concentration has an effect on the physicochemical properties for polymer electrolyte. The inner resistance of the composite film decreases significantly by increasing the $Zn(CF_3SO_3)_2$ loading and reaches the plateau at 1:3 compared to PEO weight. The tensile strength, however, decreased when the salt loading increased further. Additional amount of $Zn(CF_3SO_3)_2$ in PZB film changes the tensile strength from around 83±4.2 MPa to 7.8±0.40 MPa as the $CF_3SO_3^-$ ions tend to aggregate at high loading. Thus, composite electrolytes with weight ratio of $Zn(CF_3SO_3)_2$ to PEO of 1:3 and BANFs 10 wt. % of the total PEO weight. This composite electrolyte will be referred as PZB-931.

FIG. 7: A stress/strain curve of the PZB-931 biomimetic composite prepared in accordance with certain aspects of the present disclosure.

FIGS. 8A-8J: The SEM images of the surface view and side view of PZB composites with different BANF loading. (A and B) neat PEO, (C and D), PZB composite with 1 wt. % BANF loading, (E and F), PZB composite with 5 wt. % BANF loading, (G and H) PZB composite with 10 wt. % BANF loading, and (I and J) PZB composite with 15 wt. %

BANF loading. Here and elsewhere, the nanofiber loading is reported with respect to the weight of PEO.

FIGS. 9A-9D: (A and B) SEM surface image of the BANFs and (C) Corresponding statistical analysis of the apparent pore sizes on the BANF surface in (B). (D) Pore size width distributions of the BANF obtained from Barrett-Joyner-Halenda (BJH) analysis. The nanoscale architecture of the BANF-based composites was investigated by SEM (FIG. 9A). The pore size in PZB 931 was found to be from tens of nanometers to hundreds of nanometers (FIGS. 9B, C). The pore size from the BJH analysis was calculated to be 50-70 nm. The apparent difference between the pore sizes calculated from SEM image and BJH data is common; it is associated with the changes occurring with the nanoporous materials under vacuum.

FIG. 10: Ionic conductivities of PZB composite films with different of BANF loading. (A) PEO film, (B) PZB composite with 1 wt. % BANF loading, (C) PZB composite with 5 wt. % BANF loading, (D) PZB composite with 10 wt. % BANF loading, and (E) PZB composite with 15 wt. % BANF loading. Here and elsewhere, the nanofiber loading is reported in respect to the weight of PEO.

FIG. 11: The XRD pattern comparison between PEO and PZB-931 composite films. The amorphous nature of PEO polymer was clearly observed in PZB-931 composite film by a diffuse broad band for 2θ between 20° and 30° instead of the sharp peaks at 2θ=19° and 2θ=23° for crystalline PEO.

FIG. 12: The FT-IR spectra of BANFs, PEO and PZB-931 composite. Two new peaks at 2798 cm$^{-1}$ and 1770 cm$^{-1}$ are found in PZB-931 composite and represent intermolecular hydrogen bonds between BANFs and PEO chains, which hinder the crystallization of the polymer.

FIG. 13: DSC curves for PZB-931 composites and ion-conducting membrane from neat PEO.

FIG. 14: Comparison of the EIS curves obtained under different temperatures for PZB-931.

FIG. 15: Zn 2p core level spectra of cathodic γ-MnO$_2$ electrodes at (A) original, (B) Zn-depleted and (C) Zn-rich states.

FIG. 16: The XPS survey of cathodic γ-MnO$_2$ electrodes at (A) original, (B) Zn-rich and (C) Zn-depleted states.

FIG. 17: XRD patterns of cathodic γ-MnO$_2$ electrodes in the (A) original, (B) Zn-rich and (C) Zn-depleted states.

FIG. 18: an example schematic diagram of a flexible Zn/PZB-931/γ-MnO$_2$ battery, prepared in accordance with certain aspects of the present disclosure.

FIG. 19: Rate performance of Zn/PZB-931/MnO$_2$ battery cells for charge-discharge rates from 0.1 C to 1 C. The data for analogous battery cells made with PEO as ion-conductor and CELGARD™ 2400 with liquid electrolyte are provided for comparison.

FIGS. 20A-20B: The voltage generated by Zn/PZB-931/γ-MnO$_2$ battery with two distinct corrugation different shapes (rectangles having a relative larger dimension and lower density grid pattern in (A) and rectangles having a relatively smaller dimension and higher density grid pattern in (B)). No short-circuits are observed after plastic deformation forming the corrugations.

FIGS. 21A-21D: (A) The photographs of flexible Zn/PZB-931/γ-MnO$_2$ battery and (B) an LED lit by the flexible device. (C-D) Galvanostatically charged and discharged curves (C) and Capacity retention (D) of Zn/PZB-931/γ-MnO$_2$ at 0.2 C under different bending angles.

FIG. 22: Capacity retention of the Zn/PZB-931/γ-MnO$_2$ battery under various deformation status corresponding to FIGS. 4B-4F.

FIG. 23: The open-circuit voltage of Zn/PZB-931/γ-MnO$_2$ battery undergoing bending tests at 5 bending cycles per second.

FIGS. 24A-24C: (A) Schematic diagram fabrication process of Zn/PZB-931/γ-MnO$_2$ structural batteries. (B) The capacity performance of Zn/PZB-931/γ-MnO$_2$ battery under different pressure. (C) Capacity retention of the structural battery on cycle numbers under square wave shape.

FIG. 25: Comparison of the EIS of the Zn/PZB-931/γ-MnO$_2$ battery for different bending angles.

FIG. 26: Comparison of the EIS of the Zn/PZB-931/γ-MnO$_2$ battery under different pressure.

FIG. 30 shows a proposed reaction mechanism for PVA chain-functionalization with Dimethyloctadecyl [3-(trimethoxysilyl)propyl]ammonium chloride (DMOAP).

FIGS. 31A-31C show prepared aramid nanofibers (ANFs). (A) Diagram of the ANFs molecular structure. (B) ANFs dispersion in DMSO solution. (C) TEM image of ANFs.

FIGS. 32A-32K. (A-C) PVA and functionalized-QAFPVA composite comparison by FTIR spectrum (A), wide XPS region spectrum (B) and XRD pattern (C). (D-E) Photographs of QAFPVA/ANFs composite membranes in different states. (F-G) The comparison of surface SEM image of ANFs membrane (F) and QAFPVA/ANFs composite membrane (G) (H) The cross-section SEM images of the ANFs membrane prepared by the spill coating method and its magnified image (I). (J-K) SEM images of QAFPVA/ANFs composite membrane after soaking into polymer solution. The scale bars: Figure D-E is 1 cm, Figure F-K is 2.0 μm.

Figure 33:
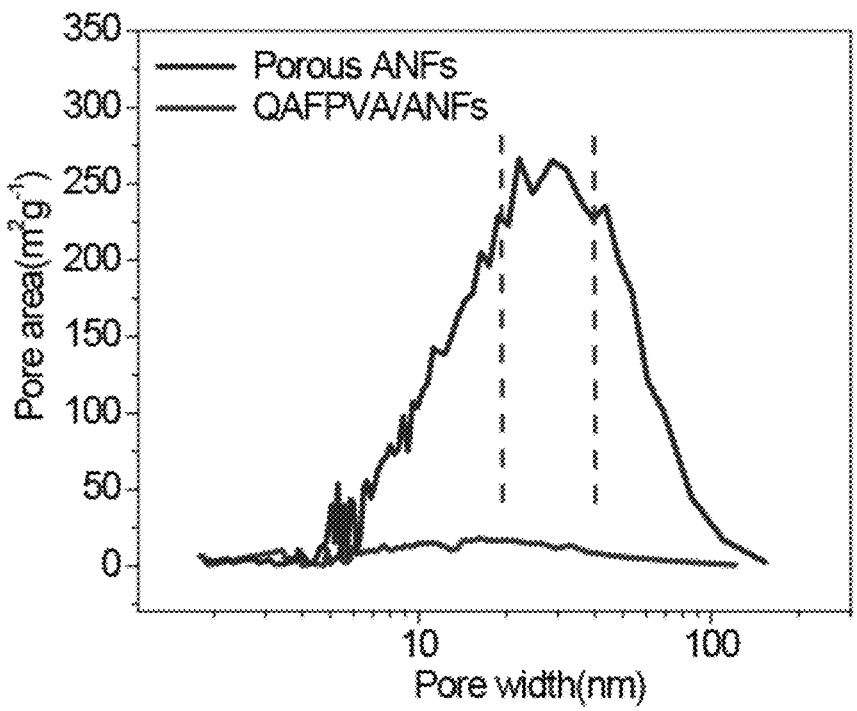

FIG. 33 shows pore surface area comparison of porous ANFs membrane and QAFPVA/ANFs composite membrane prepared in accordance with certain aspects of the present disclosure according to the Brunauer-Emmett-Teller (BET) analysis.

Figure 34:
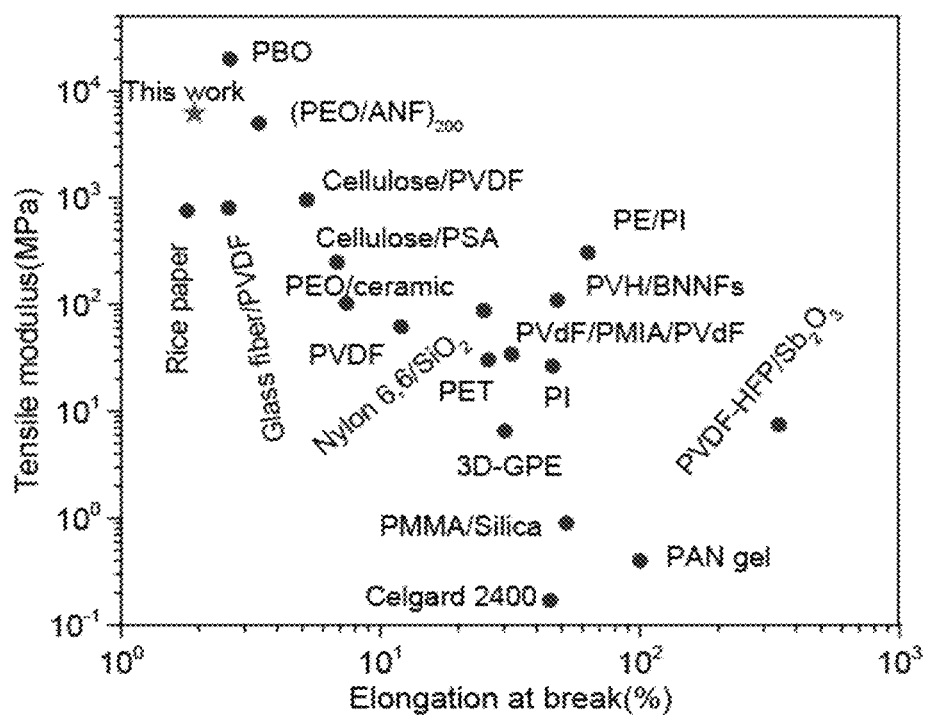

FIG. 34 shows a comparative evaluation of stiffness for QAFPVA/ANFs and other comparative gel or solid battery separators.

FIGS. 35A-35H. (A) Comparison of ionic conductivity of the PVA, QAFPVA and QAFPVA/ANFs membranes; the ion conductivity of a commercial A201 membrane (data taken from Ref. (19, 21)). (B) Discharge curves comparison with different electrolyte at various current densities of from 0.5 mA cm−2 to 5 mA cm−2 (C) Galvanostatic discharge performance of batteries using different membranes at a current density of 5 mA cm−2 under atmosphere conditions. (D-E) Comparison of charge-discharge polarization (D) and power density (E) curves of the batteries with PVA, QAFPVA and QAFPVA/ANFs electrolytes at room temperature. (F-H) Galvanostatic charge-discharge cycling comparison of the PVA, QAFPVA and QAFPVA/ANFs electrolytes at a current density of 1 mA cm−2 with a 20 min per cycle period at room temperature.

Figure 36:
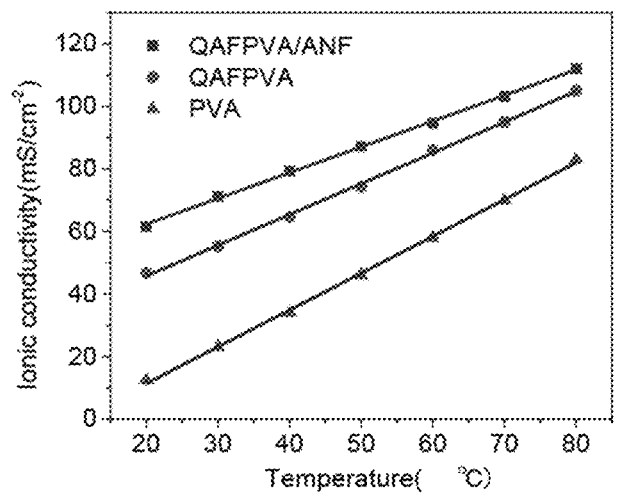

FIG. 36 shows temperature-dependent ionic conductivity comparisons of PVA, QAFPVA and QAFPVA/ANF membranes prepared in accordance with certain aspects of the present disclosure.

Figure 37:
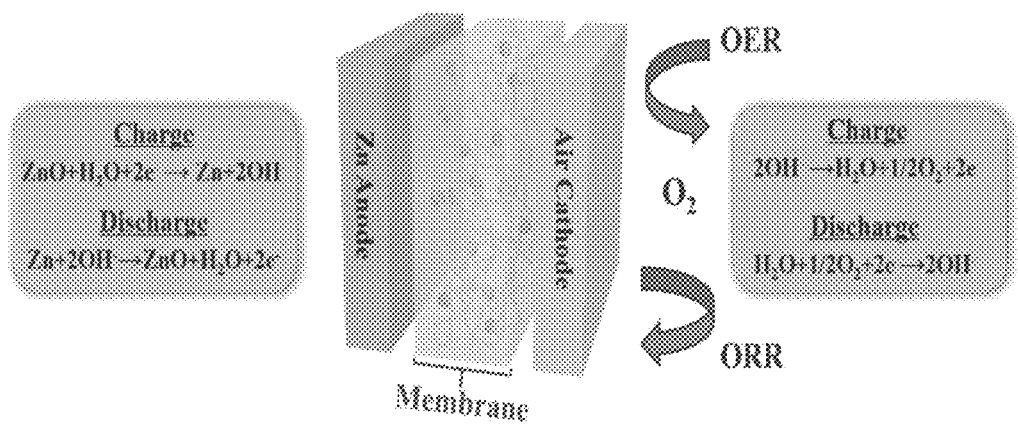

FIG. 37 shows a schematic representation of the rechargeable zinc-air battery prepared in accordance with certain aspects of the present disclosure.

FIGS. 38A-38I. SEM image of the surface of cycled zinc electrode based-on PVA (A-C) electrolyte QAFPVA (D-F) electrolyte and QAFPVA/ANFs (G-I) electrolyte after different number of charge-discharge cycles: (A, D, G) 10 cycles; (B, E, H) 60 cycles; and (C, F, I) 120 cycles. To facilitate the characterization, the zinc electrode surface was thoroughly washed with de-ionized water to remove any electrolytes or salt residues. The needle like zinc or zinc oxide deposits uniform are observed on the electrode surface. The scale bars are 2 μm.

FIGS. 39A-39E. (A-B) Photograph of the robot with structural zinc-air battery under different shape condition. (C) Galvanostatic charge-discharge cycling curves of zinc-air battery with QAFPVA/ANFs at a current density of 1 mAcm−2 and the corresponding photographs, demonstrating the behavior under different bending conditions. (D) Comparison of charge-discharge polarization curves of QAFPVA/ANFs-based zinc-air battery under different bending angles. (E) The power density comparison of the zinc-air battery at a corresponding current density under different bending angles.

FIGS. 40A-40C. (A) Schematic diagram of flexible zinc-air battery assembled by the layer-by-layer method, in which the QAFPVA/ANFs was paired with a zinc foil electrode and a bifunctional air electrode with commercial cobalt oxide NPs deposited on a carbon cloth in accordance with certain aspects of the present disclosure. (B-C) Photographs of flexible zinc-air battery based on QAFPVA/ANFs electrolyte.

Figure 41:
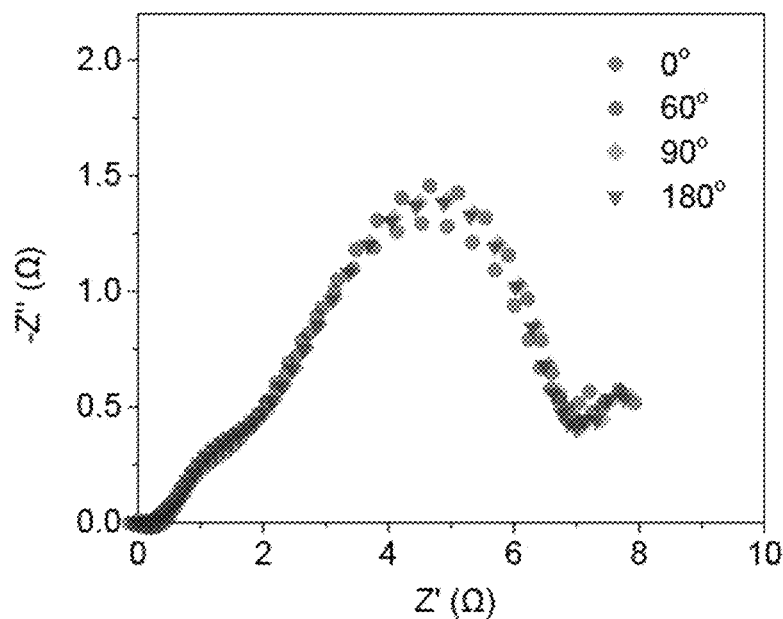

FIG. 41 Nyquist plots of the flexible battery prepared in accordance with certain aspects of the present disclosure measured under different bending angles.

Figure 42:
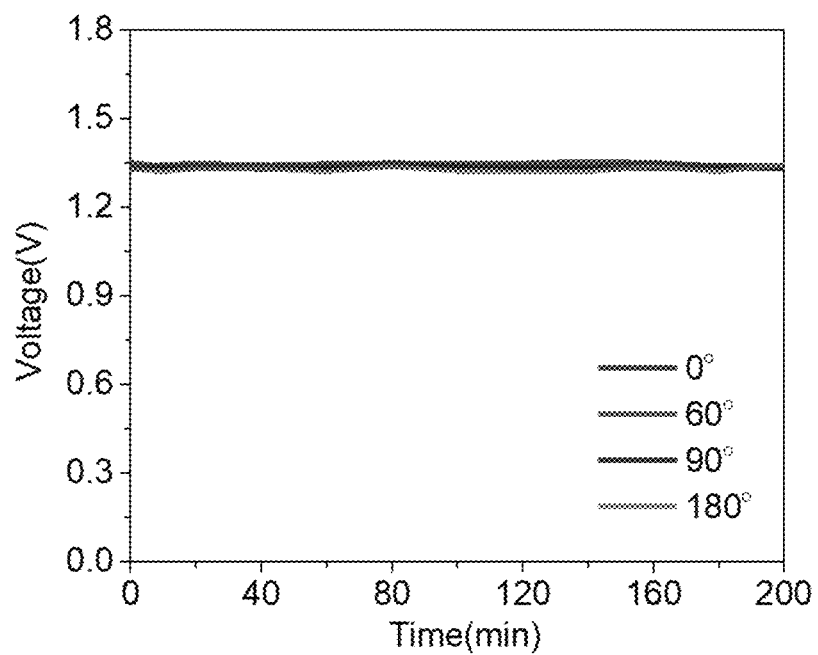

FIG. 42 shows a voltage recording of a zinc-air battery comprising a QAFPVA/ANFs electrolyte prepared in accordance with certain aspects of the present disclosure with different bending angles.

Figure 43:
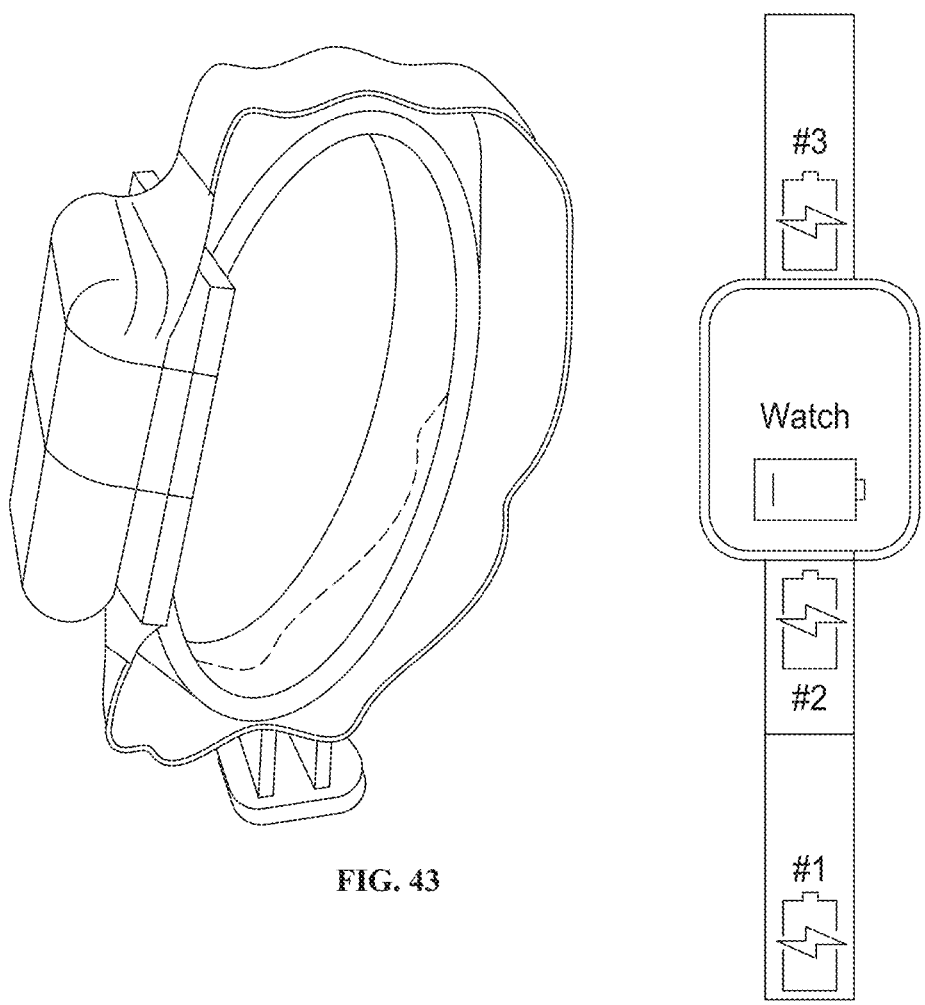

FIG. 43 is a photograph of a wearable electronic watch device modified to have a plurality of structural batteries prepared in accordance with certain aspects of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

The disclosure of all patents, patent applications, articles, and literature referenced or cited in this disclosure are hereby incorporated by reference herein.

Example embodiments will now be described more fully with reference to the accompanying drawings.

Figures 1A, 1B, 1C, 1D, 1E, 1F:
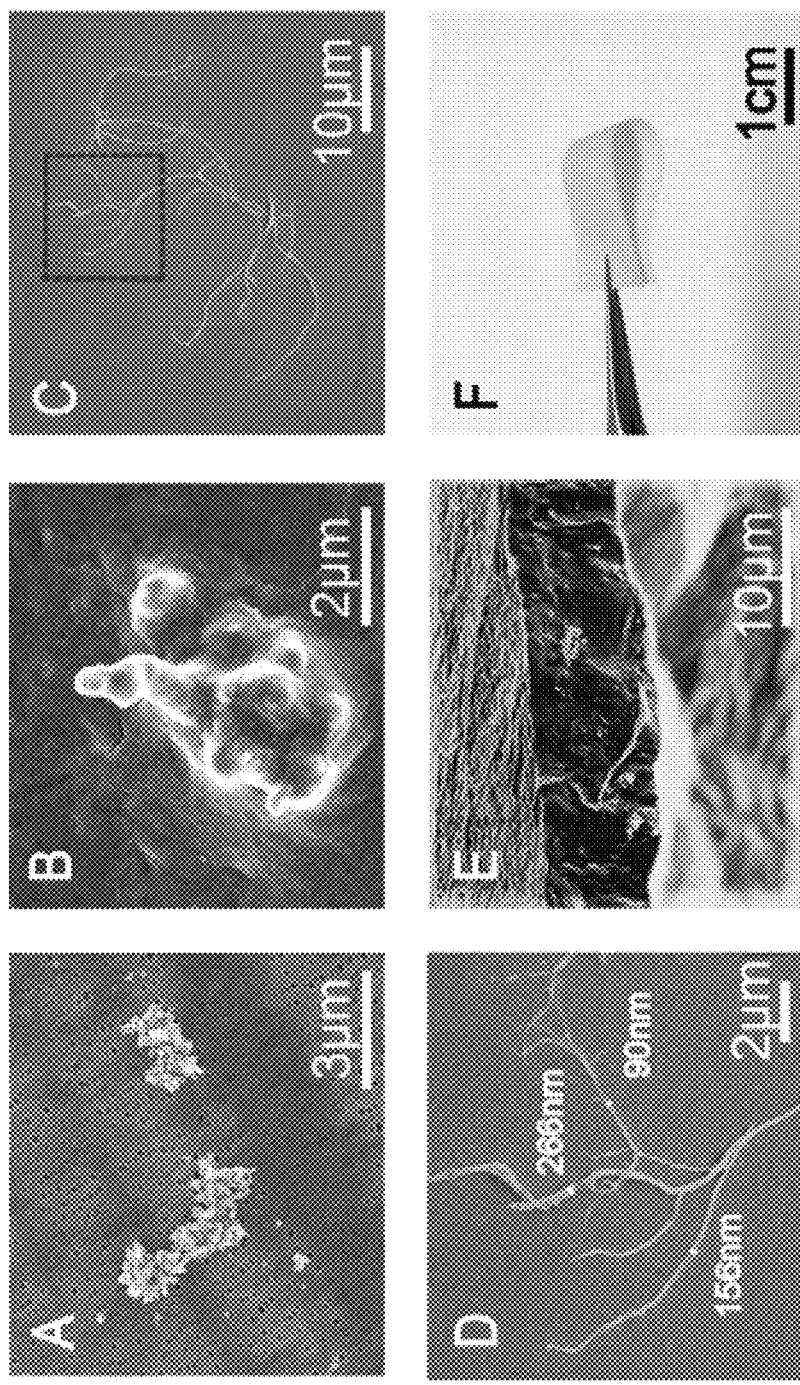

The present disclosure pertains to improved electrochemical cells, such as batteries, electrochemical capacitors and supercapacitors. By way of background, batteries that are based on divalent metals, such as $Zn/Zn^{+2}$ pair, represent attractive alternatives to lithium-ion chemistry, due to their high safety, reliability, earth-abundance and energy density. However, archetypal Zn batteries are bulky, inflexible, non-rechargeable, and contain a corrosive electrolyte. Moreover, suppression of the anodic growth of Zn dendrites is required for successful use of such materials. Dendrite growth has the largest impact on energy density and cyclability for all Zn batteries, as Zn dendrites (Young's modulus E=108 GPa) can easily traverse the inter-electrode space piercing conventional polymeric separators to result in short circuits (FIGS. 1A to 1B). Liquid organic $Zn^{2+}$ electrolytes make metal deposition on the anode uniform and improve the reversibility of cathode chemistry; however, the problem of dendrite growth persists and a new problem of flammability emerges.

Thus, zinc-based batteries, especially zinc-based rechargeable batteries have high theoretical energy density and are environmentally friendly. Many current versions of zinc-air cells are designed to have large inter-electrode gaps filled with liquid electrolytes, which prevent the growth of zinc dendrites, but drastically reduce their energy density. Furthermore, the highly caustic liquid electrolyte is prone to leak especially under strain.

Recently, rechargeable batteries have been constructed using three-dimensional (3D) electrodes in the form of Zn sponges, Zn-on-Ni foams, or carbon cloths in order to alleviate the problem of anode-to-cathode bridging by dendrites. While demonstrating impressive cyclability, the three dimensional electrodes increase the bulk of the anode and make them prone to mechanical damage, while increasing the likelihood of leakage of the liquid electrolyte.

Other zinc-air cells employ gel or solid-state ion-conducting membranes in lieu of liquid electrolyte, but suffer from severe performance fade. Solid electrolytes with Young's moduli comparable to those of the Zn dendrites have the potential to eliminate these problems, even if quasi-solid separators based on gels and porous polymers cannot. However, few organic or inorganic solids with efficient ion transport of divalent ions, like zinc, are known. Some examples of polymeric electrolytes having somewhat improved ionic conductivity have been capable of reaching 48.3 mS cm$^{-1}$, 21.2 mS cm$^{-1}$, and 33.0 mS cm$^{-1}$ for highly charged polycations, modified cellulose and cellulose/graphene oxide composites, respectively, which provides power density competitive with the aqueous (liquid electrolyte) zinc-air cells. However, the swelling-contraction cycle characteristic of current hydroxide solid electrolytes leads to delamination of electrolyte membranes from electrodes, preventing realization of complex biomorphic shapes. Moreover, the dendrite problem persists with stiff zinc dendrites easily piercing gel electrolyte layers described above.

To address these challenges, new electrolyte composite materials are provided that incorporate nanofibers. Materials having nanoscale mechanics sufficient to withstand mechanical deformation from stiff Zn dendrites are thus provided in certain aspects by the present disclosure. Such materials desirably support rapid transport of divalent ions (like $Zn^{2+}$ ions) or hydroxide ions necessary for high Coulombic efficiency and energy density. In various aspects, the present disclosure provides an electrochemical cell or battery having a composite solid electrolyte disposed between a negative electrode and a positive electrode. These composite materials combine efficient mass transport and high mechanical properties. A high porosity level of the open nanofiber network and its ability to redistribute the strain over large volumes is advantageous for ion conductors in structural batteries. The present disclosure thus provides an ionically conductive, flexible, solid-state electrolyte capable of transporting ions, such as hydroxide ions suitable for zinc-air chemistry or zinc ions for other zinc-based batteries. Such solid-state electrolytes provide high-capacity structural batteries that are light and safe and can be used in a wide range of robotic devices and autonomous vehicles, among other applications. Such solid-state composite electrolytes can be used in rechargeable or non-rechargeable batteries.

Figure 27:
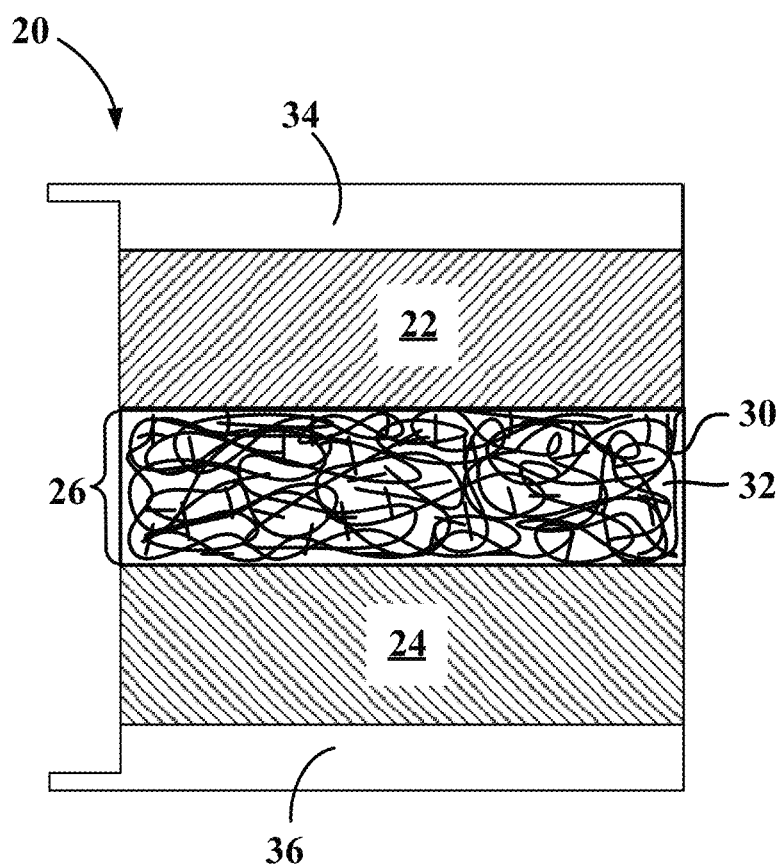
FIG. 27 is an illustration of an example of a solid-state battery comprising a solid-state composite electrolyte prepared in accordance with certain aspects of the present disclosure.

A rechargeable battery operates by reversibly passing ions back and forth between the negative electrode and the positive electrode during charging and discharging. For example, ions may move from the positive electrode to the negative electrode during charging of the battery and in the opposite direction when discharging the battery. In a non-rechargeable battery, the ions only travel in a single direction during discharge. For example, a representative rechargeable battery 20 is shown in FIG. 27. The battery 20 includes a positive electrode 22 and a negative electrode 24. The positive electrode 22 may include a positive electroactive material. The positive electrode 22 may be a composite electrode that comprises a plurality of electroactive material particles distributed in a polymeric matrix (that may comprise an ionically conductive material), optionally further including electrically conductive particles distributed therein. The positive electroactive material may comprise manganese, as will be described further below. In other embodiments, the positive electrode 22 may instead be an air electrode, where air or oxygen is supplied into the battery 20. The air electrode may include one or more catalysts as electroactive materials. For example, an air electrode may comprise platinum-carbon (PtC) and iridium oxide ($IrO_2$) sprayed onto a carbon cloth or other porous substrate into which air may flow and be distributed. The air electrode may also comprise an ionically conductive material or an ionomer, such as NAFION™ comprising a copolymer of polytetrafluoroethylene and perfluorovinyl ether groups terminated with sulfonate groups. The negative electrode 24 may comprise a negative electroactive material, which may be in the form of a solid film. The negative electroactive material may be a material that comprises zinc, as will be described further below. A solid-state electrolyte 26 is disposed between the positive electrode 22 and negative electrode 24. The solid-state electrolyte 26 serves as a separator—preventing physical contact and electrically isolating the positive electrode 22 and negative electrode 24—and further is suitable for conducting ions (e.g., zinc ions or hydroxide ions).

In solid-state batteries, like battery 20, the solid-state electrolyte 26 is disposed between solid-state electrodes (positive electrode 22 and negative electrode 24), where the solid-state electrolyte 26 physically separates the respective electrodes and can thus serve as a separator and ionic conductor, so that a distinct polymeric separator is not required. The solid-state electrolyte 26 may be a composite electrolyte that comprises a plurality of nanofibers 30 and a matrix of polymeric material 32.

A positive electrode current collector 34 may be in electrical communication with the positive electrode 22 and thus positioned adjacent to or near the positive electrode 22. Likewise, a negative electrode current collector 36 may be in electrical communication with the negative electrode 24 and thus positioned adjacent to or near the negative electrode 24. The positive electrode current collector 34 and the negative electrode current collector 36 move free electrons to and from an external circuit (not shown) that may include a load device. For example, the battery 20 can generate an electric current during discharge when electrochemical reactions occur. The chemical potential difference between the positive electrode 22 and the negative electrode 24 drives electrons produced at the negative electrode 24 through the external circuit towards the positive electrode 22. Ions, which are also produced at the negative electrode 24, are concurrently transferred through the solid-state electrolyte 26 towards the positive electrode 22. Electric current passing through the external circuit can be harnessed and directed to a device until the reaction in the negative electrode 24 is depleted or completed and the capacity of the battery is diminished.

When the battery 20 is rechargeable and is capable of undergoing reversible electrochemical reactions, the rechargeable battery can be charged or reenergized by connecting to an external power source (for example, a charging device) to reverse the electrochemical reactions that occur during battery discharge. The connection of the external power source to the battery 20 causes a reaction at the positive electrode 22 to produce electrons and ions. The electrons, which flow back towards the negative electrode 24 through the external circuit, and the ions, which move across the solid-state electrolyte 26 back towards the negative electrode 24 combine at the negative electrode 22 to replenish it for reaction during the next battery discharge cycle. Each discharge and charge event is considered to be a cycle in a rechargeable battery, where ions are cycled between the positive electrode 22 and the negative electrode 24.

In many of the configurations of the battery 20, each of the negative electrode current collector 36, the negative electrode 24, the solid-state electrolyte 26, the positive electrode 22, and the positive electrode current collector 34 are prepared as thin layers (for example, from several microns to a millimeter or less in thickness) and assembled in layers electrically connected in parallel or series arrangements (e.g., in a stack) to provide greater voltage output, energy, and/or power as required. The battery 20 may include a variety of other components not shown here, such as casings, gaskets, terminal caps, and any other conventional components or materials that may be situated within the battery 20. The battery 20 can be used to provide electrical energy to a variety of known electrically-powered devices, including by way of non-limiting example, robots, drones, satellites, prosthetic devices, vehicles, consumer products (e.g., wearable electronics, laptops, mobile devices), power tools, appliances, and the like.

The solid-state electrolyte 26 thus comprises a plurality of axial geometry nanoparticles. Axial geometry particles are anisotropic and have a cylindrical, rod, tube, wire, or fibrous shape with an evident elongated longitudinal axis, which is longer than the other dimensions (e.g., diameter or width), thus having an axial anisotropic geometry. Generally, an aspect ratio (AR) for cylindrical shapes (e.g., a fiber, wire, pillar, rod, tube, etc.) is defined as AR=L/D, where L is the length of the longest axis (here the major longitudinal axis) and D is the diameter of the cylinder or pillar. Suitable axial geometry particles for use in the present technology generally have high aspect ratios, for example, ranging from at least about 100 to in excess of 1,000, for example. In various aspects, such axial geometry particles are referred to herein as nanofibers.

In certain variations, a nanofiber has an axial geometry with an evident longitudinal axis and further has at least one spatial dimension that is less than or equal to about 10 μm (i.e., 10,000 nm), optionally less than or equal to about 5 μm (i.e., 5,000 nm), optionally less than or equal to about 1 μm (i.e., 1,000 nm), optionally less than or equal to about 0.5 μm (i.e., 500 nm), optionally less than or equal to about 0.4 μm (i.e., 400 nm), optionally less than or equal to about 0.3 μm (i.e., 300 nm), optionally less than or equal to about 0.2 μm (i.e., 200 nm), and in certain variations, optionally less than or equal to about 0.1 μm (i.e., 100 nm). In certain variations, a nanofiber may have at least one spatial dimension (e.g., diameter) of about 5 nm to about 500 nm, optionally about 10 nm to about 100 nm, and in certain aspects, optionally about 10 nm to about 50 nm. In other variations, the nanofiber may have at least one spatial dimension (e.g., diameter) of about 200 to about 300 nm. It should be noted that so long as at least one dimension of the nanofiber falls within the above-described nano-sized scale (for example, diameter), one or more other axes may well exceed the nano-size (for example, length and/or width). In certain variations, where the axial geometry nanofiber may have a diameter of greater than or equal to about 25 nm to less than or equal to about 50 nm, optionally greater than or equal to about 30 nm to less than or equal to about 40 nm, and may have a length of less than or equal to about 10 μm, for example, optionally from greater than or equal to about 1 μm to about 10 μm. In other variations, the nanofiber may have a diameter of about 200 to about 300 nm and may have a length of less than or equal to about 10 μm, for example, optionally from greater than or equal to about 1 μm to about 10 μm.

The nanofibers 30 may comprise an aromatic polyamide polymer. In certain variations, the nanofibers 30 may comprise branched nanofibers that may have a plurality of branch points on each nanofiber. The branched nanofibers may form an interconnected porous network. For example, such nanofibers may comprise branched aromatic polyamide (aramid) nanofibers (BANFs). Suitable aromatic polyamide (aramid) nanofibers may be KEVLAR™ microfibers (generally formed by the copolyermization of benzene-1,4-diamine and terephthaloyl dichloride) formed by high-energy agitation that create branched nanofibers. Branched aramid nanofibers can be formed by controlled reaction of microfibers or precursors of microfibers at low temperatures for extended times in a carrier, such as an aprotic solvent, optionally in the presence of a base, at relatively low concentrations, relatively low temperature, or lower time than the conditions for formation of unbranched ANFs that represent the product of nearly full separation of microscale aramid fibers into fibrils. The intermediate state of chemical splitting of the microfibers into nanoscale fibrils is represented by branched ANFs. Aromatic polyamide (aramid) nanofibers used here were made from KEVLAR™ microfibers (generally formed by the co-polymerization of benzene-1,4-diamine and terephthaloyl dichloride) that may be formed by high-energy agitation in DMSO. These Branched Aramid Nanofibers (BANFs) fibers serve as the high-strength components of the composite electrolyte and mimic the stiff collagen nanofibers of cartilage. The BANFs have a branching geometry with approximately five to six forkpoints in each fiber (FIGS. 1C and 1D). In certain variations, the principle "stems" have an average diameter of about 200 nm to about 300 nm, while the "branches" have an average diameter of about 50 nm to about 100 nm. Multi-point bifurcation of these filaments facilitates the formation of a fibrous 3D network with a large volume fraction of nanoscale pores advantageous for ion transport. Similar to the structure of soft tissues, the efficient entanglement of nanoscale branches lends high stiffness to the material on both macro- and nanoscales needed for the prevention of dendrite growth. Besides branching, the aromaticity and amphiphilicity of BANFs offers a wider range of charge transporting media than hydrophilic 3D networks including solid-state ion-conducting polymers compared to 3D networks observed for nanocellulose, alginate and peptides. High toughness characteristic of all 3D nanofiber networks engenders resilience to extreme deformations.

Such BANFs may be formed by way of example, by dispersing bulk KEVLAR™ pulp commercially available from DuPont Co. in an aprotic solvent, such as dimethyl sulphoxide (DMSO), and stirred at room temperature at high speeds. After 2 hours, the dispersion can be collected and placed in a centrifuge to spin, for example, at 10,000 rpm for 10 minutes. BANFs are thus formed and may be further washed. The branched nanofibers 30 create a porous network that may be filled with a polymer matrix 32. The high surface area of branched ANFs is believed to provide for a large polymer uptake (the polymer matrix 32) and the resultant high ionic conductivity of the solid-state composite electrolyte, while maintaining advantageously high mechanical properties.

The solid-state electrolyte 26 also includes the polymeric matrix 32 that may be an ionically conductive polymer distributed within pores defined by the nanofibers 30. In one variation, the ionically conductive polymer comprises poly (ethylene oxide) (PEO). In another variation, the ionically conductive polymer comprises polyvinyl alcohol (PVA). The polymer may be functionalized with functional groups, such as nitrogen-containing functional groups, to enhance ionic conductivity. For example, in certain variations, the ionically conductive polymer comprises quaternary ammonia functionalized polyvinyl alcohol (QAPVA), where PVA is functionalized with quaternary ammonia.

Figure 29:
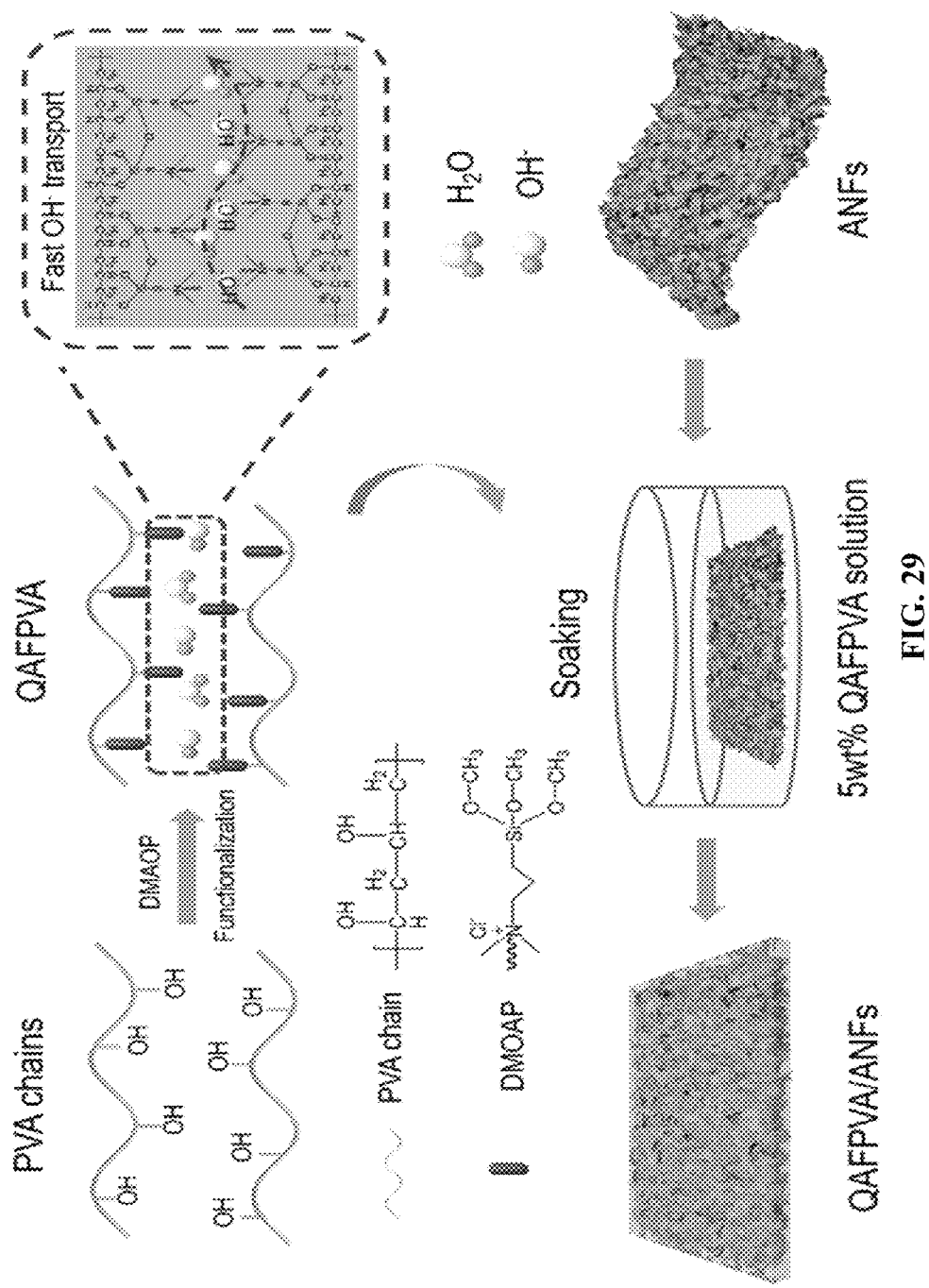
FIG. 29 shows a schematic diagram of overall preparation of a quaternary ammonia functionalized polyvinyl alcohol (QAPVA), aramid nanofiber (ANFs) membrane.

In certain aspects, solid ion conductors are provided for a zinc-air battery, which incorporates a self-assembled network of branched aramid nanofibers (ANFs) as the mechanically robust, yet flexible skeleton for composite electrolyte membrane. A soft ion-transporting component represented by quaternary ammonia functionalized polyvinyl alcohol (QAFPVA) is introduced into the pores of the branched ANF network, as shown in FIG. 29. Dimethyloctadecyl [3-(trimethoxysilyl)propyl]ammonium chloride (DMOAP) is chosen to functionalize the polyvinyl alcohol (PVA) as shown in the theorized proposed reaction mechanism in FIG. 30. DMOAP is chosen because the existing quaternary ammonium groups contribute to efficient hydroxide ion transport. In a zinc-air battery, oxygen at the positive electrode reacts with the electroactive material (e.g., catalysts) to form hydroxyl ions (OH$^-$). The hydroxyl ions migrate through the electrolyte to the negative electrode that comprises zinc as an electroactive material, where it can form a zincate ($Zn(OH)^{2-}$) that eventual decays into zinc oxide and water and also releases electrons.

In the functionalization process of PVA shown in FIG. 30, the trimethoxy groups on DMOAP are first hydrolyzed to form silanols (Step I). These intermediates are adsorbed onto PVA surface through hydrogen bonding as shown in Step II. The subsequent thermal treatment process in Step III allows these hydrolyzed functional moieties to react with the hydroxyl groups of the PVA chain by forming the interfacial covalent bonds (Si—O—C). In Step IV, the alkaline-exchange process for these attached functional groups by the replacement of the Cl— with OH—, make the composite membrane hydroxide (OH—) conductive.

To confirm the modification process is successful, SEM, FT-IR and XPS analyses are conducted. The FT-IR spectrum of PVA (FIG. 31A) exhibits characteristic peaks between 3000 and 3500 cm$^{-1}$ (—OH vibration), at 2725 cm$^{-1}$ (C—H vibration), and 1659 cm$^{-1}$ (O—H vibration of water absorbed by PVA). After functionalization, the peak between 3000 and 3500 cm$^{-1}$ assigned to the —OH vibration, decreased significantly in the FT-IR spectrum of QAFPVA, and one new small peak at 1093 cm$^{-1}$ (C—O—Si and Si—O—Si) emerged, representing the intermolecular bonds between DMOAP and PVA chains. To corroborate the FT-IR data, the XPS spectrum of QAFPVA (FIG. 31B) shows three small peaks at 103.1 eV (Si2p), 154.1 eV (Si2s), and 403.4 eV (N1s), as well as a significant reduction of the intensity of the peak at 530 eV (O2p), due to the grafting reaction (1). The X-ray diffraction pattern (XRD) (FIG. 31C) and scanning electron microscope (SEM) of QAFPVA suggests that chemical modification with QA groups also reduces crystallinity as indicated by the reduction of the peak at 19.76° and increase ion channel of the polymer, which facilitate ionic conductivity.

In certain variations to enhance ionic conductivity, the solid-state electrolyte 26 may optionally further comprise a multivalent ion salt, such as a divalent ion salt. For example, divalent ions may include zinc ions ($Zn^{2+}$), so that the divalent ion salt may be a salt comprising zinc. In one example, the divalent ion salt may comprise zinc trifluoromethanesulfonate $Zn(CF_3SO_3)_2$. When a divalent ion salt is present, in one embodiment, a ratio of the ionically conductive polymer to divalent ion salt to plurality of nanofibers is about 9:3:1. In other aspects, the multivalent ion may be $Mg^{2+}$ or $Al^{3+}$, by way of non-limiting example.

Generally, the solid-state composite electrolyte may comprise greater than or equal to about 15 wt. % to less than or equal to about 99 wt. %, optionally greater than or equal to about 30 wt. % to less than or equal to about 95 wt. %, optionally greater than or equal to about 50 wt. % to less than or equal to about 95 wt. %, and in certain aspects, and in certain aspects, optionally greater than or equal to about 60 wt. % to less than or equal to about 90 wt. %, and in certain aspects, optionally greater than or equal to about 65 wt. % to less than or equal to about 80 wt. % of the ionically conductive polymeric matrix in the composite electrolyte. Further, the solid-state composite electrolyte may comprise greater than or equal to about 1 wt. % to less than or equal to about 60 wt. %, optionally greater than or equal to about 1 wt. % to less than or equal to about 50 wt. %, optionally greater than or equal to about 3 wt. % to less than or equal to about 40 wt. %, optionally greater than or equal to about 3 wt. % to less than or equal to about 25 wt. optionally greater than or equal to about 3 wt. % to less than or equal to about 15 wt. %, and in certain aspects, optionally greater than or equal to about 5 wt. % to less than or equal to about 10 wt. % of the branched nanofibers in the composite electrolyte. When present, a divalent salt may be present at greater than 0 wt. % to less than or equal to about 50 wt. %, optionally greater than or equal to about 3 wt. % to less than or equal to about 40 wt. %, and in certain aspects, optionally greater than or equal to about 20 wt. % to less than or equal to about 30 wt. % of the salt in the composite electrolyte, where the ranges set forth above for the nanofibers and polymeric matrix may be adjusted accordingly due to the presence of the salt. The composite electrolyte may further comprise minor amounts of other conventional additives, for example, in a cumulative amount of less than or equal to about 5 wt. %.

In certain aspects, the solid-state composite electrolyte may consist essentially of an ionically conductive polymeric matrix comprising, a plurality of branched nanofibers, optionally one or more salts, and optionally one or more conventional additives present in minor amounts listed above that may be mixed together and distributed (e.g., homogeneously) throughout the electrolyte. In certain aspects, the solid-state electrolyte is distinct from a coating applied to a conventional separator formed of conventional separator materials, such that it forms the body of the material itself and provides the desired properties described herein, including flexibility, mechanical strength, ionic conductivity, and the like.

The solid-state electrolyte 26 including the nanofibers 30 and polymeric matrix 32 is porous having a plurality of pores formed within a body of the composite material. The plurality of pores may include a plurality of internal pores and external pores that are open to one another and form continuous flow paths or channels through the electrolyte extending from a first external surface to a second external surface. The solid-state electrolyte may have a porosity of greater than or equal to about 1 vol. % to less than or equal to about 50 vol. %, optionally having a porosity of greater than about 1 vol. % to less than or equal to about 25 vol. %, optionally having a porosity of greater than about 1 vol. % to less than or equal to about 15 vol. %, optionally having a porosity of greater than about 1 vol. % to less than or equal to about 10 vol. %, and in certain aspects optionally having a porosity of less than or equal to about 5 vol. %. In certain variations, the porosity of the network of the branched nanofibers prior to introducing the polymeric matrix may be expressed by a surface area measured by Brunauer-Emmett-Teller (BET) method of greater than or equal to about 150 $m^2g^{-1}$, optionally greater than or equal to about 175 $m^2g^{-1}$, optionally greater than or equal to about 200 $m^2g^{-1}$, optionally greater than or equal to about 210 $m^2g^{-1}$, and in certain variations, greater than or equal to about 214 $m^2g^{-1}$.

As used herein, the terms "pore" and "pores" refer to pores of various sizes (also referred to as pore diameter or average pore diameter), including so-called "macropores" (pores greater than 50 nm diameter), "mesopores" (pores having diameter between 2 nm and 50 nm), "micropores" (pores having diameter of less than 2 nm) unless otherwise indicated, and "nanopores" (generally overlapping with microporous, mesoporous, and macroporous categories having pores with diameters between 2 nm and 100 nm), where the pore size refers to an average or median value, including both the internal and external pore diameter sizes. In certain aspects, a plurality of pores may have an average pore size (also referred to as pore size, pore diameter or average pore diameter) of less than or equal to about 200 nm, for example, from greater than or equal to about 1 nm to less than or equal to about 150 nm, optionally greater than or equal to about 5 nm to less than or equal to about 100 nm, optionally greater than or equal to about 10 nm to less than or equal to about 80 nm, optionally greater than or equal to about 10 nm to less than or equal to about 70 nm, and in certain aspects, optionally greater than or equal to about 20 nm to less than or equal to about 50 nm.

In certain variations, a plurality of pores may be considered to be nanopores or mesopores with an average pore size (also referred to as pore size, pore diameter or average pore diameter) of less than or equal to about 50 nm, for example, from greater than or equal to about 1 nm to less than or equal to about 50 nm, optionally greater than or equal to about 5 nm to less than or equal to about 50 nm, and in certain aspects, optionally greater than or equal to about 20 nm to less than or equal to about 40 nm. It is believed that a relatively narrow pore size distribution with pores sizes ranging from about 20 to about 40 nm helps suppress penetration of any dendrites through the composite material layer.

The solid-state electrolyte 26 thus provides a minimal resistance path for internal passage of ions within the battery 20. In certain aspects, the composite solid electrolyte has an ionic conductivity (δ) of greater than or equal to about 0.001 mS/cm, optionally greater than or equal to about 0.025 mS/cm, optionally greater than or equal to about 0.005 mS/cm, optionally greater than or equal to about 0.075 mS/cm, optionally greater than or equal to about 0.01 mS/cm, optionally greater than or equal to about 0.02 mS/cm, optionally greater than or equal to about 0.025 mS/cm, optionally greater than or equal to about 0.05 mS/cm, optionally greater than or equal to about 0.075 mS/cm, optionally greater than or equal to about 0.1 mS/cm, optionally greater than or equal to about 0.25 mS/cm, optionally greater than or equal to about 0.5 mS/cm, optionally greater than or equal to about 0.75 mS/cm, optionally greater than or equal to about 1 mS/cm, optionally greater than or equal to about 5 mS/cm, optionally greater than or equal to about 10 mS/cm, optionally greater than or equal to about 15 mS/cm, optionally greater than or equal to about 20 mS/cm, optionally greater than or equal to about 25 mS/cm, optionally greater than or equal to about 30 mS/cm, optionally greater than or equal to about 35 mS/cm, optionally greater than or equal to about 40 mS/cm, optionally greater than or equal to about 50 mS/cm, optionally greater than or equal to about 55 mS/cm, optionally greater than or equal to about 58 mS/cm, and in some variations, optionally greater than or equal to about 60 mS/cm.

In certain variations, the solid-state composite electrolyte has an ion exchange capacity (IEC) of greater than or equal to about 2.9 mmol g$^{-1}$ (e.g., ≥2.96 mmol g$^{-1}$) and a high ion concentration of greater than or equal to about 1 mmol cm$^{-3}$ (e.g., ≥1.15 mmol cm$^{-3}$).

The present disclosure provides in various aspects, a flexible composite solid electrolyte material. By "flexible," it is meant that materials, structures, components, and devices are capable of withstanding strain or deformation, including plastic deformation, without fracturing or other mechanical failure. Furthermore, the flexible composite solid electrolyte material subject to such strain or deformation still maintains its functional performance, including ionic conductivity and the like. Flexible materials may also be considered to be stretchable materials, which are thus capable of significant elongation, flexing, bending or other deformation along one or more axes. The term "flexible" can refer to the ability of a material, structure, or component to be deformed (for example, into a curved or stamped shape) without undergoing a permanent transformation that introduces significant strain, such as strain indicating a failure point of a material, structure, or component. Flexible or deformable materials in accordance with certain aspects of the present disclosure are extensible and thus are capable of stretching and/or compression, at least to some degree, without damage, mechanical failure or significant degradation in performance.

"Young's modulus" is a mechanical property referring to a ratio of stress to strain for a given material. Young's modulus may be provided by the expression:

$$E=((stress))/((strain))=\sigma/\epsilon=L_O/\Delta L \times F/A,$$

where engineering stress is $\sigma$, tensile strain is $\epsilon$, E is the Young's modulus, $L_O$ is an equilibrium length, $\Delta L$ is a length change under the applied stress, F is the force applied and A is the area over which the force is applied.

In certain aspects, flexible or stretchable electrolyte composite materials may undergo a maximum tensile strain of at least about 15% without fracturing; optionally greater than or equal to about 50% without fracturing, optionally greater than or equal to about 75% without fracturing, and optionally greater than or equal to about 100% without fracturing.

The composite materials provided by the present disclosure provide excellent ionic conductivity, for example of $Zn^{2+}$, other divalent ions, or hydroxyl ions, along with a high tensile modulus. The high stiffness of the nanofiber network combined with the high ionic conductivity of soft polymer matrix enable effective suppression of dendrites and fast ion (e.g., $Zn^{2+}$) transport. It should be noted that while the composite electrolyte is particularly suitable for conductance of zinc and similar divalent ions or hydroxyl ions, in alternative variations, it may be used with a variety of other battery systems to conduct and transport other ions. By way of non-limiting example, such ions may include magnesium ions ($Mg^{2+}$) or aluminum ions ($Al^{3+}$).

In certain aspects, the solid-state composite electrolyte has a Young's modulus (F) of greater than or equal to about 0.1 GPa, optionally greater than or equal to about 0.2 GPa, optionally greater than or equal to about 0.5 GPa, optionally greater than or equal to about 1 GPa, optionally greater than or equal to about 2 GPa, optionally greater than or equal to about 3 GPa, optionally greater than or equal to about 4 GPa, optionally greater than or equal to about 5 GPa, optionally greater than or equal to about 6 GPa, optionally greater than or equal to about 6.2 GPa, and in certain variations, optionally greater than or equal to about 6.5 GPa.

The solid-state composite electrolyte may be durable and have an ultimate tensile strength ($\sigma$) of greater than or equal to about 50 MPa, optionally greater than or equal to about 55 MPa, optionally greater than or equal to about 60 MPa, optionally greater than or equal to about 70 MPa, optionally greater than or equal to about 75 MPa, optionally greater than or equal to about 80 MPa, optionally greater than or equal to about 90 MPa, optionally greater than or equal to about 100 MPa, optionally greater than or equal to about 110 MPa, and in certain variations, optionally greater than or equal to about 115 MPa.

The solid-state electrolyte may be a layer having a thickness greater than or equal to about 0.1 μm to less than or equal to about 1 mm, optionally greater than or equal to about 0.05 μm to less than or equal to about 100 μm, and in certain aspects, optionally greater than or equal to about 5 μm to less than or equal to about 100 μm.

The negative electrode 24 may comprise a negative electroactive material that may comprise a divalent ion, such as zinc metal foil. The negative electrode current collector 36 may be formed from copper (Cu), stainless steel, or any other electrically conductive material known to those of skill in the art.

The positive electrode 22 may be formed from an electroactive material that can undergo cycling of the divalent ions, such as zinc ions, while functioning as the positive terminal of the battery 20. For example, while not limiting, in certain variations, the positive electrode 22 may be defined by the plurality of positive solid-state electroactive particles. However, it should be noted that the positive electrode 22 is not limited to such a variation and may be in a variety of forms, including a solid electrode, a semi-solid, gas, or liquid electrode. In certain instances, the positive electrode 22 is a composite comprising a mixture of positive electroactive particles, electrically conductive particles, and a binder matrix. In one example, the positive electroactive particle may be one that cycles zinc ions, such as manganese dioxide ($MnO_2$).

In certain variations, where the positive electrode is a composite comprising a plurality of positive electroactive particles, the electroactive particles may be optionally intermingled with one or more electrically conductive materials that provide an electron conduction path and/or at least one polymeric binder material to enhance the structural integrity of the positive electrode 22. Suitable electrically conductive materials may include particles of, for example, carbon-based conductive materials, powdered nickel or other metal particles, or a conductive polymer. Carbon-based conductive materials may include, for example, particles of graphite, acetylene black, carbon fibers, carbon nanotubes, graphene, and the like. The positive solid-state electroactive particles may be optionally intermingled with binders, like polyethylene oxide (PEO), polyvinylidene difluoride (PVDF), polytetrafluoroethylene (PTFE), ethylene propylene diene monomer (EPDM) rubber, nitrile butadiene rubber (NBR), styrene butadiene rubber (SBR), and other binders known in the art.

The positive electrode 22 may include greater than or equal to about 10 wt. % to less than or equal to about 95 wt. %, optionally greater than or equal to about 25 wt. % to less than or equal to about 85 wt. %, and in certain aspects, optionally greater than or equal to about 40 wt. % to less than or equal to about 75 wt. % of the electroactive materials in the positive electrode. The positive electrode 22 may also include greater than or equal to about 0 wt. % to less than or equal to about 50 wt. %, optionally greater than or equal to about 5 wt. % to less than or equal to about 40 wt. %, and in certain aspects, optionally greater than or equal to about 10 wt. % to less than or equal to about 30 wt. % of the one or more electrically conductive additives and greater than or equal to about 0 wt. % to less than or equal to about 30 wt. %, optionally greater than or equal to about 0 wt. % to less than or equal to about 25 wt. %, optionally greater than or equal to about 0 wt. % to less than or equal to about 10 wt. %, and in certain aspects, optionally greater than or equal to about 0 wt. % to less than or equal to about 5 wt. % of the one or more binders.

The positive electrode current collector 34 may be formed from aluminum (Al) or any other electrically conductive material known to those of skill in the art.

In various aspects, the present disclosure provides a composite solid electrolyte that comprises a plurality of nanofibers comprising an aromatic polyamide polymer. The composite solid electrolyte also comprises an ionically conductive polymer. In certain variations, the ionically conductive polymer comprises a poly(alkylene oxide), such as poly(ethylene oxide). In other variations, the ionically conductive polymer may comprise a quaternary ammonia functionalized polyvinyl alcohol (QAFPVA). In certain variations, the composite solid electrolyte may also comprise a divalent ion salt, such as a zinc salt for zinc ion conduction. The divalent ion salt may comprise zinc trifluoromethanesulfonate $Zn(CF_3SO_3)_2$.

In this manner, the present disclosure provides a solid-state electrolyte for divalent ions, such as zinc ions ($Zn^{2+}$), which is a composite of branched aromatic polyamide (aramid) nanofibers (BANFs) and an ionically conductive polymer, by using the nanoscale organization similar to articular cartilage. The solid-state electrolyte thus generally replicates the fibrous structure of articular cartilage, which is known for combining efficient mass transport with high mechanical properties. The resulting composite combines excellent ionic conductivity of $Zn^{2+}$ with a high tensile modulus. The high stiffness of the branched aramid nanofiber (BANF) network combined with the high ionic conductivity of the soft polymer matrix, such as soft poly (ethyleneoxide) or quaternary ammonia functionalized polyvinyl alcohol (QAFPVA), enable effective suppression of dendrites and fast $Zn^{2+}$ transport. The composite displays an ionic conductance ten times higher than the original polymer. Thus, the replacement of the traditional alkaline electrolyte with a BANF composite provided by the present disclosure drastically changes the mechanism of ion transport, electrode processes including the dendrite growth and results into a flexible, optionally rechargeable battery with cyclability of greater than 100 cycles and greater than 90% charge retention. More specifically, the batteries constructed using the nanocomposite electrolyte are rechargeable and have Coulombic efficiency of greater than or equal to about 96% to 100% after 50-100 charge-discharge cycles.

Furthermore, the biomimetic solid-state electrolyte enables the batteries to withstand not only elastic deformation during bending, but also plastic deformation. This unusual combination of properties with the charge storage parameters comparable to those of lithium thin film batteries (Tables 1 and 2) opens to path to lightweight high-capacity batteries with higher load-bearing capabilities and better safety profile than structural batteries with lithium ion chemistry.

TABLE 1

Comparison of electrolyte, capacity and cyclic stability of flexible rechargeable batteries with zinc chemistries.

| Battery System | Ion transport media | Conductive Ions | Capacity ($mAhg^{-1}$) | Cyclic Stability | Reference |
|---|---|---|---|---|---|
| Zn/air battery | Cellulose film | 1 mol/L KOH water solution | 125 | 35 cycles | 1 |
| Zn/air battery | PVA gel film | KOH water solution | 500 | 30 cycles | 2 |
| Zn/Co$_3$O$_4$ battery | PVA-PAA copolymer film | 1 mol/L KOH and $1.0 \times 10^{-3}$ mol/L Zn(Ac)$_2$ water solution | 160 | 2000 cycles 80% capacity retention | 3 |
| Zn/Ni battery | PVA gel film | 2 mol/L KOH water solution | 265 | 1000 cycles 91.4% capacity retention | 4 |

Abbreviations:
PVA: Polyvinyl alcohol;
PAA: Polyacrylic acid;
Zn(Ac)$_2$: Zinc acetate;
KOH: Potassium hydroxide.

[1] Fu, J.; Zhang, J.; Song, X.; Zarrin, H.; Tian, X.; Qiao, J.; Rasen, L.; Li, K.; Chen, Z. A Flexible Solid-State Electrolyte for Wide-Scale Integration of Rechargeable Zinc-air Batteries. *Energy Environ. Sci.* 2016, 9, 663-670.
[2] Xu, Y.; Zhang, Y.; Guo, Z.; Ren, J.; Wang, Y.; Peng, H. Flexible, Stretchable, and Rechargeable Fiber-Shaped Zinc-Air Battery Based on Cross-Stacked Carbon Nanotube Sheets. *Angew. Chemie - Int. Ed.* 2015, 54, 15390-15394.
[3] Wang, X.; Wang, F.; Wang, L.; Li, M.; Wang, Y., Chen, B.; Zhu, Y.; Fu, L.; Zha, L.; Zhang, L.; Wu, Y.; Huang, W. An Aqueous Rechargeable Zn//Co$_3$O$_4$ Battery with High Energy Density and Good Cycling Behavior. *Adv. Mater.* 2016, 4904-4911.
[4] Liu, J.; Guan, C.; Zhou, C.; Fan, Z.; Ke, Q.; Zhang, G.; Liu, C.; Wang, J. A Flexible Quasi-Solid-State Nickel-zinc Battery with High Energy and Power Densities Based on 3D Electrode Design. *Adv. Mater.* 2016, 28, 8732-8739.

TABLE 2

Comparison of electrolyte, capacity and cyclic stability of flexible lithium rechargeable batteries.

| Battery System | Separator Materials | Conductive Ions | Capacity (mAhg$^{-1}$) | Cyclic Stability | Reference |
|---|---|---|---|---|---|
| Li/CNT battery | Glass fiber film | 1 mol/L LiPF$_6$ in EC/DMC (w/w = 1:1) solution | 300 | 40 cycles | 5 |
| Li/graphene battery | CELGARD ™ 2340 | 1 mol/L LiPF$_6$ in EC/DEC (v/v = 1:1) solution | 156 | 1000 cycles | 6 |
| Li/LiMn$_2$O$_4$ battery | Glass fibers film | 1 mol/L LiClO$_4$ in PC solution | 80 | 50 cycles | 7 |
| Li/TiO$_2$ battery | CELGARD ™ 2400 | 1 mol/L LiPF$_6$ in EC/DMC (v/v = 1:1) solution | 147 | 100 cycles with less than 2% capacity loss | 8 |
| Li/MnO$_2$ battery | Pore size alumina | 1 mol/L LiPF$_6$ in EC/DMC (w/w = 3:7) solution | 495 | 40 cycles | 8 |
| Li/Ag Graphene battery | Glass fibers film | 1.5 mol/L LiPF$_6$ in EC/EMC (w/w = 3:7) solution | 339 | 100 cycles | 10 |
| Li/SnO$_2$ Graphene battery | CELGARD ™ 2400 | 1 mol/L LiPF$_6$ in EC/DMC (v/v = 1:1) solution | 625 | 100 cycles | 11 |
| Li/V$_2$O$_5$ battery | CELGARD ™ 2400 | 1 mol/L LiPF$_6$ in EC/DEC (v/v = 1:1) solution | 94.4 | 100000 cycles | 12 |
| Li/S battery | CELGARD ™ 2500 | 1 mol/L LiTFSI in DOL/DME (v/v = 1:1) solution | 740 | 160 cycles | 13 |
| Li/LiCoO$_2$ battery | XEROX ™ paper | 1 mol/L LiPF$_6$ in EC/DEC (v/v = 1:1) solution | 147 | 300 cycles | 14 |
| Li/LiFePO$_4$ battery | Cellulose membrane | 1 mol/L LiPF$_6$ in EC:DEC (v/v = 1:1) solution | 145 | 50 cycles | 15,16 |
| Li/LiFePO$_4$ battery | Cellulose membrane | 1 mol/L LiPF$_6$ in EC:DEC (w/w = 1:1) solution | 146 | — | 17 |

Abbreviations:

LiPF$_6$: Lithium hexafluorophosphate;

LiClO$_4$: Lithium perchlorate;

LiTFSI: lithium bis(trifluoromethylsulfonyl)imide;

EC: ethylene carbonate;

DMC: dimethyl carbonate;

DEC: diethyl carbonate;

PC: propylene carbonate;

EMC: ethyl methyl carbonate;

DOL: 1,3-dioxolane;

DME: 1,2-dimethoxy ethane

[5] Chew, S. Y.; Ng, S. H.; Wang, J.; Novák, P.; Krumeich, F.; Chou, S. L.; Chen, J.; Liu, H. K. Flexible Free-Standing Carbon Nanotube Films for Model Lithium-Ion Batteries. *Carbon N.Y.* 2009, 47, 2976-2983.

[6] Mukherjee, R.; Thomas, A. V.; Krishnamurthy, A.; Koratkar, N. Photothermally Reduced Graphene as High-Power Anodes for Lithium-Ion Batteries. *ACS Nano* 2012, 6, 7867-7878.

[7] Jia, X.; Yan, C.; Chen, Z.; Wang, R.; Zhang, Q.; Guo, L.; Wei, F.; Lu, Y. Direct Growth of Flexible LiMn$_2$O$_4$/CNT Lithium-Ion Cathodes. *Chem. Commun.* 2011, 47, 9669.

[8] Li, N.; Zhou, G.; Fang, R.; Cheng, H.; Li, F.; Cheng, H. TiO$_2$/Graphene Sandwich Paper as an Anisotropic Electrode for High Rate Lithium Ion Batteries. *Nanoscale* 2013, 5, 3-6.

[9] Yu, A.; Park, H. W.; Davies, A.; Higgins, D. C.; Chen, Z.; Xiao, X. Free-Standing Layer-By-Layer Hybrid Thin Film of Graphene-MnO$_2$ Nanotube as Anode for Lithium Ion Batteries. *J. Phys. Chem. Lett.* 2011, 2, 1855-1860.

[10] Dai, Y.; Cai, S.; Yang, W.; Gao, L.; Tang, W.; Xie, J.; Zhi, J.; Ju, X. Fabrication of Self-Binding Noble Metal/Flexible Graphene Composite Paper. *Carbon N.Y.* 2012, 50, 4648-4654.

[11] Wang, D.; Kou, R.; Choi, D.; Yang, Z.; Nie, Z.; Li, J.; Saraf, L. V. Ternary Self-Assembly of Ordered Metal Oxide-graphene Nanocomposites for Electrochemical Energy Storage. *ACS Nano* 2010, 4, 1587-1595.

[12] Lee, J. W.; Lim, S. Y.; Jeong, H. M.; Hwang, T. H.; Kang, J. K.; Choi, J. W. Extremely Stable Cycling of Ultra-Thin V$_2$O$_5$ Nanowire-graphene Electrodes for Lithium Rechargeable Battery Cathodes. *Energy Environ. Sci.* 2012, 5, 9889.

[13] Thieme, S.; Brueckner, J.; Bauer, I.; Oschatz, M.; Borchardt, L.; Althues, H.; Kaskel, S. High Capacity Micro-Mesoporous Carbon-Sulfur Nanocomposite Cathodes with Enhanced Cycling Stability Prepared by a Solvent-Free Procedure. *J. Mater. Chem. A* 2013, 1, 9225-9234.

[14] Hu, L.; Wu, H.; La Mantia, F.; Yang, Y.; Cui, Y. Thin, Flexible Secondary Li-Ion Paper Batteries. *ACS Nano* 2010, 4, 5843-5848.

[15] Pan, R.; Wang, Z.; Sun, R.; Lindh, J.; Edström, K.; Strømme, M.; Nyholm, L. Thickness Difference Induced Pore Structure Variations in Cellulosic Separators for Lithium-Ion Batteries. *Cellulose* 2017, 24, 2903-2911.

[16] Pan, R.; Cheung, O.; Wang, Z.; Tammela, P.; Huo, J.; Lindh, J.; Edström, K.; Strømme, M.; Nyholm, L. Mesoporous Cladophora Cellulose Separators for Lithium-Ion Batteries. *J. Power Sources* 2016, 321, 185-192.

[17] Leijonmarck, S.; Cornell, A.; Lindbergh, G.; Wågberg, L. Single-Paper Flexible Li-Ion Battery Cells through a Paper-Making Process Based on Nano-Fibrillated Cellulose. *J. Mater. Chem. A* 2013, 1, 4671.

This capability make them resilient to different types of damage and enables shape modification of an assembled battery to improve the ability of the battery stack to carry structural loads. This unusual combination of properties with the charge storage parameters comparable to those of lithium thin film batteries (Tables 1 and 2) opens to path to lightweight high-capacity batteries with higher load-bearing capabilities and better safety profile than structural batteries with lithium ion chemistry.

Figure 28:
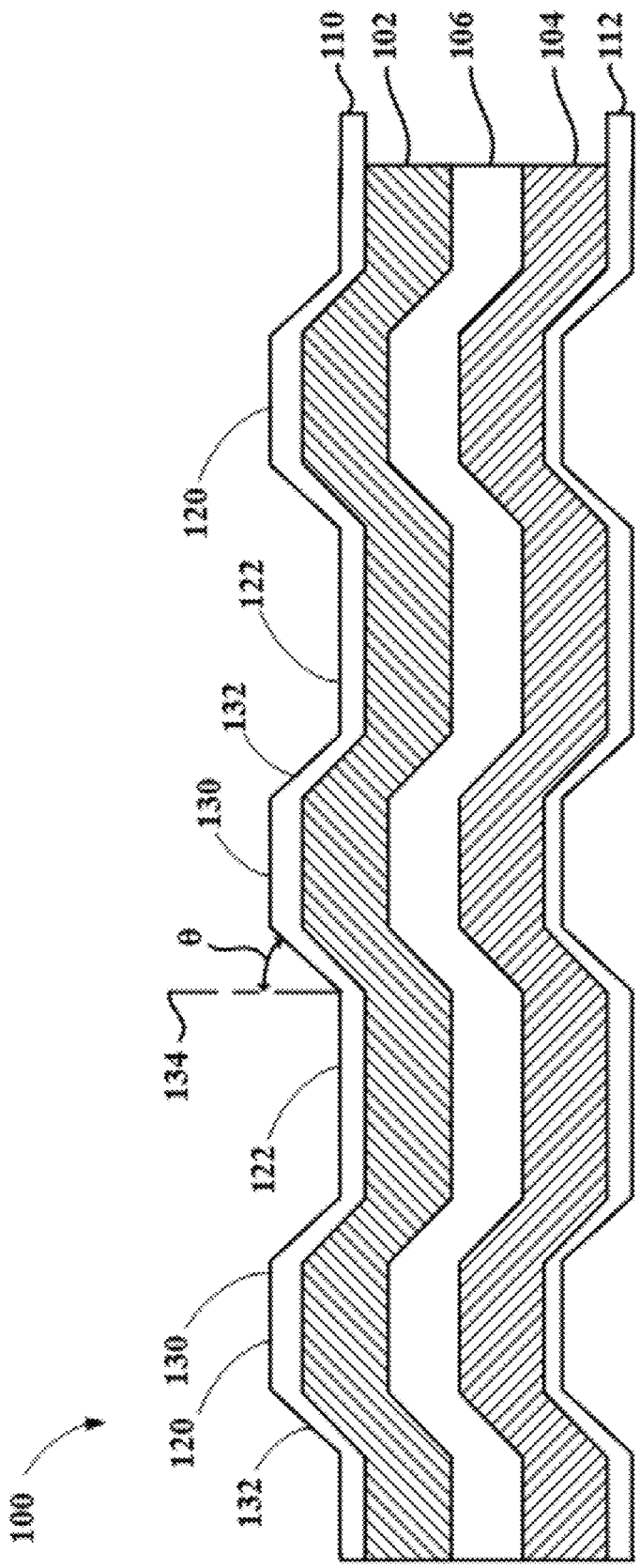
FIG. 28 is an illustration of a solid-state battery comprising a solid-state composite electrolyte and having a corrugated pattern prepared in accordance with various aspects of the present disclosure.

In certain variations, the present disclosure provides structural batteries advantageously capable of load bearing, for example, by defining a corrugated profile that comprises at least one protruding region and at least one recessed region. In certain aspects, the at least one protruding region is a peak region and the at least one recessed region is at least one valley region. FIG. 28 shows one example of such a corrugated solid-state electrochemical cell or battery 100 having a corrugated profile. The battery 100 includes a positive electrode 102 and a negative electrode 104. A composite solid electrolyte 106 prepared in accordance with various aspects of the present teachings is also provided, which includes a plurality of nanofibers comprising an aromatic polyamide polymer and an ionically conductive polymer (not shown). A positive electrode current collector 108 may be in electrical communication with the positive electrode 102 and thus positioned adjacent to the positive electrode 102. Likewise, a negative electrode current collector 110 may be in electrical communication with the negative electrode 104 and thus positioned adjacent to the negative electrode 104. The composite solid electrolyte 106 is disposed between the positive electrode 102 and the negative electrode 104. As shown, the positive electrode 22, the negative electrode 24, and the composite solid electrolyte 106 (as well as the positive electrode current collector 108 and negative electrode current collector 110) together define at least one peak region or ridge 120 and at least one trough or valley region 122. It should be noted that the battery 100 may be a stack of electrochemical cells like the single cell shown in FIG. 28, so while not shown, the battery 100 may include multiple additional layers that commonly define a corrugated surface profile.

As shown, each ridge 120 is spaced apart at predetermined intervals from adjacent ridges 120 and separated by lower valley regions 122. Each corrugation ridge 120 thus protrudes and defines a top 130 and a pair of sides 132. In some example embodiments, the side walls 132 may be oriented at an angle θ with respect to a perpendicular line 134 in relation to the top wall 130. In other examples, the side walls 132 may be perpendicular with respect to the top wall 130. It should also be noted that while not shown, in alternative variations, the plurality of ridges and elongate may define an undulated surface profile, which is periodic and may be in the shape of a sinusoidal wave.

The plurality of ridges 120 may be elongated ridges, or raised portions, of the structural battery 100. Thus, each respective elongate ridge 120 structure or corrugation can define a major longitudinal axis, so that it extends longitudinally. Further, each respective elongate ridge 120 of the plurality is spaced apart from adjacent elongate ridges 120 of the plurality at predetermined intervals to form the corrugated surface pattern. Thus, a plurality of valley regions 122 (e.g., troughs) are defined between the respective elongate ridge 120. It should be noted that a plurality of ridges 120 and valleys 122 need not extend fully from one side of the battery to the other and are not limited to the exemplary configuration and orientation shown. Further, it will be appreciated that while a corrugated surface profile may include repeating parallel peaks/ridges and valleys, other corrugation patterns having protrusions and recesses are also contemplated (for example, having protruding regions defining rectangles with recessed valley regions defined between respective valleys).

The raised ridges 120 or corrugations may be of a generally periodic pattern, meaning that they repeat at regular predetermined intervals. In accordance with various aspects of the present disclosure, specific details and features of the corrugation design and pattern can serve to significantly enhance functionality of the structural battery 100 to help enhance load-bearing capabilities and to reduce potential damage when impacted.

The inventive technology opens a pathway to design and utilization of low-cost structural batteries in the future transportation industry, electronics, biomedical devices and other fields of use. The corrugated batteries can be integrated into a variety of applications, by way of non-limiting example, into specific load-bearing conditions, such as body elements of unmanned aerial vehicles (UAVs), electronic devices, biomedical sensors including wearables, implants, vehicles, including autonomous vehicles (AV) and other devices as main or auxiliary charge storage devices. This functionality has been demonstrated by replacing the covers of several small drones with pouch-like $Zn/BANF/MnO_2$ cells, resulting in an extension of the total flight time. Further, such batteries have been successfully used for powering consumer electronics, like the Apple iPad™ and Apple watch.

Example 1

Preparation of Branched Aramid Nanofibers (BANFs). 1 g of bulk KEVLAR™ pulp from DuPont Co. was dispersed in 500 mL of dimethylsulphoxide (DMSO) (≥99.9%, Sigma Aldrich) by stirring at room temperature in a FILMIX Model 56-L high-speed thin-film mixer. After 2 h, the dispersion was collected and placed in a centrifuge to spin at 10000 rpm for min. BANFs with diameter of about 200-300 nm appeared as a white solid in a sediment. The nanofibers were washed with acetonitrile in a sequence of multiple centrifugation steps to eliminate the DMSO.

Fabrication of poly(ethylene oxide)-zinc trifluoromethanesulfonate $[Zn(CF_3SO_3)_2]$-BANFs (PZB) Composite Ion Conductor (solid electrolyte). PEO with a molecular weight of Mw=300,000 Da, $Zn(CF_3SO_3)_2$ with 98 wt. % purity, and acetonitrile with 99 wt % purity were purchased from Sigma-Aldrich and used as received. 1 g PEO (10 wt. %), 0.33 g $Zn(CF_3SO_3)_2$, and 0.1 g BANFs were dissolved into a 8.61 g acetonitrile and 1-methyl-2-pyrrolidinone (NMP) at weight ratio, 9:1. For other PZB dispersions, the loading of BANFs was varied between 1 wt. % and 15 wt. % in respect to the weight of PEO. The obtained PZB dispersions were vigorously stirred at 50° C. overnight until visible aggregates disappeared. The PZB composite film was prepared by spin-coating followed by the lift off separation of the free-standing composite film. Microscope glass slides for the preparation of PZB film were pre-cleaned by extensive rinsing with deionized (DI) water (18 MΩ cm). 1 mL of PZB solution was dropped onto the glass slide and allowed to spread at 1800 rpm for 2 min. The polymer covers the glass slide smoothly and uniformly. Then composite membrane was dried in vacuum oven at 350° C. overnight. Subsequently, composite membrane was peeled from the glass slide using its own strength. Free-standing PZB membranes were dried between two PTFE plates for one day at room temperature.

Fabrication of Zn/PZB/γ-MnO₂ Cells and Battery Packs. The γ-MnO₂ powder (JCPDS #14-0644) was synthesized by a process reported before. The cathode material layer comprises of 80 wt. % γ-MnO₂, 10 wt. % graphite, and 10 wt. % PEO polymer binder. Graphite was purchased from Sigma Aldrich. PEO polymer binder was dissolved in acetonitrile to make a 5 wt. % solution. The mixture of γ-MnO₂, graphite, and PEO binder was stirred at a speed of 3,000 RPM for 1 minute three times using a planetary mixer. The resulting slurry was then cast onto an aluminum foil substrate using a doctor blade. The electrode was then dried in a vacuum oven for about 10 h at 35° C. Active material (γ-MnO₂) loading was 1.3 mg-1.5 mg/cm$^{-2}$. Before using the cathode material, the MnO₂ layer is pressed for consolidation at the 1,000 MPa at 600° C. to enhance integrity of the material.

The anode layer is zinc foil, with a thickness of 5 μm, purchased from Sigma Aldrich. Pouch-like Zn/PZB/γ-MnO₂ cells were assembled by placing the electrodes face-to-face with the composite PZB film. Assembled cells were connected in series using copper paste as an external connection onto a polyethylene terephthalate (PET) film purchased from Sigma Aldrich serving as a flexible substrate.

Corrugated structural batteries were made from stacked Zn/PZB-931/γ-MnO₂ cells with a size of 5 cm×7 cm. These cells were then connected in series to provide approximately 3.7V potential. This battery pack (weighing approximately 5.6 g) was subsequently connected to the main power source of UAV via parallel configuration to supplement total current flow. It increased the total weight of UAV by about 10%. Even though contribution of the battery is relatively small, this can be optimized for use in the next generation of UAVs.

Structural Characterization. The SEM images were taken with a FEI Nova Nanolab dual-beam FIB SEM. The FT-IR spectra were measured using a Nicolet 6700 spectrometer. The XRD patterns were obtained on a Rigaku Rotating Anode X-Ray diffractometer with Cu Kα radiation generated at 40 kV and 100 mA. X-ray photoelectron spectroscopy (XPS) was recorded on Perkin Elmer PHI 1600 ESCA. Quantachrome Autosorb 6B system was used to characterize the pore width of the BANFs film using nitrogen sorption under 77.4 K. The pore size distributions of the BANFs film was calculated by Barrett-Joyner-Halenda (BJH) methods. The mechanical properties of PEO and PZB composite films were conducted using a TA XT Plus Texture Analyzer (Stable Micro Systems Ltd.). The film was cut into rectangular strips of 20 mm×5 mm, and twenty samples were tested in each case.

Electrochemical Measurements. Electrochemical impedance spectroscopy (EIS) (Autolab Potentiostat and Solartron 1260 frequency response analyzer) was carried out in the range from 100 kHz to 0.05 Hz with potential amplitude of 20 mV. The cell arrangements comprise two zinc electrodes, which acted as blocking electrodes. The resulting Nyquist plots were fitted to an equivalent circuit where ionic conductivity was then calculated from the equation: $\sigma = L/R_b A$, where L is the thickness of the film, Rb is the bulk resistance, and A is the contact area of film. Cyclic voltammetry (CV) curves of the assembled Zn/γ-MnO₂ with PZB were obtained using coin cells with a scan range from 0.8 V to 1.9 V with a scan rate of 0.1 mV s-1. Galvanostatic charge/discharge data was recorded on a LAND-CT2001A battery-testing instrument.

Figure 6:
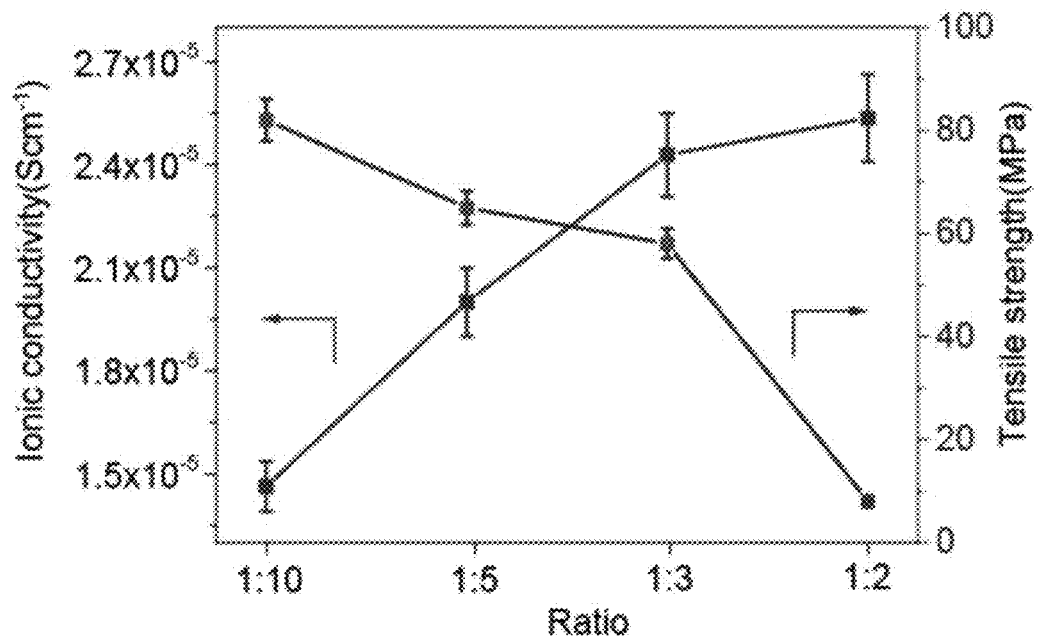
Figure 7:
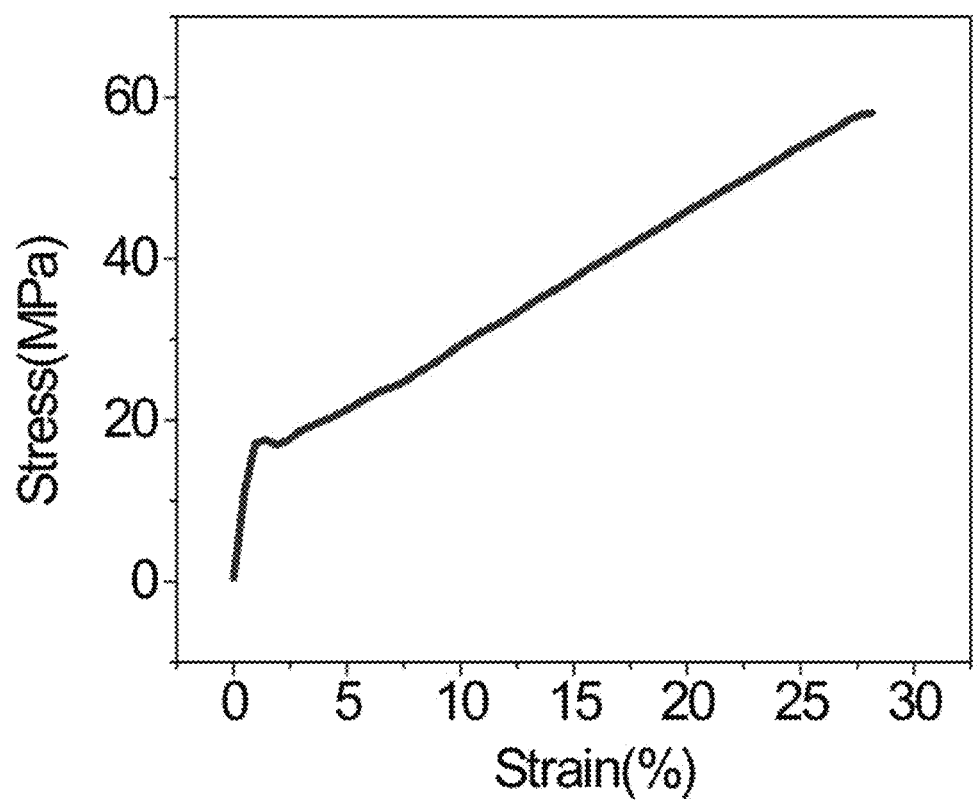

Poly(ethyleneoxide) (PEO, MW=300,000 Da) and Zn(CF₃SO₃)₂ serve as ion-transport components of the non-corrosive solid electrolyte; these components can be compared to the soft proteoglycan portion of natural cartilage. The composition of the PEO:Zn(CF₃SO₃)₂:BANFs (PZB) mixture is optimized with respect to $Zn^{2+}$ conductivity and mechanical properties. High weight ratios of Zn(CF₃SO₃)₂ cause both the increase of ionic conductivity, d and decrease of tensile moduli, E, vividly illustrating the contrarian nature of materials design requirements for fast transport and high mechanical properties. Based on the experimental δ–E dependence (FIG. 6), the optimal Poly(ethylene oxide)-Zinc trifluoromethanesulfonate [Zn(CF₃SO₃)₂]-branched Aramid Nanofibers (BANFs) (PZB) weight ratio is selected to be 9:3:1. This composite is denoted as PZB-931 and this notation will be used throughout the disclosure. PZB-931 combines high ionic conductivity for $Zn^{2+}$ (δ=2.5×10$^{-5}$ S/cm, room temperature 22° C.) (FIG. 6), high tensile strength (σ=58±2.9 MPa) and a high Young's modulus (E=210±11 MPa). Compared to PEO (E=3.3±0.2 MPa), it shows a 64-fold higher Young's modulus compared with composite films based on aligned cellulose fibers and CNTs, the tensile modulus of PZB-931 is seven times higher (FIG. 7 and Table 3).

TABLE 3

Comparison of tensile strength, tensile modulus and elongation at break of PZB biomimetic composite with different BANF loadings.

| | Thickness (μm) | Tensile strength (MPa) | Tensile modulus (MPa) | Elongation at break (%) |
|---|---|---|---|---|
| PEO | 10 ± 0.50 | 23 ± 1.2 | 3.3 ± 0.17 | 690 ± 34 |
| PZB (1 wt. % BANFs) | 10 ± 0.50 | 25 ± 1.3 | 5.1 ± 0.26 | 490 ± 24 |
| PZB (5 wt. % BANFs) | 10 ± 0.50 | 37 ± 1.9 | 22 ± 1.1 | 170 ± 8.5 |
| PZB (10 wt. % BANFs) | 10 ± 0.50 | 58 ± 2.9 | 210 ± 11 | 28 ± 1.4 |
| PZB (15 wt. % BANFs) | 10 ± 0.50 | 54 ± 2.7 | 210 ± 11 | 26 ± 1.3 |

Improvements in E help to minimize or suppress dendrite growth.

Figure 14:
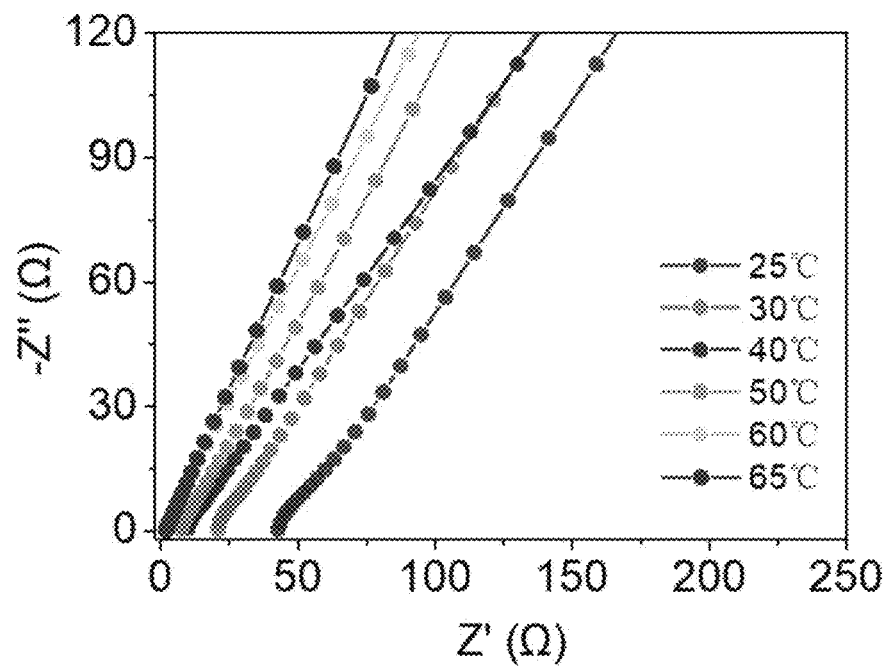

The ionic conductivity for $Zn^{2+}$, δ, of neat PEO infused with Zn(CF₃SO₃)₂ is δ=2.3×10$^{-6}$ S/cm. Addition of BANF decreases the volume fraction of PEO and thus might be expected to reduce the ionic conductivity of the composite. However, surprisingly, the opposite effect is observed. The ionic conductivity for $Zn^{2+}$ increases ten times for BANF-PEO composites made here. Further increase of δ is observed, as expected, at higher temperatures (FIG. 14 and Table 4).

TABLE 4

Comparison of the EIS of the PZB-931 under different temperature conditions.

| Sample with different temperature (° C.) | Resistance (Ohms) | Ionic conductivity (δ, Scm$^{-1}$) |
|---|---|---|
| 25° C. | 43.2 | 2.5 × 10$^{-5}$ |
| 30° C. | 21.2 | 5.1 × 10$^{-5}$ |
| 40° C. | 10.1 | 1.1 × 10$^{-4}$ |
| 50° C. | 7.8 | 1.4 × 10$^{-4}$ |
| 60° C. | 2.3 | 4.7 × 10$^{-4}$ |
| 65° C. | 1.9 | 5.7 × 10$^{-4}$ |

Figures 9A, 9B, 9C, 9D:
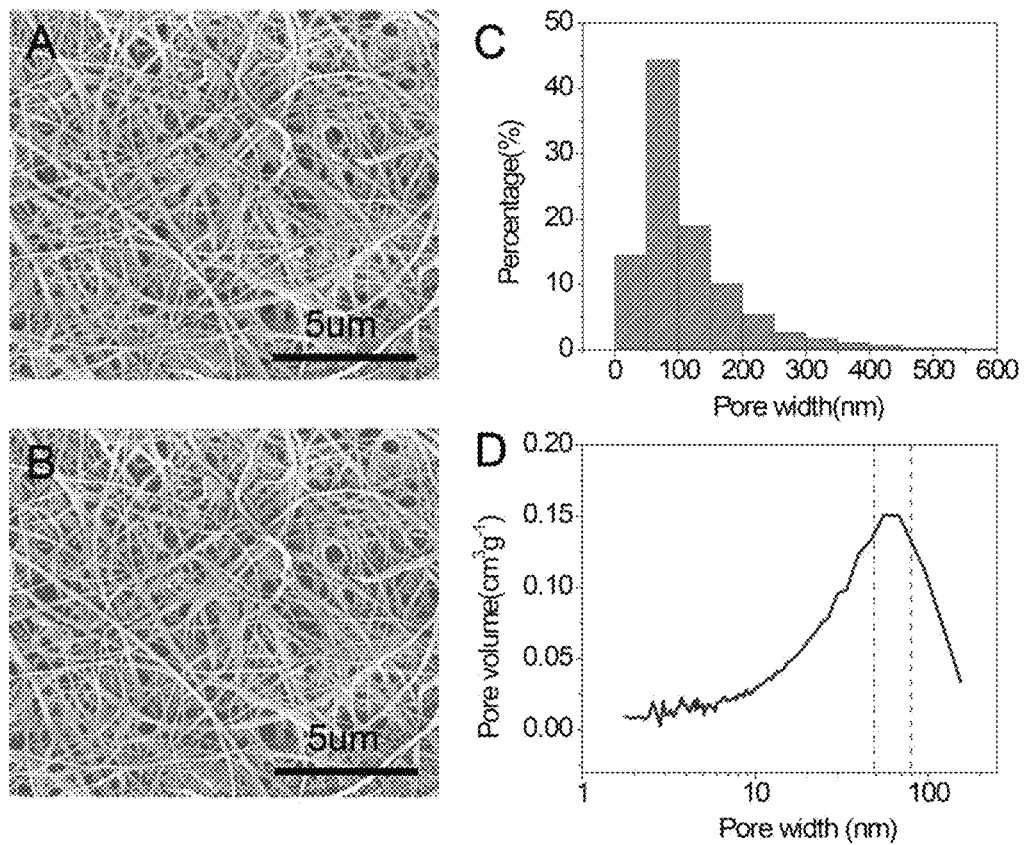
Figure 10:
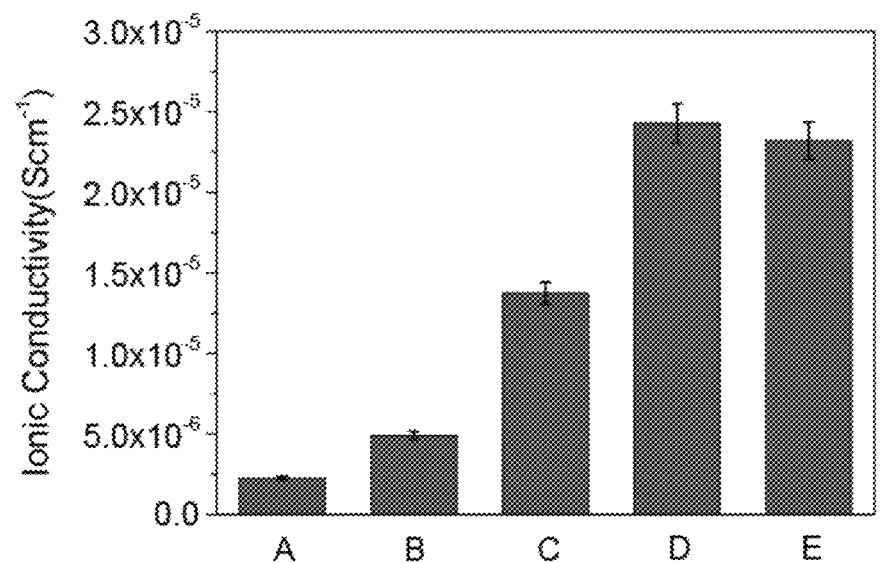
Figure 11:
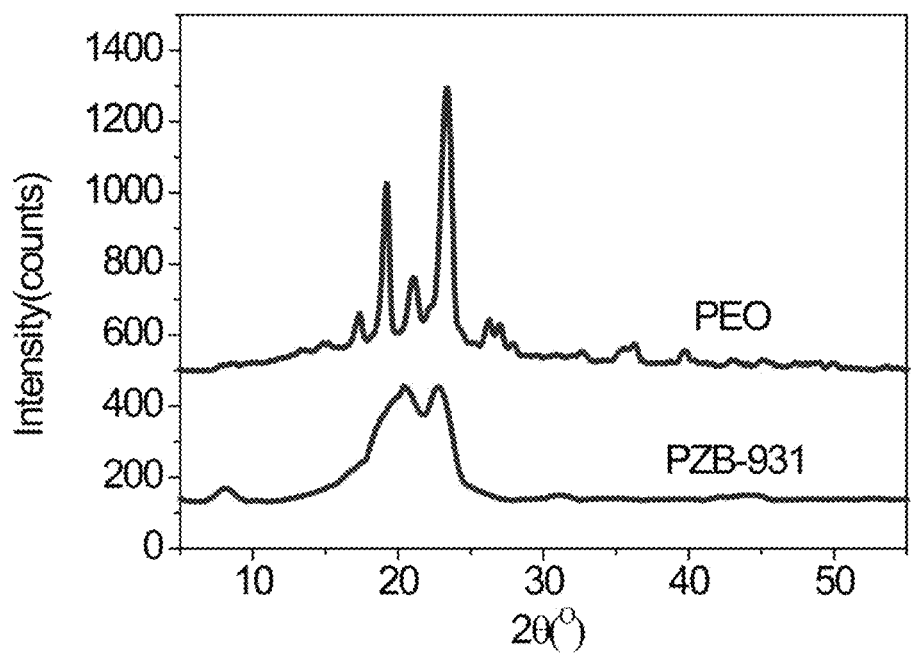
Figure 12:
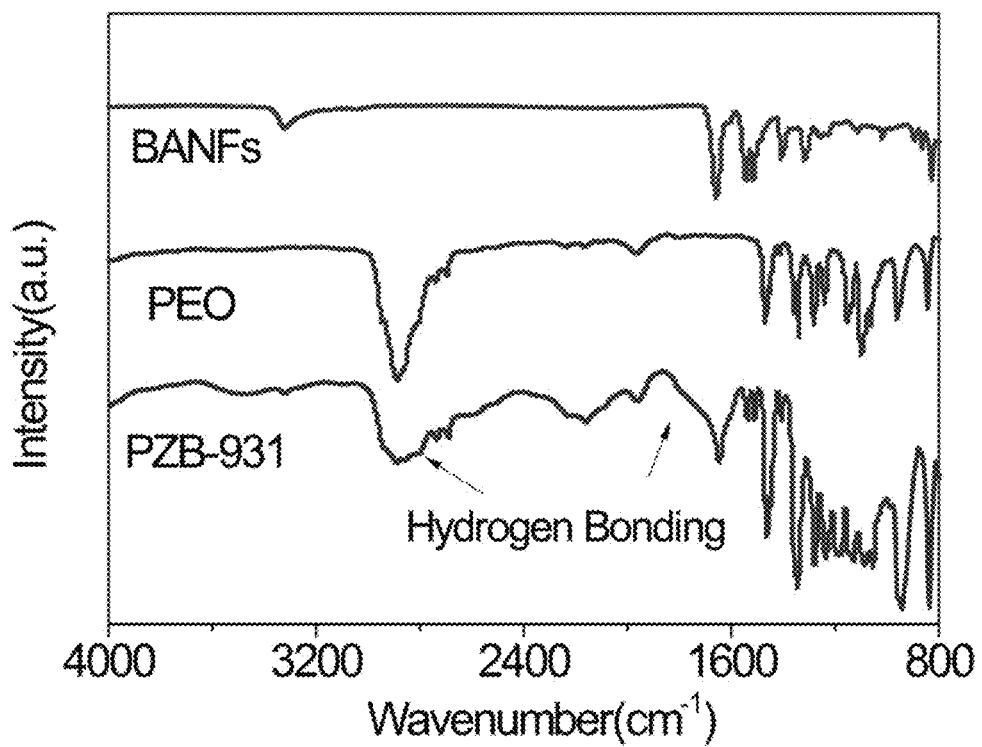
Figure 13:
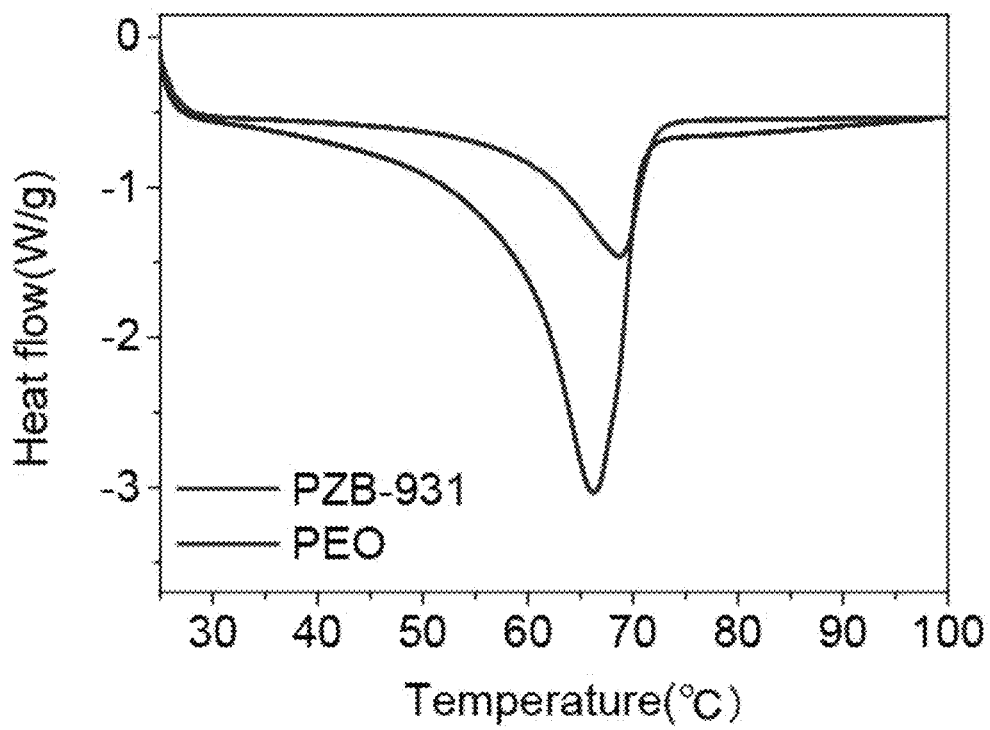

The high ionic conductivity in PZB-931 is ascribed to the amorphous state of the polymer integrated into BANF network of nanofibers. Based on the dependence of d vs BANF loading (FIG. 10), XRD (FIG. 11), FT-IR (FIG. 12) and DSC measurement (FIG. 13), the crystallization of PEO is disrupted due to amphiphilicity of aramid surface and entanglement with BANF network. The typical inter-filament distances in BANF networks is 50-70 nm (FIG. 9), which are three orders of magnitude smaller than the size of the typical PEO crystallites that is ~50,000 nm.

Also important that the inter-filament distances in the BANF network are 10-20 and 2-4 times smaller than the average diameters of stems (1-2 µm) and growth points (approximately 200 nm) of the Zn dendrites (FIG. 1B). The small pore size, high Young's moduli of individual fibrils and elimination of liquid electrolyte differentiate this material from previous concepts of ion-transporting media for $Zn^{2+}$.

Figures 8A, 8B, 8C, 8D, 8E, 8F, 8G, 8H, 8I, 8J:
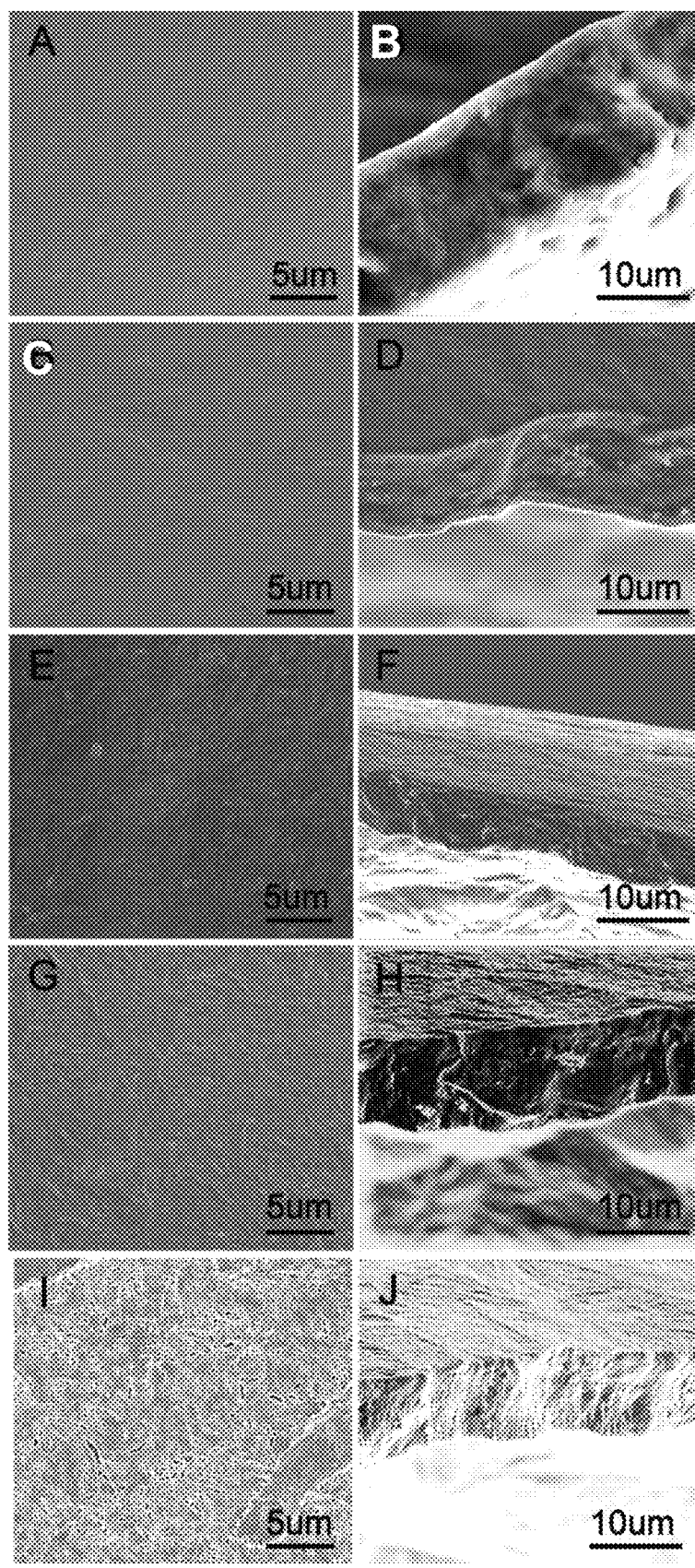

PZB-931 composite also made possible preparation of electrolyte sheets with a thickness as thin as 10±0.50 µm (FIG. 1E, FIG. 8, which is thinner than a typical separator in Zn or Li batteries (typically ranging from 30 µm to 200 µm). These robust sheets are also thinner than ion-conducting glasses in thin-film Li batteries (from 30 µm to 1000 µm). Reduction of the thickness of the ion-transporting media while retaining sufficient overall stiffness, strength, and toughness is highly desirable for all batteries, because it increases the volumetric density and reduces weight of the batteries.

Figures 2A, 2B, 2C, 2D, 2E:
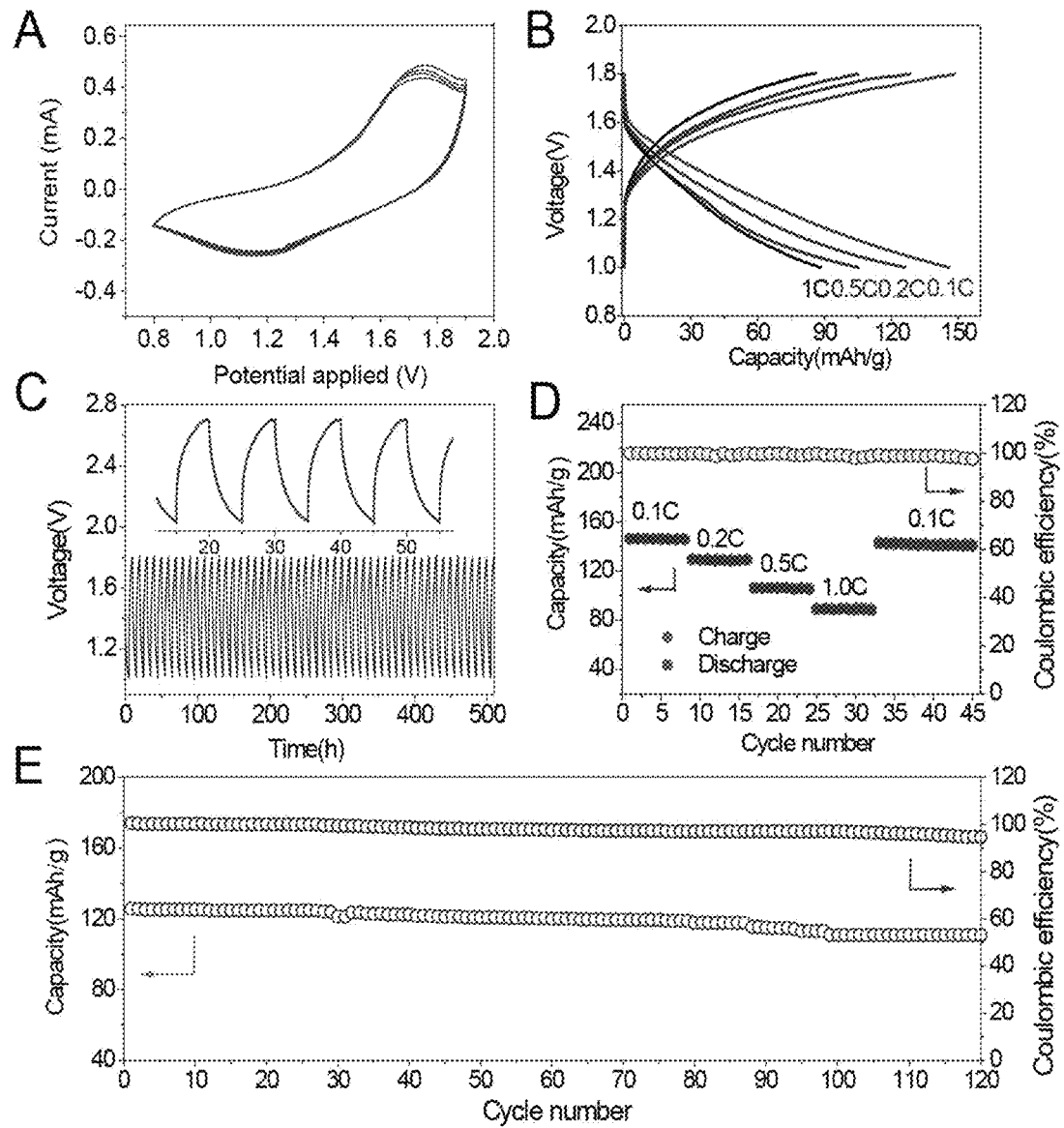
Figure 15:
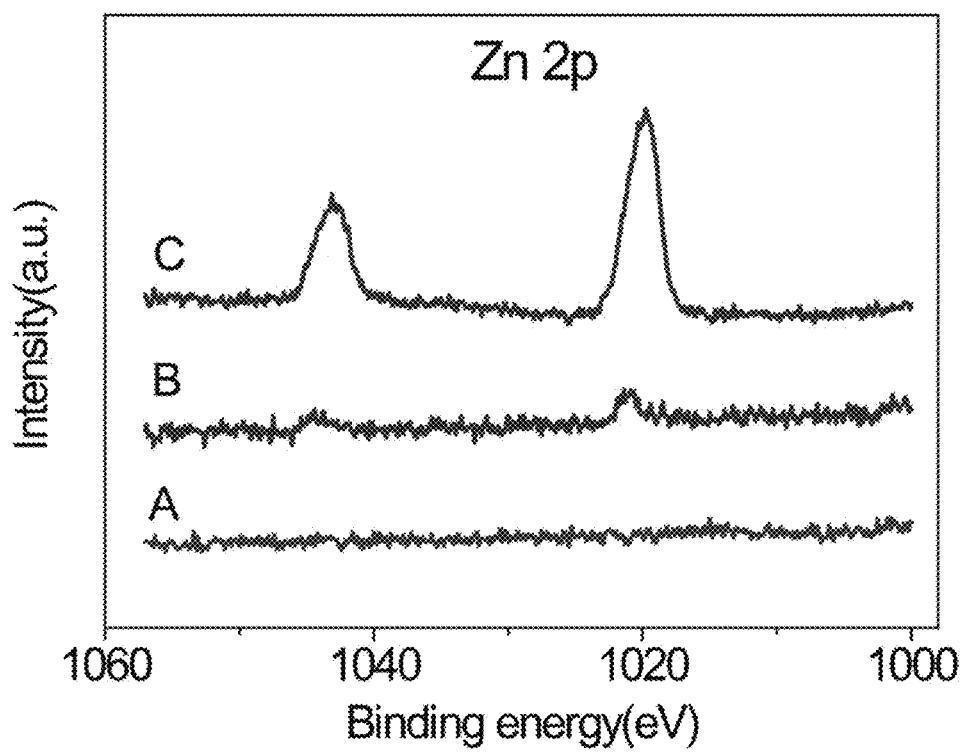
Figure 16:
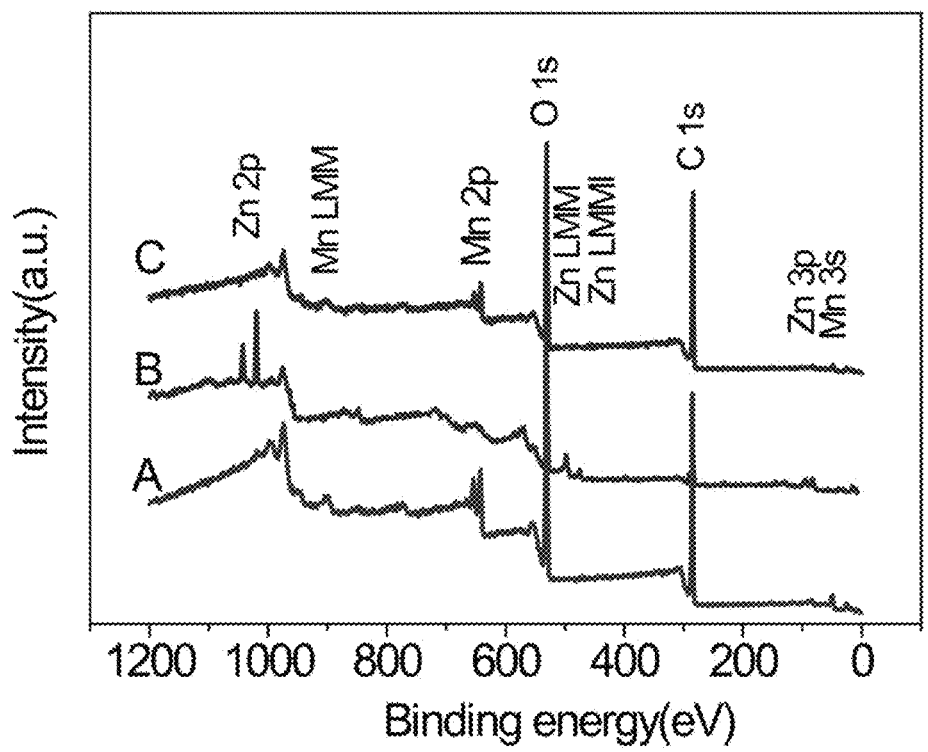
Figure 17:
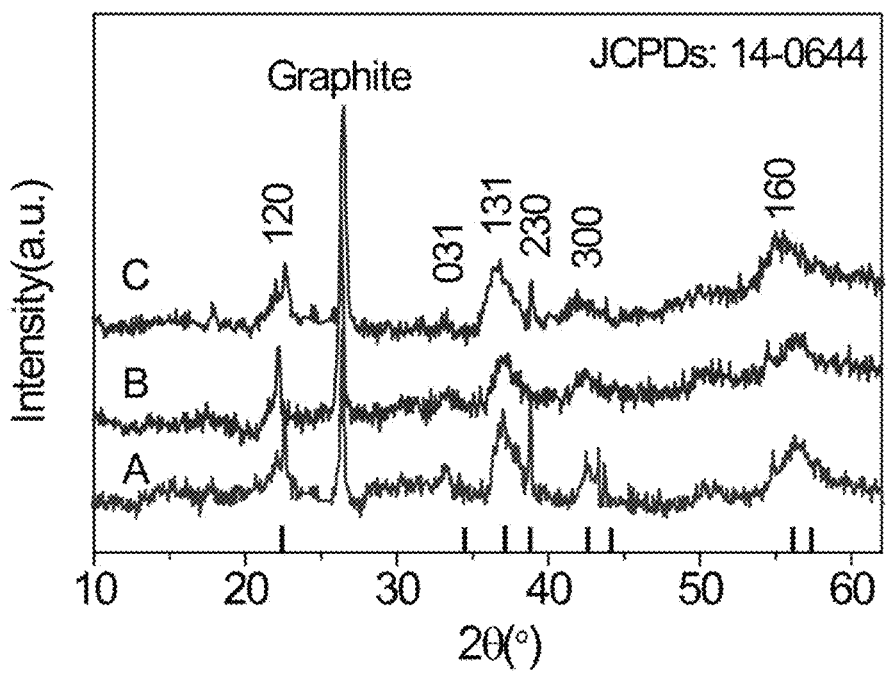

$MnO_2$ was used as a cathode material, in part, because it highlights the transformative effect of the solid electrolyte try (CV) scans (FIG. 2A, Eq. S1), XPS (FIGS. 15 and 16) and XRD (FIG. 17) spectra obtained for the original, Zn-rich, and Zn-depleted states.

Figure 18:
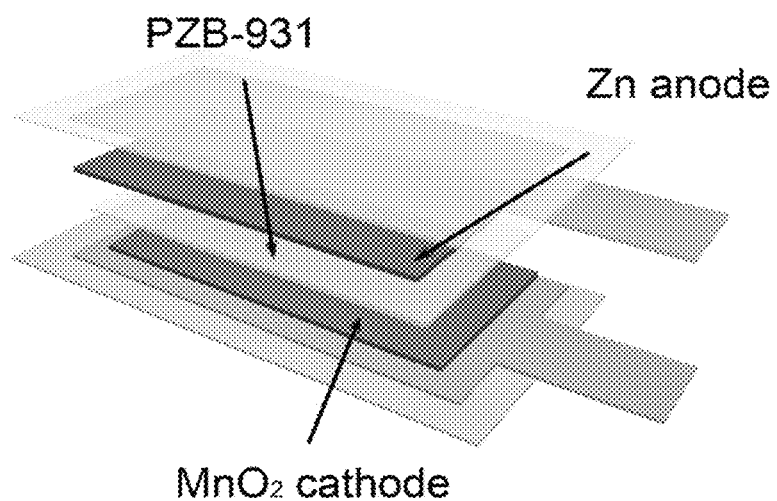
Figure 19:
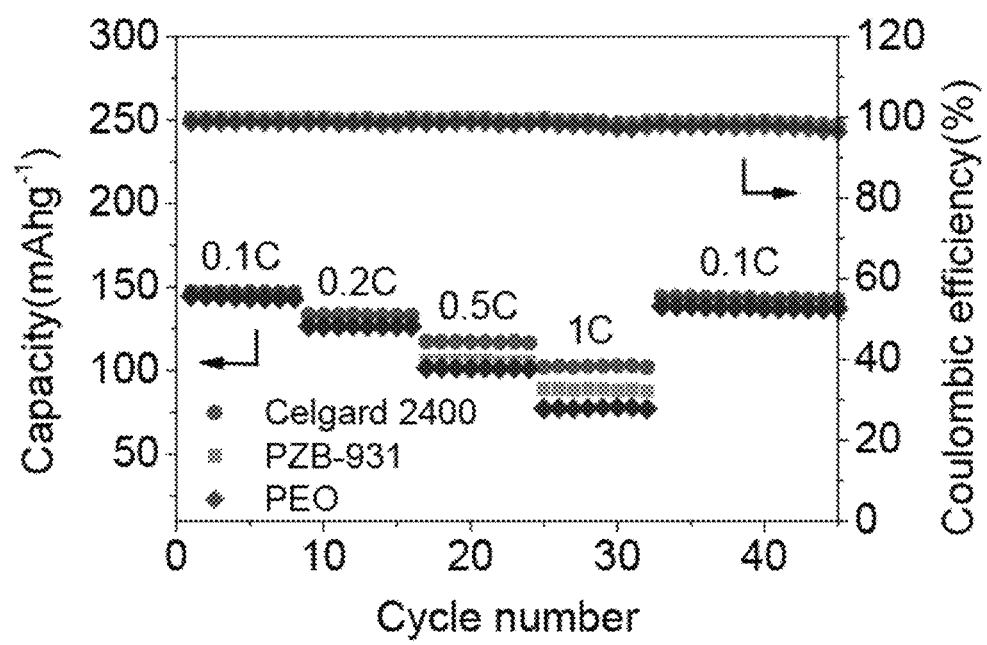
Figure 20A:
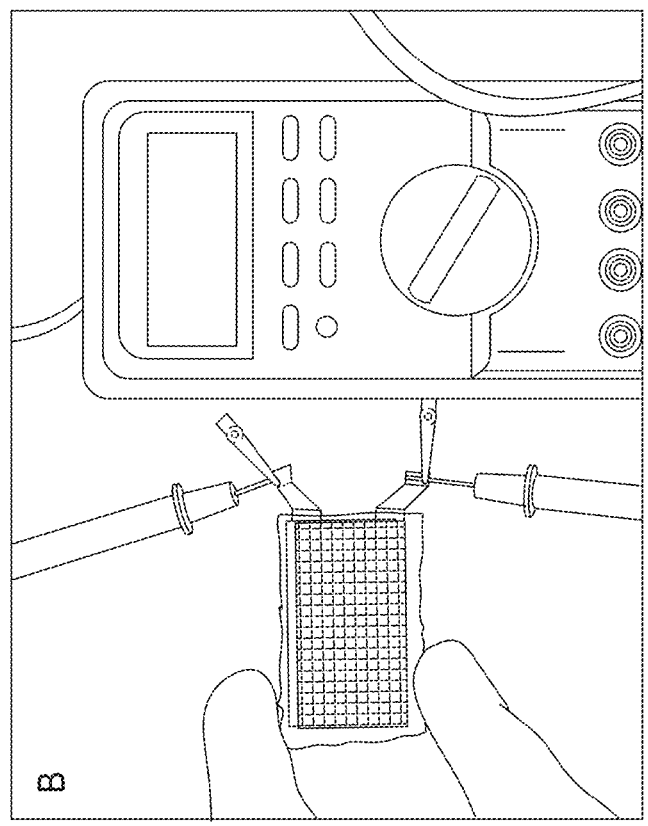
Figure 20B:
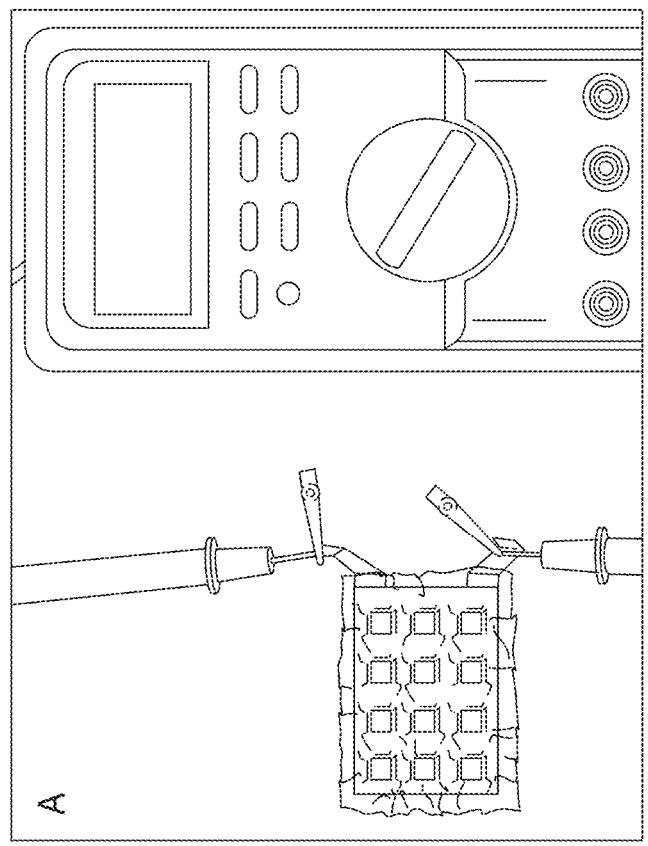
Figures 21A, 21B, 21C, 21D:
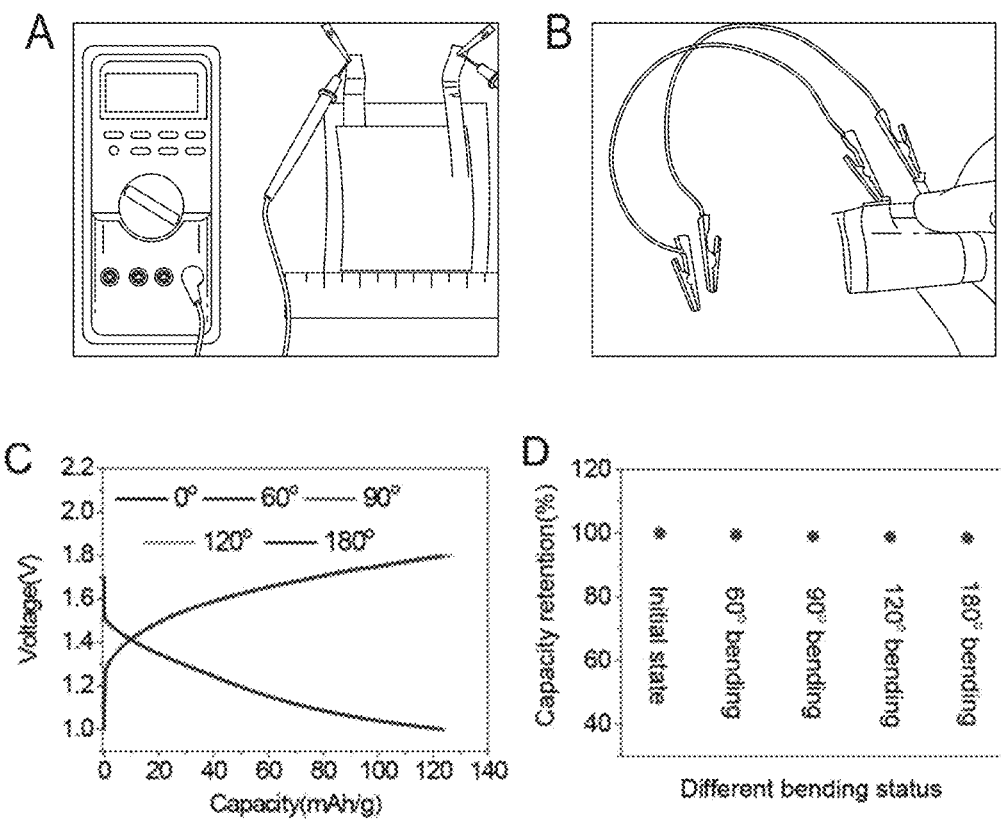
Figure 22:
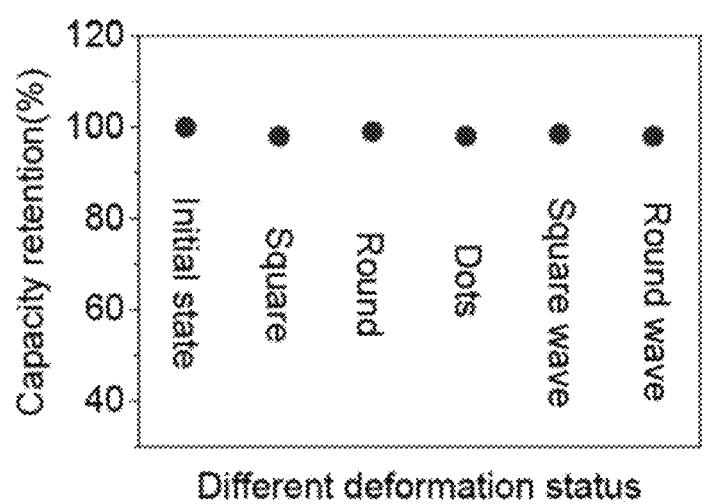
Figure 23:
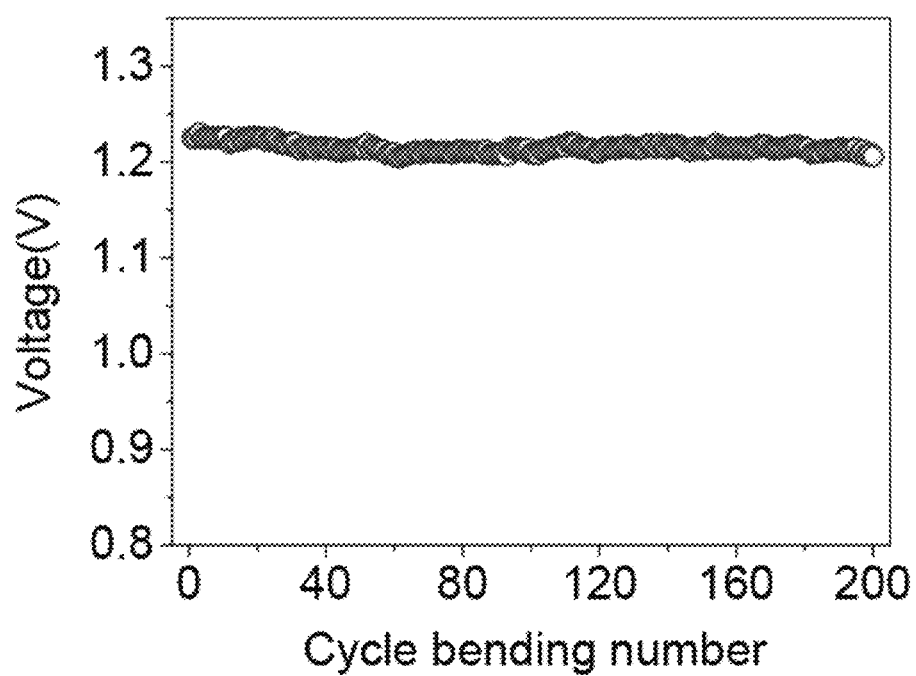
Figures 24A, 24B, 24C:
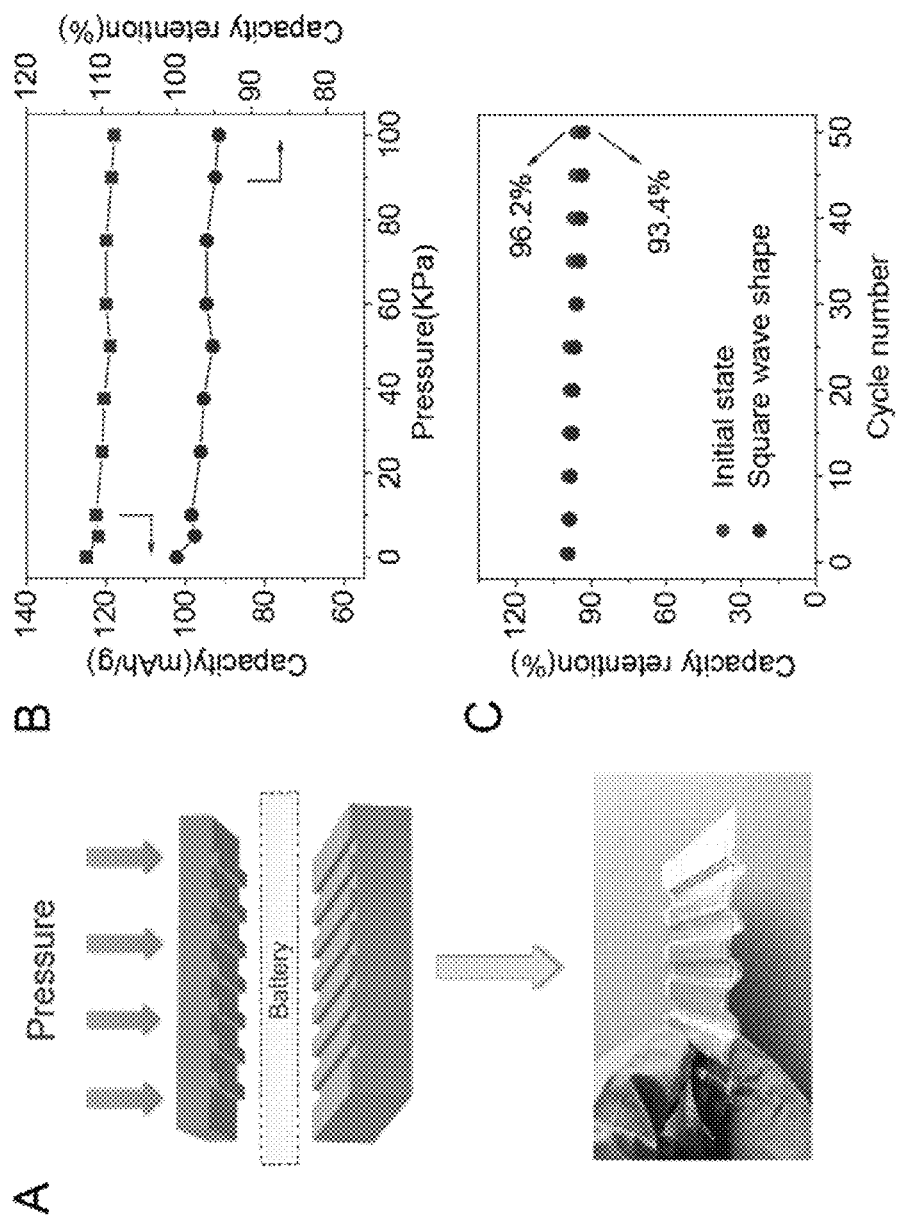
Figure 25:
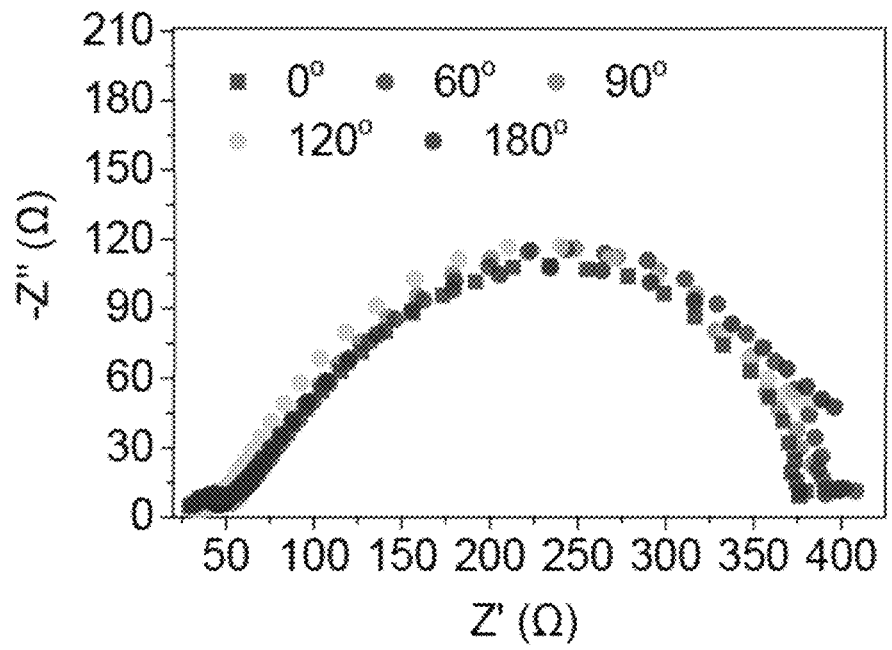
Figure 26:
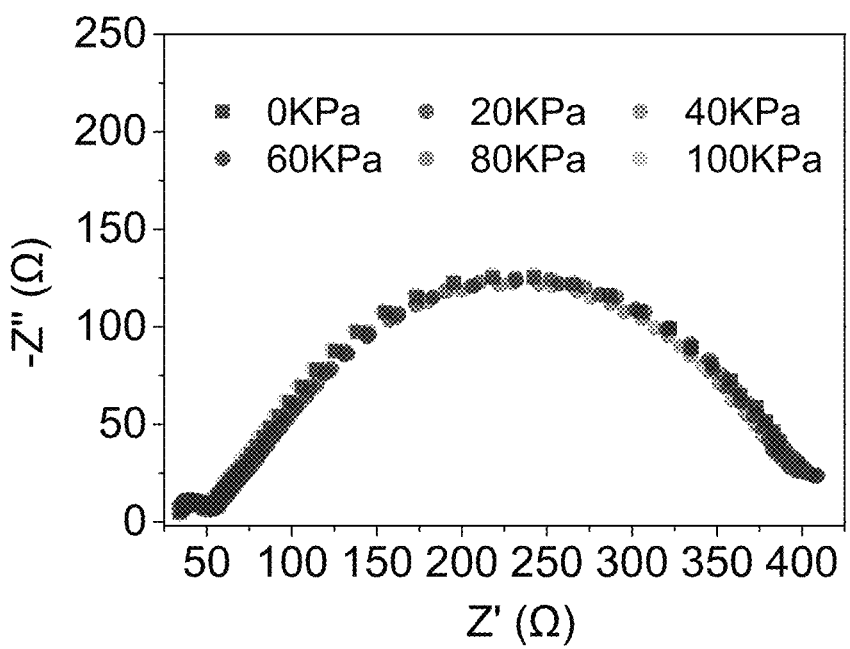

FIG. 18 depicts a full battery cell having a positive current collector, positive electrode (cathode) comprising $MnO_2$ as the positive electroactive material, a PZB-931 solid electrolyte membrane, a negative electrode (anode) comprising zinc as the electroactive material, and a positive current collector. The cycling curves of the full battery cell Zn/PZB-931/γ-$MnO_2$ in FIG. 18 reveals discharge capacities of 146.2, 129.5, 106.7 and 89.2 $mAg^{-1}$ at 0.1, 0.2, 0.5 and 1.0 C (1 C=150 $mAg^{-1}$), respectively (FIGS. 2B and 2D). The voltage initially drops at the beginning of the discharge step due to the internal cell resistance. Specific capacity and Columbic efficiency of Zn batteries with solid-state PZB electrolytes match those with liquid electrolytes (FIG. 19) and substantially better than batteries with solid PEO electrolyte. After 50 cycles (FIG. 2C, 2E), the battery with PZB-931 retains 96% of its highest achievable capacity that is 123.4 $mAhg^{-1}$. Columbic efficiency exceeds that of 90% after 100 cycles (FIG. 2E). Coulombic efficiency was found to be approximately 100% for the initial 50 cycles and 96% at the 100th cycle. The charge storage performance of Zn/PZB-931/γ-$MnO_2$ is competitive with many currently available Zn batteries with liquid and gel electrolytes (Table 5) and flexible Li ion batteries (Table 2).

TABLE 5

Comparison of electrolyte, capacity and cyclic stability of rechargeable batteries with zinc chemistries.

| Battery System | Conductive ion | Capacity ($mAhg^{-1}$) | Cyclic Stability | Ref |
|---|---|---|---|---|
| Zn/α-$MnO_2$ | 2 mol/L $ZnSO_4$ with mol/L $MnSO_4$ water solution | 285 $mAhg^{-1}$ | 5000 cycles 92% capacity retention | 18 |
| Zn/α-$MnO_2$ | Gelatin and PAM gel separator | 306 $mAhg^{-1}$ | 1000 cycles 97% capacity retention | 19 |
| Zn/α-$MnO_2$ | 1 mol/L $Zn(NO_3)_2$ | 210 $mAhg^{-1}$, | 100 cycles | 20 |
| Zn/β-$MnO_2$ | 3 mol/L $Zn(CF_3SO_3)_2$ with/without 0.1 mol/L $Mn(CF_3SO_3)_2$ | 225 $mAhg^{-1}$ | 2000 cycles 94% capacity retention | 21 |
| Zn/Zn$MnO_2$ | 3 mol/L $Zn(TFSI)_2$ water solution | 150 $mAhg^{-1}$ | 500 cycles 94% capacity retention | 22 |
| Zn/Zn$V_2O_5$ | 1 mol/L $ZnSO_4$ water solution | 300 $mAhg^{-1}$ | 1000 cycles 80% capacity retention | 23 |
| Zn/$V_2O_5$ | 0.5 mol/L $Zn(TFSI)_2$ water solution | 170 $mAhg^{-1}$ | 120 cycles | 24 |
| Zn/$VS_2$ | 1 mol/L $ZnSO_4$ water solution | 195 $mAhg^{-1}$ | 200 cycles 98% capacity retention | 25 |
| Zn/$Co_3O_4$ | KOH $Zn(Ac)_2$ water solution | 135 $mAhg^{-1}$ | 2000 cycles 80% capacity retention | 3 |

Figures 3A, 3B, 3C, 3D, 3E, 3F, 3G, 3H:
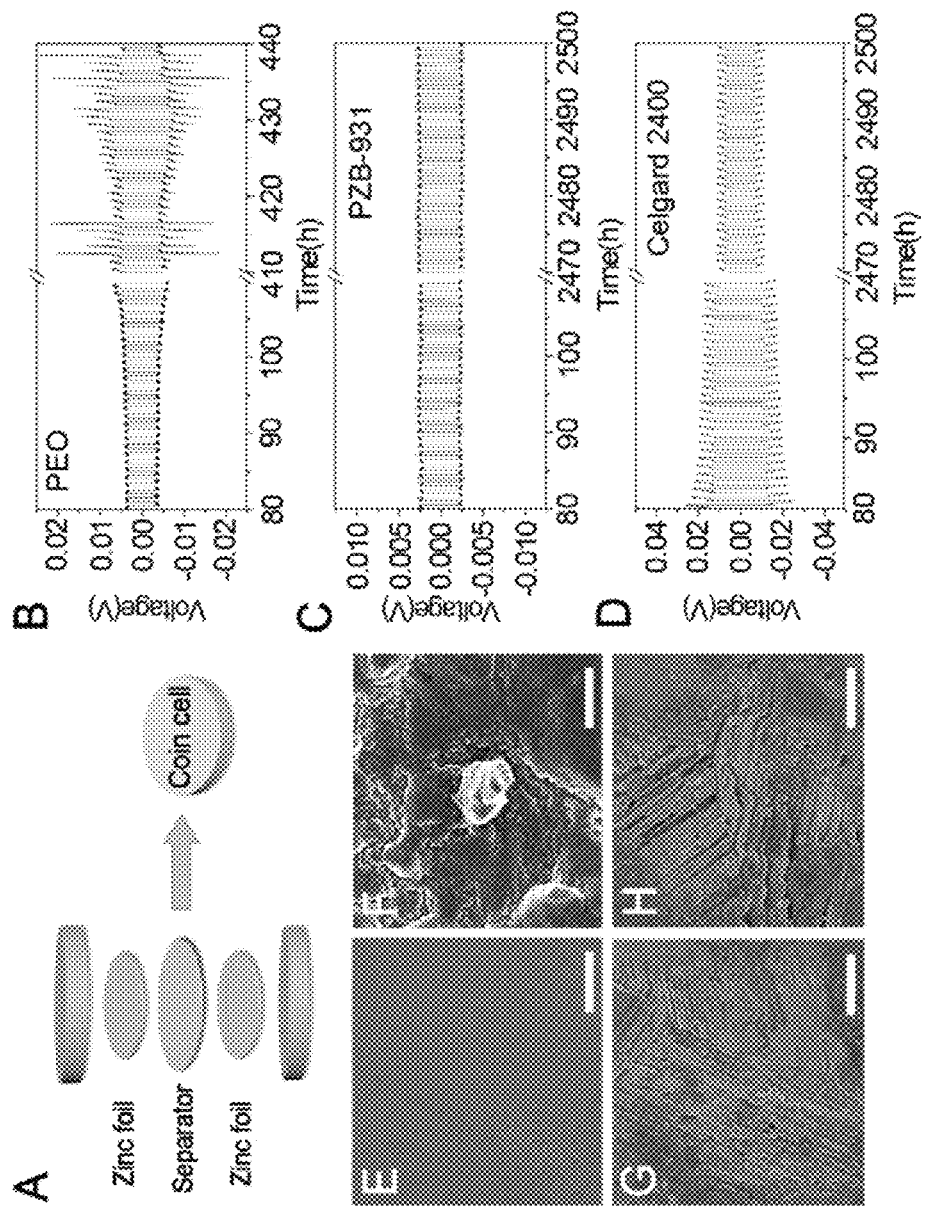

[18] Pan, H.; Shao, Y.; Yan, P.; Cheng, Y.; Han, K. S.; Nie, Z.; Wang, C.; Yang, J.; Li, X.; Bhattacharya, P.; Mueller, K. T.; Liu, J. Reversible Aqueous Zinc/Manganese Oxide Energy Storage from Conversion Reactions. *Nat. Energy* 2016, 1, 16039.
[19] Li, H.; Han, C.; Huang, Y.; Huang, Y.; Zhu, M.; Pei, Z.; Xue, Q.; Wang, Z.; Liu, Z.; Tang, Z.; Wang, Y.; Kang, F.; Li, B.; Zhi, C. Environmental Science An Extremely Safe and Wearable Solid-State Zinc Polymer Electrolyte. 2018, 941-951.
[20] Xu, C.; Li, B.; Du, H.; Kang, F. Energetic Zinc Ion Chemistry: The Rechargeable Zinc Ion Battery. *Angew. Chemie - Int. Ed.* 2012, 51, 933-935.
[21] Zhang, N.; Cheng, F.; Liu, J.; Wang, L.; Long, X.; Liu, X.; Li, F.; Chen, J. Rechargeable Aqueous Zinc-Manganese Dioxide Batteries with High Energy and Power Densities. *Nat. Commun.* 2017, 8, 1-9.
[22] Zhang, N.; Cheng, F.; Liu, Y.; Zhao, Q.; Lei, K.; Chen, C.; Liu, X.; Chen, J. Cation-Deficient Spinel $ZnMn_2O_4$ Cathode in $Zn(CF_3SO_3)_2$ Electrolyte for Rechargeable Aqueous Zn-Ion Battery. *J. Am. Chem. Soc.* 2016, 138, 12894-12901.
[23] Kundu, D.; Adams, B. D.; Duffort, V.; Vajargah, S. H.; Nazar, L. F. A High-Capacity and Long-Life Aqueous Rechargeable Zinc Battery Using a Metal Oxide Intercalation Cathode. *Nat. Energy* 2016, 1, 16119.
[24] Senguttuvan, P.; Han, S. D.; Kim, S.; Lipson, A. L.; Tepavcevic, S.; Fister, T. T.; Bloom, I. D.; Burrell, A. K.; Johnson, C. S. A High Power Rechargeable Nonaqueous Multivalent Zn/$V_2O_5$ Battery. *Adv. Energy Mater.* 2016, 6.
[25] He, P.; Yan, M.; Zhang, G.; Sun, R.; Chen, L.; An, Q.; Mai, L. Layered $VS_2$ Nanosheet-Based Aqueous Zn Ion Battery Cathode. *Adv. Energy Mater.* 2017, 7, 2-6.
[3] Wang, X.; Wang, F.; Wang, L.; Li, M.; Wang, Y.; Chen, B.; Zhu, Y.; Fu, L.; Zha, L.; Zhang, L.; Wu, Y.; Huang, W. An Aqueous Rechargeable Zn//$Co_3O_4$ Battery with High Energy Density and Good Cycling Behavior. *Adv. Mater.* 2016, 4904-4911.

on the battery functionality and design. The reversibility of γ-$MnO_2$ with respect to storage of $Zn^{2+}$ ions with PZB-931 as ion-transport media was established by cyclic voltamme- The effective dendrite suppression by PZB-931 engenders rechargeability of the battery and long cyclability performance. To experimentally demonstrate dendrite suppression by PZB-931, electrochemical processes in a symmetrical Zn/PZB-931/Zn cell are evaluated for charge-discharge cycles promoting dendrite growth (FIG. 3A). The cell with a neat PEO film (FIG. 3B) shows voltage oscillations caused by the unstable electrode/electrolyte interface due to mechanical detachment of the PEO film from the Zn under pressure of dendrites. During cycling for 440 h, zinc dendrites pierced the separator, resulting in a short-circuit. An identical cell with CELGARD™ 2400 impregnated with an organic liquid electrolyte based on $Zn(CF_3SO_3)_2$ (FIG. 3D) shows a steady decrease in its voltage, indicating the so-called 'soft shorting' when dendrites are slowly penetrating the ion-transporting separator membrane (FIG. 1B). Under the same conditions, the symmetrical cell with PZB-931 exhibits cycling stability with negligible potential loss or fluctuation (FIG. 3C). After cycling for as long as 2,500 hours, no sign of cell failure is observed, indicating that the growth of Zn dendrites is effectively suppressed. Despite electrochemical conditions promoting the dendrite growth, the scanning electron microscopy (SEM) evaluation of the electrodes after 500 hours of cycling shows pristine zinc electrodes (FIGS. 3E to 3H).

Figures 4A, 4B, 4C, 4D, 4E, 4F, 4G, 4H, 4I, 4J:
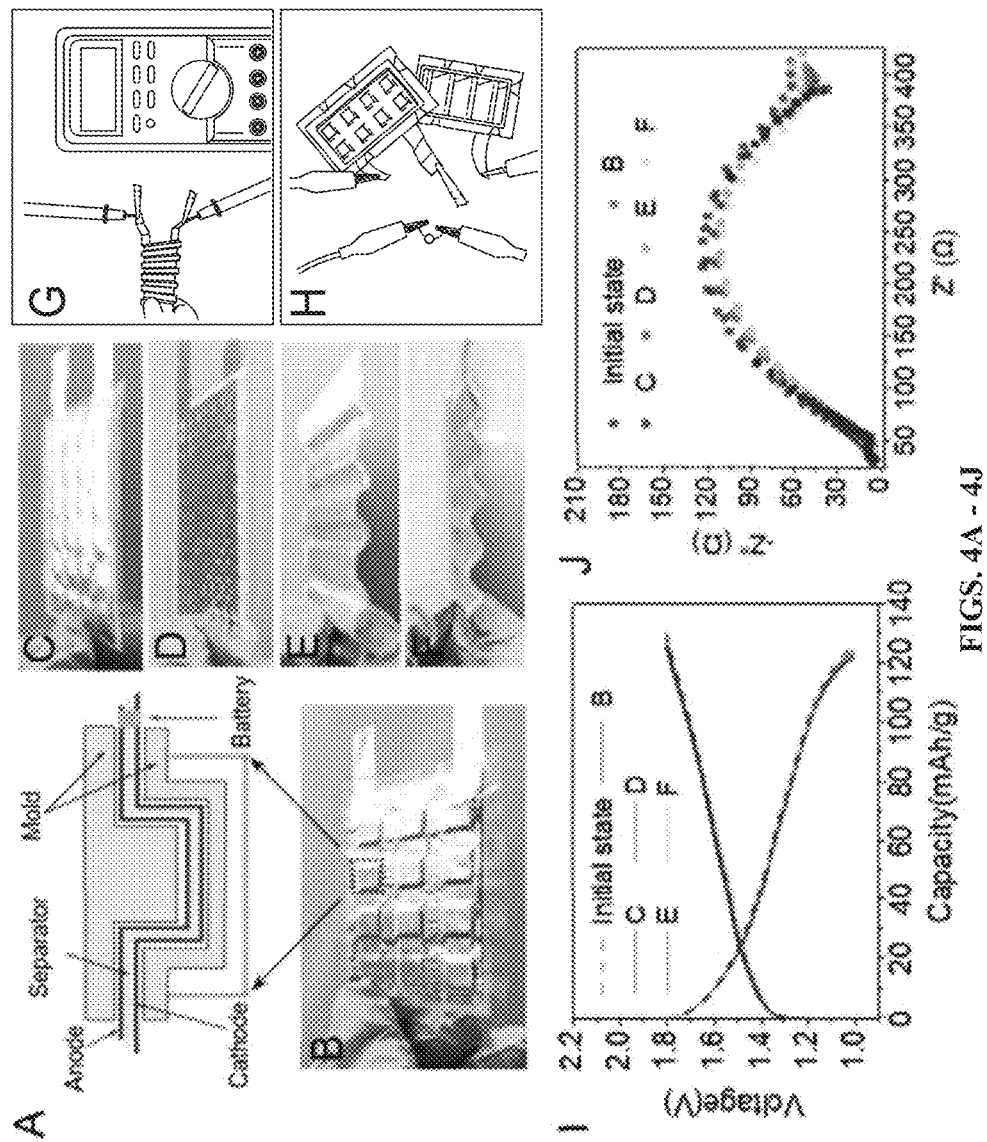
Figures 5A, 5B, 5C, 5D:
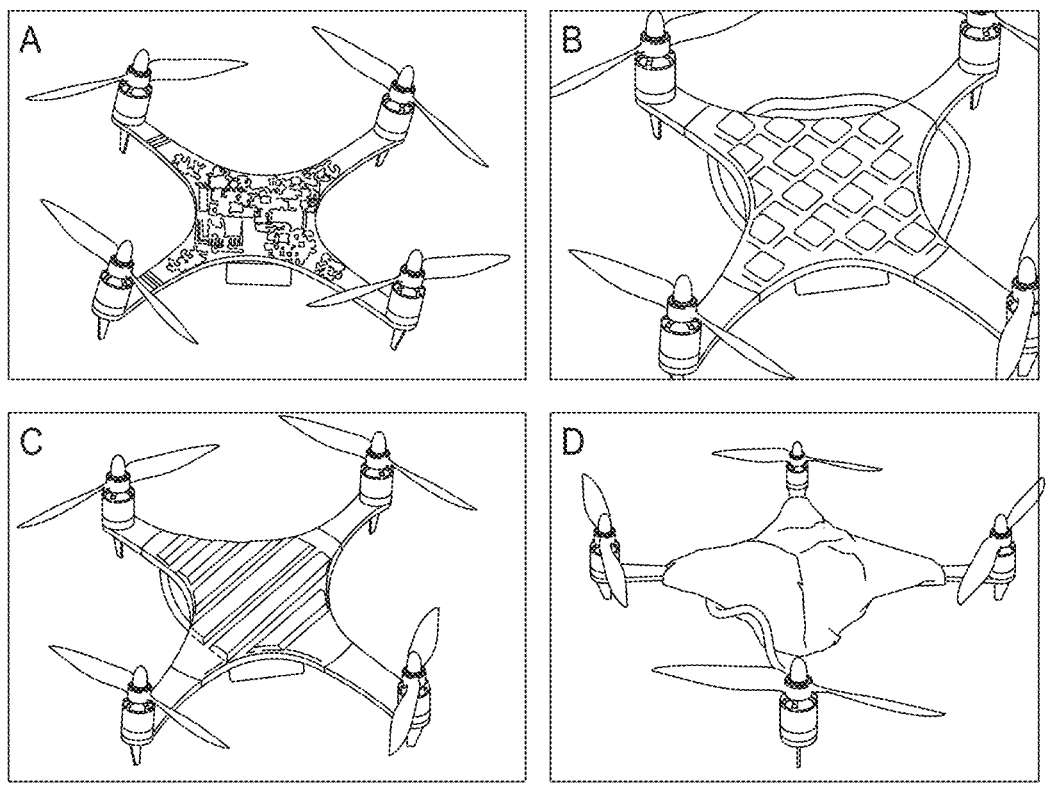

The biomimetic composite PZB-931 prepared in accordance with certain aspects of the present disclosure thus enables the Zn batteries to become not only rechargeable, but also deformable. The batteries are found to be capable of withstanding damage that would be impossible for other batteries (FIGS. 4A to 4H, FIGS. 20 and 21). For example, FIG. 4A shows a schematic of the two-part mold used for plastic deformation studies. FIGS. 4B to 4F show the Zn battery with solid-state biomimetic electrolyte PZB-931 in a variety of different plastically deformed shapes, including corrugated surface profiles. More specifically, Zn batteries with PZB-931 are corrugated by molds (FIG. 4A) with different "teeth" shaped as square (FIG. 4B), half-sphere (FIG. 4C), dot (FIG. 4D), square wave (FIG. 4E), or round wave (FIG. 4F). The battery voltage and capacity remained virtually unchanged and its power showed no significant decay under a variety of deformation conditions (FIG. 22) and corrugated states (FIGS. 22 to 25).

FIG. 4G shows an open circuit voltage of Zn/PZB-931/ $\gamma$-$MnO_2$ battery with square wave shape plastic deformation FIG. 4I shows that galvanostatic charge and discharge curves of Zn/PZB-931/$\gamma$-$MnO_2$ at 0.2 C for the corrugation batteries shown in FIGS. 4B-4F. FIG. 4J shows a comparison of EIS curves for original and plastically deformed corrugation batteries in FIGS. 4B-4F. No change in FIS can be observed even for high degree of plastic deformation as in FIG. 4B, indicating high damage tolerance. While the elastic deformations have been extensively shown for different types of batteries before, the ability to withstand plastic deformations while retaining the charge storage functions was not. While plastic deformability has obvious limits, the constancy of the EIS (FIG. 4J, FIGS. 25 and 22) and galvanostatic charge and discharge (FIG. 4I) for the studied range of deformations is remarkable. Furthermore, the battery was stabbed and cut in various places multiple times, and it still held the voltage. Resilience to this kind of damage while having no leaking fluids or cracks is crucial for safety of, for instance ground and aerial vehicles employing such batteries. The multi-parameter comparison with other flexible batteries indicates that these batteries are comparable or exceeding the corresponding parameters of other batteries based both on Li and Zn chemistries (Table 1, Table 2, and Table 5).

In FIG. 4H, an LED light is powered by the two serial structural batteries.

The Zn/PZB-931/$\gamma$-$MnO_2$ pouch cells similar those in FIG. 4 are tested as structural batteries for UAVs. Taking advantage of the plastic deformability of these devices, they are shaped to replace covers of UAVs enabling them to serve as auxiliary charge storage devices supplementing main power source with lithium ion chemistry. The lightness of the auxiliary battery pack afforded by the replacement of the liquid electrolyte with thin layers of dendrite suppressing PZB-931 composite is essential for structural batteries in aerial vehicles. The versatility of the present approach of utilization of structural batteries in UAVs was demonstrated for several commercially available drones of different types and power requirements (FIGS. 5A-5D). In all cases, successful take off with charge-storage covers and extension of the flight time was observed. The structural Zn batteries were connected to the power circuits of the drones as secondary energy sources serving as multifunctional structural elements akin load-bearing parts of nearly all living creatures. Given the battery characteristics from FIGS. 2A-2E, the flight time extension was calculated to be between 5 and 27% depending on the mass of the drone ambient temperature, flight patterns, and size of the batteries.

Example 2

This example pertains to formation of a solid electrolyte composite membrane formed of quaternary ammonia-functionalized poly(vinyl alcohol) (QAFPVA) and branched aramid nanofibers and its use in a rechargeable zinc-air battery.

Preparation of Nanoporous Aramid Nanofibers (ANFs) Membranes

The ANFs solutions were prepared according to a previously reported method described in, R. Y. Wang, et al. "Effects of deposition conditions on the morphology of zinc deposits from alkaline zincate solutions," *J. Electrochem. Soc.* 153, C357-C364 (2006). In brief, 5 g of Kevlar 69 fibers (DuPont Co.) was dissolved in 245 g dimethyl sulfoxide (DMSO) (≥99.7% purity sold by Sigma Aldrich) with 7.5 g potassium hydroxide (KOH) (Sigma Aldrich) to obtain a 2 wt. % ANFs solution. The solution was then magnetically stirred for approximately one month at room temperature until a viscous and dark red solution was formed FIG. 31A shows a molecular structure of the aramid nanofibers (ANFs). FIG. 31B shows an image of the ANFs dispersion in DMSO solution formed as described herein. FIG. 31C shows a TEM image of the ANFs thus formed.

The spin coating method was then used to prepare the ANFs membrane. First, the glass slides were pre-cleaned using piranha solution for 2 hours, followed by extensive rinsing with DI water (18 MΩ) and compressed air-drying. Subsequently, approximately 2 mL of ANFs solution was dripped onto the glass slides and spin coated at 1500 rpm for 30 seconds. The prepared membranes were then placed in DI water three times to remove the DMSO. The obtained membranes were stored in DI water for later use. The dried, porous ANFs membrane was obtained by complete drying using the supercritical $CO_2$ method.

Preparation of Quaternary Ammonia-Functionalized Poly (Vinyl Alcohol) (QAFPVA) and Hydroxide-Conductive QAFPVA/ANFs Membranes Dimethyloctadecyl [3-(trimethoxysilyl)propyl]ammonium chloride (DMOAP) (42 wt. % in methanol, Sigma Aldrich) was used as the precursor for functionalizing the polyvinyl alcohol polymer. First, 5 g polyvinyl alcohol (PVA) (MW=178,000, 99+ %, Sigma Aldrich) was dissolved and stirred in 95 mL DI water to get a 5 wt. %, uniform solution at 90° C. DMOAP was then added into the above solution in the ratio of DMOAP:PVA being 10:1 by mass. The reaction was carried out at room temperature under magnetic stirring for 24 hours.

The hydroxide-conductive QAFPVA/ANFs membranes were prepared through immersion, cross-linking, and ion-exchange processes as described above in the context of FIG. 30. First, the obtained ANFs membrane was immersed into the above polymer solution for 2 days in the process shown in FIG. 29, making sure that the polymer solution was fully filled into the ANFs framework. Then, the extra polymer solution on the membrane's surface was removed. First, the QAFPVA/ANFs composite membrane was taken out from QAFPVA polymer solution and then clamped between two polytetrafluoroethylene (PTFE) sheets. Then applying an external force between two PTFE sheets, the extra polymer on the surface of the membrane was extruded and removed, dried at room temperature for 12 hours, and then cross-linked at 60° C. under vacuum for another 24 hours. The cross-linked composite membrane was then immersed in 1 M KOH solution to process the ion-exchange and equilibrated for 12 h to convert the chloride ($Cl^-$) counter ions into hydroxide ions ($OH^-$). The hydroxide-conductive membrane was placed in a freezer at −20° C. for 3 hours, and the QAFPVA/ANFs membrane was obtained after thawing at room temperature. The corresponding functionalization process is shown in FIG. 30. The preparation of the QAFPVA membrane is similar to the above process except for the addition of ANFs. For comparison, the PVA/KOH gel electrolyte was prepared according to the method described in Y. Xu, et al., "Flexible, Stretchable, and Rechargeable Fiber-Shaped Zinc-Air Battery Based on Cross-Stacked Carbon Nanotube Sheets," *Angew. Chem. Int. Ed.* 54, 15390-15394 (2015).

Fabrication of Rechargeable Zinc-Air Batteries

A rechargeable zinc-air battery was fabricated using a layer-by-layer method, by which the electrodes were placed face-to-face with the QAFPVA/ANFs membrane. A zinc foil (0.5 mm Sigma Aldrich) was used as the anode electrode. An air electrode was prepared by Pt/C (Sigma-Aldrich) and $IrO_2$ (99.9% Sigma-Aldrich) as the bifunctional electroactive material, sprayed onto a carbon cloth (Fisher Scientific). Dispersion of the catalyst comprising 5 mg Pt/C and 5 mg $IrO_2$, 67 µL of 5 wt. % NAFION™ ionomer (LIQUion solution, Ion Power Inc.), and 1.0 mL 1-propanol (Sigma-Aldrich) was sprayed onto a carbon cloth (2.5 cm×3.0 cm) (Fuel Cell Technology) as the gas diffusion layer with a catalyst loading of 1.0 mg $cm^{-2}$. After spraying, the electrode was dried in an oven at 60° C. for 1 hour.

Structural Characterization and Electrochemical Measurements

Scanning electron microscopy (SEM) (FEI Nova Nanolab dual-beam FIB) and transmission electron microscopy (TEM) (JEOL 3011 HRTEM) were used to image the morphology of the PVA, QAFPVA, ANFs and the QAFPVA/ANFs-based membrane. Fourier Transform infrared (FT-IR) spectra (Nicolet 6700 spectrometer), X-ray photoelectron spectroscopy (XPS) (PerkinElmer PHI 1600 ESCA), and X-ray diffraction (XRD) (Rigaku Rotating Anode X-Ray Diffractometer with Cu Kα radiation generated at 40 kV and 100 mA) were utilized to analyze the chemistry composition and structure of ANFs membrane and functionalized QAFPVA, QAFPVA/ANFs membrane. The mechanical properties of ANFs, QAFPVA, and QAFPVA/ANFs membranes were investigated using a TA XT Plus Texture Analyzer (Stable Micro Systems Ltd.). The membrane was cut into rectangular strips (20 mm×5 mm) and twenty samples were tested in each trial. The Quantachrome Autosorb 6B system was used to characterize the pore width of the dried porous ANFs membrane and QAFPVA/ANFs composite membrane using nitrogen sorption at 77.4 K. The porous ANFs membrane was obtained by complete drying using supercritical $CO_2$; the drying method maintained the membrane's pore size. Additionally, the pore size distribution of the ANFs membrane was calculated by Barrett-Joyner-Halenda (BJH) methods.

Electrochemical impedance spectroscopy (EIS) (Autolab Potentiastat and Solartron 1260 frequency response analyzer) was carried out in the frequency range from 100 kHz to 0.05 Hz with potential amplitude of 20 mV. The battery charge and discharge polarization data were collected using galvanodynamic method at a scan rate of 1.0 mA $s^{-1}$ with cut-off voltage of 0.45 V for the discharge and 2.5 V for the charge. Discharge capacity performance was tested at a current density of 5.0 mA/$cm^{-2}$, the capacity was calculated by the consumed Zinc mass. Discharge and charge cycling performance were carried out by a recurrent galvanic pulse method at a fixed current density of 1 mA cm$^{-2}$ with each cycle being 10 minutes for discharge followed by 10 minutes for charge.

ANFs 30-40 nm in diameter and several microns in length (FIG. 31C) were synthesized in dispersions in dimethyl-sulfoxide (DMSO). Ion-conducting membranes were prepared by spin coating followed by DMSO extraction by water that maintains high porosity of the nanofiber network. The light yellow QAFPVA/ANFs composite membranes with smooth surface (FIGS. 32D-32E, 32G) were prepared by immersing the base ANFs membrane (FIG. 32F) into 5 wt. % QAFPVA solution (FIG. 29). SEM images of the membranes' cross sections shows that thickness increases in this step from 6.5 μm to 9.3 μm (FIGS. 32H-32K), suggesting that the polycation was successfully incorporated into the ANF framework. Simultaneously, the surface area measured by Brunauer-Emmett-Teller method decreased from 214.4 m$^2$g$^{-1}$ to 13.2 m$^2$g$^{-1}$ confirming successful infiltration of the soft component, as shown in FIG. 33. The content QAFPVA is approximately 70 wt. % based on the thermogravimetric (TG) analysis. The high surface area of branched ANFs is responsible for the large polymer uptake and the resultant high ionic conductivity of composite while maintain high mechanical properties.

The QAFPVA/ANFs composite displays a tensile strength, σ and Young's modulus, E, of 118.8±5.9 MPa, and 6.2±0.3 GPa, respectively. The Young's modulus of the QAFPVA/ANFs is 75 times higher than that of QAFPVA (E=0.083±0.004 GPa, Table 6), which is around 3-30 times higher than those of cellulose nanofibers or composite electrolyte membrane for zinc-air battery.

TABLE 6

Comparison of tensile strength, tensile modulus, and elongation at break of QAFPVA, ANFs, and QAFPVA/ANFs composite membranes.

|  | Tensile strength (MPa) | Tensile modulus (GPa) | Elongation at break (%) |
|---|---|---|---|
| QAFPVA | 68.5 ± 3.4 | 0.083 ± 0.004 | 82.5 ± 4.1 |
| ANFs | 53.9 ± 2.7 | 2.5 ± 0.1 | 2.2 ± 0.2 |
| QAFPVA/ANFs | 118.8 ± 5.9 | 6.2 ± 0.3 | 1.9 ± 0.1 |

QAFPVA/ANFs membranes also display high flexibility as shown in FIG. 34 and Table 7 reflecting the high intrinsic strength of ANFs and strong intermolecular interactions between ANFs and PVA. Experimental and computational data have indicated that the Young's and shear moduli are particularly significant for the prevention of dendrite growth. The solid membrane with E=1 GPa exhibit high resistance to dendrite growth. The high Young's modulus of QAFPVA/ANFs combined with the narrow 20-40 nm pore size (FIG. S7) indicate the high efficiency dendrite suppression.

TABLE 7

Young's moduli and elongation at break data for different gel or solid materials for batteries.

| Separator | Young's modulus (MPa) | Elongation at break (%) | Description | Reference |
|---|---|---|---|---|
| Inventive QAFPVA/ANF | 6.2 × 10$^3$ | 1.9 | | |
| PBO | 2.0 × 10$^4$ | 2.63 | Poly(p-phenylene-2,6-benzobisoxazole membrane | 26 |
| CELGARD 2400 | 0.17 | 45 | — | 27 |
| Cellulose/PVDF-HFP | 960 | 5.2 | Cellulose/poly(vinylidene fluoride-hexafluoropropylene composite (nonwoven) | 28 |
| Cellulose/PSA | 250 | 6.8 | Cellulose/polysulfonamide composite membrane | 29 |
| PE/PI | 308 | 63 | Polyethylene co-polyimide copolymer composite membrane | 1 |
| PVH/BNNFs | 110 | 48 | Polyethylene (VdF-co-HFP)/2D boron nitride nanoflakes | 2 |
| PVdF/PMIA/PVdF | 30.3 | 26 | PVdF/poly(m-phenylene isophthalamide)/PVdF nanofiber composite membrane | 3 |
| PVDF-HFP/Sb$_2$O$_3$ | 7.52 | 343 | PVDF-HFP/Sb$_2$O$_3$ composite membrane | 4 |
| PVDF | 62.08 | 12 | PVDF porous membrane | 5 |
| PEO/ceramic | 103 | 7.4 | Poly(ethylene oxide)/ceramic composite membrane | 6 |
| (PEO/ANF)$_{200}$ | 5 × 10$^3$ | 3.4 | (PEO/Aramid nanofibers)$_{200}$ composite membrane | 7 |
| PI | 34.4 | 32 | Polyimide nanofiber non-woven membrane | 8 |
| PMMA/Silica | 0.9 | 52 | Poly(methyl methacrylate)/Silica composite membrane | 9 |
| PAN gel | 0.4 | 100 | Polyacrylonitrile gel membrane | 10 |
| 3D-GPE | 6.56 | 30.2 | Diglycidyl ether of bisphenol-A, Poly(ethylene glycol) diglycidyl ether, Diamino-poly(propylene oxide) composite gel | 11 |
| PET | 26.6 | 46 | Polyethylene terephthalate nanofiber membrane | 12 |

TABLE 7-continued

Young's moduli and elongation at break
data for different gel or solid materials for batteries.

| Separator | Young's modulus (MPa) | Elongation at break (%) | Description | Reference |
|---|---|---|---|---|
| Glass fiber/PVDF | 803 | 2.6 | — | 13 |
| Nylon 6,6/SiO$_2$ | 88 | 25 | Nylon 6,6/SiO$_2$ composite membrane | 14 |
| Rice paper | 760 | 1.8 | — | 15 |

[26] Huang, W.; Frech, R.; Wheeler, R. A. Molecular Structures and Normal Vibrations. J. Phys. Chem. 1994, 100-110.
[27] Wendsjö, Å., Lindgren, J.; Thomas, J. O.; Farrington, G. C. The Effect of Temperature and Concentration on the Local Environment in the System M(CF$_3$SO$_3$)$_2$PEOn for M=Ni, Zn and Pb. Solid State Ionics 1992, 53-56, 1077-1082.
[28] Christie, A. M.; Lilley, S. J.; Staunton, E.; Andreev, Y. G. Increaing Conductivity of Crystalline Polymer Electrolytes Nature 2005. Nature 2005, 433, 50-53.
[29] Cheng, F.; Su, Y.; Liang, J.; Tao, Z.; Chen, J. MnO$_2$-Based Nanostructures as Catalysts for Electrochemical Oxygen Reduction in Alkaline Media. Chem. Mater. 2010, 22, 898-905.
[1] Fu, J.; Zhang, J.; Song, X.; Zarrin, H.; Tian, X.; Qiao, J.; Rasen, L.; Li, K.; Chen, Z. A Flexible Solid-State Electrolyte for Wide-Scale Integration of Rechargeable Zinc-air Batteries. Energy Environ. Sci. 2016, 9, 663-670.
[2] Xu, Y.; Zhang, Y.; Guo, Z.; Ren, J.; Wang, Y.; Peng, H. Flexible, Stretchable, and Rechargeable Fiber-Shaped Zinc-Air Battery Based on Cross-Stacked Carbon Nanotube Sheets. Angew. Chemie - Int. Ed. 2015, 54, 15390-15394.
[3] Wang, X.; Wang, F.; Wang, L.; Li, M.; Wang, Y.; Chen, B.; Zhu, Y.; Fu, L.; Zha, L.; Zhang, L.; Wu, Y.; Huang, W. An Aqueous Rechargeable Zn//Co$_3$O$_4$ Battery with High Energy Density and Good Cycling Behavior. Adv. Mater. 2016, 4904-4911.
[4] Liu, J.; Guan, C.; Zhou, C.; Fan, Z.; Ke, Q.; Zhang, G.; Liu, C.; Wang, J. A Flexible Quasi-Solid-State Nickel-zinc Battery with High Energy and Power Densities Based on 3D Electrode Design. Adv. Mater. 2016, 28, 8732-8739.
[5] Chew, S. Y.; Ng, S. H.; Wang, J.; Novák, P.; Krumeich, F.; Chou, S. L.; Chen, J.; Liu, H. K. Flexible Free-Standing Carbon Nanotube Films for Model Lithium-Ion Batteries. Carbon N.Y. 2009, 47, 2976-2983.
6 Mukherjee, R.; Thomas, A. V.; Krishnamurthy, A.; Koratkar, N. Photothermally Reduced Graphene as High-Power Anodes for Lithium-Ion Batteries. ACS Nano 2012, 6, 7867-7878.
[7] Jia, X.; Yan, C.; Chen, Z.; Wang, R.; Zhang, Q.; Guo, L.; Wei, F.; Lu, Y. Direct Growth of Flexible LiMn$_2$O$_4$/CNT Lithium-Ion Cathodes. Chem. Commun. 2011, 47, 9669.
[8] Li, N.; Zhou, G.; Fang, R.; Cheng, H.; Li, F.; Cheng, H. TiO$_2$/Graphene Sandwich Paper as an Anisotropic Electrode for High Rate Lithium Ion Batteries. Nanoscale 2013, 5, 3-6.
[9] Yu, A.; Park, H. W.; Davies, A.; Higgins, D. C.; Chen, Z.; Xiao, X. Free-Standing Layer-By-Layer Hybrid Thin Film of Graphene-MnO2 Nanotube as Anode for Lithium Ion Batteries. J. Phys. Chem. Lett. 2011, 2, 1855-1860.
[10] Dai, Y.; Cai, S.; Yang, W.; Gao, L.; Tang, W.; Xie, J.; Zhi, J.; Ju, X. Fabrication of Self-Binding Noble Metal/Flexible Graphene Composite Paper. Carbon N.Y. 2012, 50, 4648-4654.
[11] Wang, D.; Kou, R.; Choi, D.; Yang, Z.; Nie, Z.; Li, J.; Saraf, L. V. Ternary Self-Assembly of Ordered Metal Oxide-graphene Nanocomposites for Electrochemical Energy Storage. ACS Nano 2010, 4, 1587-1595.
[12] Lee, J. W.; Lim, S. Y.; Jeong, H. M.; Hwang, T. H.; Kang, J. K.; Choi, J. W. Extremely Stable Cycling of Ultra-Thin V$_2$O$_5$ Nanowire-graphene Electrodes for Lithium Rechargeable Battery Cathodes. Energy Environ. Sci. 2012, 5, 9889.
[13] Thieme, S.; Brueckner, J.; Bauer, I.; Oschatz, M.; Borchardt, L.; Althues, H.; Kaskel, S. High Capacity Micro-Mesoporous Carbon-Sulfur Nanocomposite Cathodes with Enhanced Cycling Stability Prepared by a Solvent-Free Procedure. J. Mater. Chem. A 2013, 1, 9225-9234.
[14] Hu, L.; Wu, H.; La Mantia, F.; Yang, Y.; Cui, Y. Thin, Flexible Secondary Li-Ion Paper Batteries. ACS Nano 2010, 4, 5843-5848.
[15] Pan, R.; Wang, Z.; Sun, R.; Lindh, J.; Edström, K.; Strømme, M.; Nyholm, L. Thickness Difference Induced Pore Structure Variations in Cellulosic Separators for Lithium-Ion Batteries. Cellulose 2017, 24, 2903-2911.

Figures 35A, 35B, 35C, 35D, 35E, 35F, 35G, 35H:
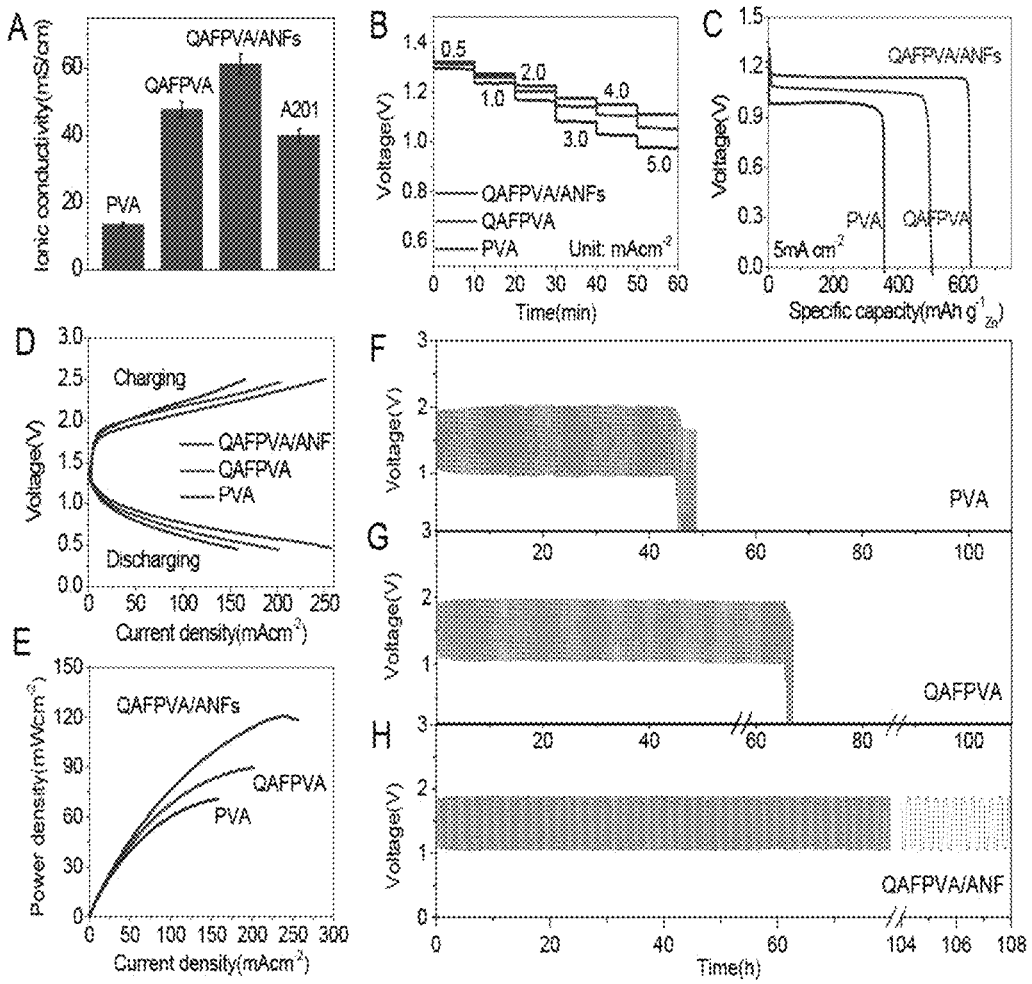

To study the electrochemical performance of the composite membrane, the ionic conductivities of the PVA, QAFPVA and QAFPVA/ANFs are compared using a four-probe alternating current impedance spectroscopy (FIG. 35A). Ionic conductivity of QAFPVA/ANFs is 61.3±3.1 mS cm$^{-1}$, which is 350% higher than that of the PVA (13.6±0.6 mS cm$^{-1}$) and 31.0% higher than that of QAFPVA of 46.8±2.4 mS cm$^{-1}$. This is higher than that of a prototypical A201 membrane (40 mScm$^{-1}$), and comparable or better to solid-state ion-conducting membranes for zinc-air batteries previously reported. Note that previous studies did not take into considerations of the load-bearing abilities (Table 8) while the batteries prepared in accordance with the present disclosure do, which demonstrate the fundamental possibility and technological prospects of such high-energy structural components.

TABLE 8

Comparison of ionic conductivities
of previously developed solid or gel electrolytes

| Electrolyte membrane | Ionic conductivity (mS cm$^{-1}$) | Cell temperature (° C.) | Reference |
|---|---|---|---|
| QAFPVA/ANFs (Example 2) | 61.3 | r.t. | |
| QAFPVA (Example 2) | 46.8 | r.t. | |
| PVA (Example 2) | 13.6 | r.t. | |

TABLE 8-continued

Comparison of ionic conductivities
of previously developed solid or gel electrolytes

| Electrolyte membrane | Ionic conductivity (mS cm$^{-1}$) | Cell temperature (° C.) | Reference |
|---|---|---|---|
| PVA | 13 | r.t. | 16 |
| PVA-TEAOH | 30.0 | r.t. | 17 |
| PVA/SiO$_2$ | 57.3 | r.t. | 18 |
| PVA-PVP | 26 | r.t. | 19 |
| PVA/PDDA | 25 | r.t. | 20 |
| PEO | 10 | r.t. | 21 |
| P(ECH-co-EO) | 10 | r.t. | 22 |
| PGG-GP | 123 | r.t. | 23 |
| CS-PDDA | 24 | r.t. | 24 |
| Functionalized bio-cellulose electrolytes | 64 | r.t. | 25 |
| GGPE | 3.1 | r.t. | 26 |
| PPO-DMHDA | 35 | r.t. | 27 |
| QAFC | 21.2 | r.t. | 28 |
| QAFP | 46.8 | r.t. | 29 |
| QAFCGO | 33 | r.t. | 30 |
| QPBIs | 56 | 80° C. | 31 |
| γ-Grafted ETFE | 39 | 40° C. | 32 |

TABLE 8-continued

Comparison of ionic conductivities
of previously developed solid or gel electrolytes

| Electrolyte membrane | Ionic conductivity (mS cm$^{-1}$) | Cell temperature (° C.) | Reference |
|---|---|---|---|
| Im-AAEM | 32 | 50° C. | 33 |
| GPPO | 71 | 50° C. | 34 |

[16]Pan, R.; Cheung, O.; Wang, Z.; Tammela, P.; Huo, J.; Lindh, J.; Edström, K.; Strømme, M.; Nyholm, L. Mesoporous Cladophora Cellulose Separators for Lithium-Ion Batteries. J. Power Sources 2016, 321, 185-192.
[17]Leijonmarck, S.; Cornell, A.; Lindbergh, G.; Wågberg, L. Single-Paper Flexible Li-Ion Battery Cells through a Paper-Making Process Based on Nano-Fibrillated Cellulose. J. Mater. Chem. A 2013, 1, 4671.
[18]Pan, H.; Shao, Y.; Yan, P.; Cheng, Y.; Han, K. S.; Nie, Z.; Wang, C.; Yang, J.; Li, X.; Bhattacharya, P.; Mueller, K. T.; Liu, J. Reversible Aqueous Zinc/Manganese Oxide Energy Storage from Conversion Reactions. Nat. Energy 2016, 1, 16039.
[19]Li, H.; Han, C.; Huang, Y.; Huang, Y.; Zhu, M.; Pei, Z.; Xue, Q.; Wang, Z., Liu, Z.; Tang, Z.; Wang, Y.; Kang, F.; Li, B.; Zhi, C. Environmental Science An Extremely Safe and Wearable Solid-State Zinc Polymer Electrolyte. 2018, 941-951.
[20]Xu, C.; Li, B.; Du, H.; Kang, F. Energetic Zinc Ion Chemistry: The Rechargeable Zinc Ion Battery. Angew. Chemie - Int. Ed. 2012, 51, 933-935.
[21]Zhang, N.; Cheng, F.; Liu, J.; Wang, L.; Long, X.; Liu, X.; Li, F.; Chen, J. Rechargeable Aqueous Zinc-Manganese Dioxide Batteries with High Energy and Power Densities. Nat. Commun. 2017, 8, 1-9.
[22]Zhang, N.; Cheng, F.; Liu, Y.; Zhao, Q.; Lei, K.; Chen, C., Liu, X.; Chen, J. Cation-Deficient Spinel ZnMn$_2$O$_4$ Cathode in Zn(CF3SO3)2 Electrolyte for Rechargeable Aqueous Zn-Ion Battery. J. Am. Chem. Soc. 2016, 138, 12894-12901.
[23]Kundu, D.; Adams, B. D.; Duffort, V.; Vajargah, S. H.; Nazar, L. F. A High-Capacity and Long-Life Aqueous Rechargeable Zinc Battery Using a Metal Oxide Intercalation Cathode. Nat. Energy 2016, 1, 16119.
[24]Senguttuvan, P.; Han, S. D.; Kim, S.; Lipson, A. L.; Tepavcevic, S.; Fister, T. T.; Bloom, I. D.; Burrell, A. K.; Johnson, C. S. A High Power Rechargeable Nonaqueous Multivalent Zn/V$_2$O$_5$ Battery. Adv. Energy Mater. 2016, 6.
[25]He, P.; Yan, M.; Zhang, G., Sun, R.; Chen, L.; An, Q.; Mai, L. Layered VS2 Nanosheet-Based Aqueous Zn Ion Battery Cathode. Adv. Energy Mater. 2017, 7, 2-6.
[26]Snyder, J. F.; Baechle, D. M.; Wetzel, E.D. Multifunctional Structural Composite Batteries for U S . Army Applications. 2008, 1-4.
[27]Ekstedt, S.; Wysocki, M.; Asp, L. E. Structural Batteries Made from Fibre Reinforced Composites. Plast. Rubber Compos. 2010, 39, 148-150.
[28]Ihrner, N.; Johansson, M. Improved Performance of Solid Polymer Electrolytes for Structural Batteries Utilizing Plasticizing Co-Solvents. J. Appl. Polym. Sci. 2017, 134, 1-6.
[29]Mamedov, A. A.; Kotov, N. A. Free-Standing Layer-by-Layer Assembled Films of Magnetite Nanoparticles. Langmuir 2000, 16, 5530-5533.
[30]Alfaruqi, M. H.; Mathew, V.; Gim, J.; Kim, S.; Song, J.; Baboo, J. P.; Choi, S. H.; Kim, J. Electrochemically Induced Structural Transformation in a γ-MnO$_2$ Cathode of a High Capacity Zinc-Ion Battery System. Chem. Mater. 2015, 27, 3609-3620.
[31]Liu, P.; Sherman, E.; Jacobsen, A. Design and Fabrication of Multifunctional Structural Batteries. J. Power Sources 2009, 189, 646-650.
[32]Thomas, J. P.; Qidwai, M. A. Mechanical Design and Performance of Composite Multifunctional Materials. Acta Mater. 2004, 52, 2155-2164.
[33]Singh, A. K.; Cao, L.; Ma, J.; Seo, J.; Bakis, C. E.; Zhang, Y.; Hickner, M. A.; Rahn, C. D. Design, Manufacture and Test of a Novel Structural Battery Based on Sandwich Construction. J. Sandw. Struct. Mater. 2015, 17, 666-690.
[34]Ladpli, P.; Nardari, R.; Kopsaftopoulos, F.; Wang, Y.; Chang, F. K. Design of Multifunctional Structural Batteries with Health Monitoring Capabilities. 8th Eur. Work. Struct. Heal. Monit. 2016, 1-13.

PVA: Polyvinyl alcohol; PDDA: Poly dimethyl diallyl ammonium chloride; ETFE: poly(ethylene-co-tetrafluoroethylene); CS-PDDA: chitosan poly(diallyldimethylammonium chloride); PGG-GP: poly(vinyl alcohol)/guar hydroxypropyltrimonium chloride; GPPO: Guanidinium functionalized poly(2,6-dimethyl-1,4-phenylene oxide); GGPE: Gelatin gel polymer electrolyte; Im-AAEM: Imidazolium-type alkaline anion exchange membrane; PPO-DMHDA: Poly(2,6-dimethyl-1,4-phenyleneoxide-N,N-dimethyl-1-hexadecylamine; QAFC: Quaternary ammonia-functionalized nanocellulose; QAFCGO Quaternary ammonium-functionalized cellulose and graphene oxide composite; QAFP: Quaternary ammonium polyvinyl alcohol.

Further increase of hydroxide conductivities is observed, as expected, at higher temperatures (FIG. 36). FIG. 36 shows temperature-dependent ionic conductivity comparisons of PVA, QAFPVA and QAFPVA/ANF membranes. The hydroxide conductivities in all membranes is improved with increasing temperature, which are ascribed to the mobility of hydroxide ions being positively correlated with temperature. Additionally, the high temperature will increase swelling and ion channels for polymer membranes, release the dead angle of the ion nanochannels and enhance their connectivity, resulting improving ion transport efficiency. However, the ionic conductivity in QAFPVA/ANF improved slowly compared to that of PVA due to the rigid frameworks of ANF have in significant swelling that prevents the above-mentioned alteration of the ion nanochannel morphology, also increases with the elevated temperature. The increased ion transport efficiency is attributed to the kinetic energy of hydroxide ions increasing with temperature, making it easier for hydroxide ions to overcome the energy barrier. This design is quite different from those high-ion-conducting designs, where high ionic conductivity has to be gained at the expense of dimensional stability.

Further, lower activation energy (Ea) of QAFPVA/ANFs membrane (8.87 kJ mol$^{-1}$ calculated from the Arrhenius equation) is achieved in comparison with the QAFPVA (11.7. kJ mol$^{-1}$) and PVA (25.7 KJ mol). The lower Ea indicates that the QAFPVA/ANF membrane can promote the OH$^-$ hopping in polymer chains better than the QAFPVA and PVA membrane with the increase in temperature (Table 9).

TABLE 9

Comparison of ionic conductivity, ion exchange
capacity (IEC), ion concentration, water uptake,and swelling
ratio of QAFPVA and QAFPVA/ANFs composite membranes.

| Membrane | QAFPVA/ANFs | QAFPVA | PVA |
|---|---|---|---|
| Ionic conductivity (mS cm$^{-1}$) | 61.3 | 46.8 | 13.5 |
| IEC (mmol g$^{-1}$) | 2.96 | 2.08 | 0.41 |
| Ion concentration (mmol cm$^{-3}$) | 1.15 | 0.76 | 0.28 |
| Water uptake (g g$^{-1}$) | 2.1 | 1.8 | 2.0 |
| Ea activation energy (kJ mol$^{-1}$) | 9.87 | 13.05 | 25.77 |
| In-plane swelling ratio (%) | 5.8 | 91.7 | 102.5 |
| Through-plan swelling ratio (%) | 1.6 | 17.2 | 20.8 |

Notably, the hydroxide mobility is similar to that of proton mobility in water, and the performance of zinc-air batteries strongly depends on the surrounding water molecules. In the presence of water molecules, large amounts of hydroxide ions can be dissociated from the grafted QA groups, and then form into hydrated hydroxide ions with surrounding water molecules. The residual water in the membrane is necessary to support sustained hydroxide-ion transport. As a result, the QAFPVA/ANFs display higher performance than those of QAFPVA and PVA.

In this example, the ionic conductivities of the QAFPVA and QAFPVA/ANFs membranes were measured at room temperature and 100% relative humidity. The value was calculated according to the following equation:

$$\sigma = \frac{L}{RA}$$

where σ denotes the ionic conductivity (S cm$^{-1}$), L is the distance (cm) between the reference electrode and the working electrode, R is the measured resistance of the membrane (Ω), and A is the cross-sectional area of the membrane (cm$^2$).

Ion-exchange capacity (IEC) of membranes were determined by an inverse titration method. PVA, QAFPVA or QAFPVA/ANF (with a dry mass of m$_{dry}$=0.1 g, in OH form) was immersed in standard hydrochloric acid solution (V$_1$=40 mL, a=0.01 mol L$^{-1}$) for 24 h. Then, the solution was back titrated with standard KOH solution (V$_2$ mL, b=0.0025 mol L$^{-1}$). The IEC of the membrane was calculated by following equation:

$$IEC = \frac{V_1 a - V_2 b}{m_{dry}}$$

Because the ionic conductivity of membrane is governed by ion concentration (molar mass of ions per unit volume), the ion concentration was calculated as follows:

$$c = \frac{IEC \times m_{dry}}{V}$$

where V (cm$^3$) is the volume of membrane under the testing condition; σ is the ionic conductivity, which is obtained at room temperature (20° C.) and a relative humidity of 100%, F is the Faraday constant, and c is the ion concentration.

Figures 32A, 32B, 32C, 32D, 32E:
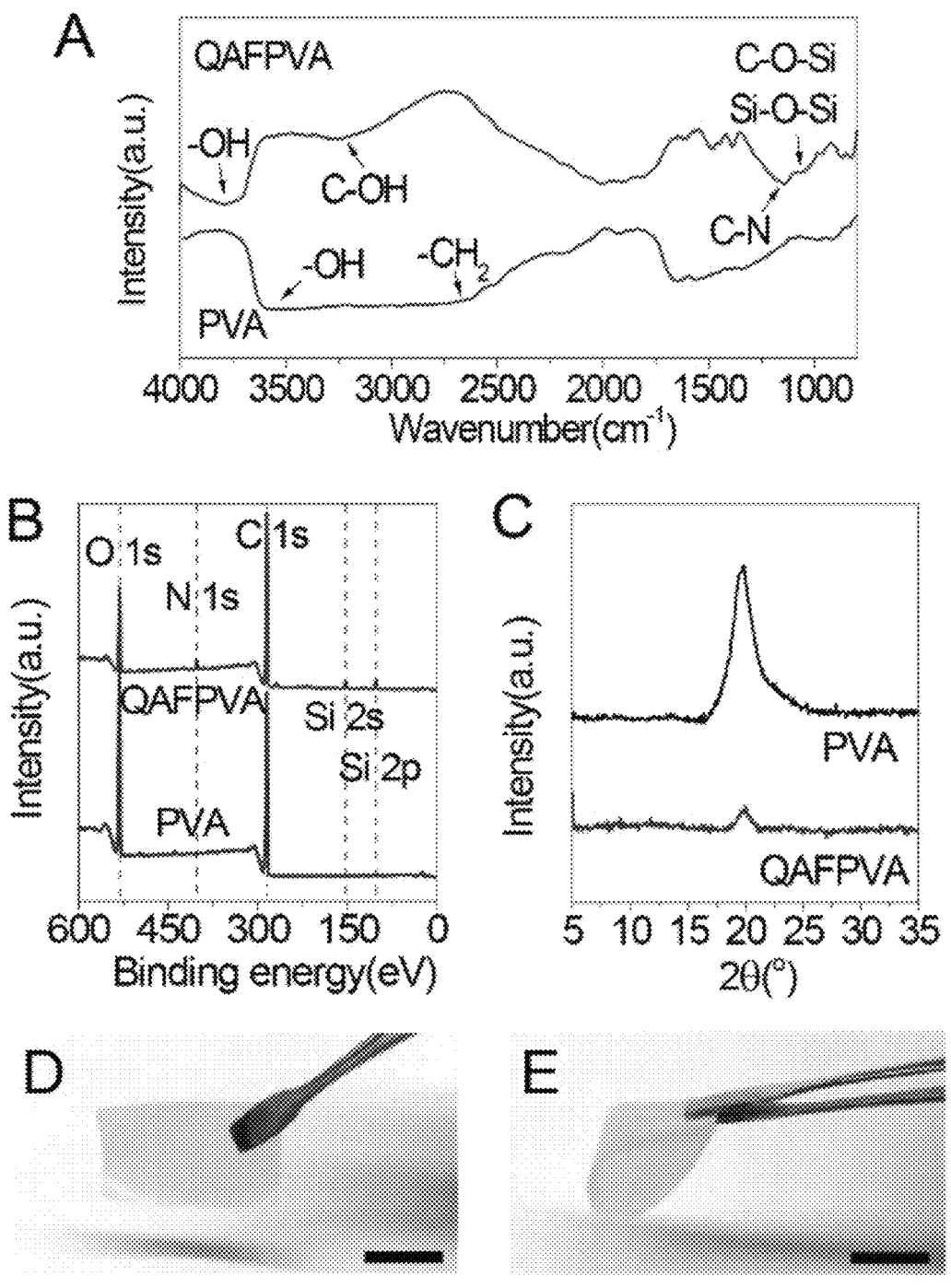
Figures 32F, 32G, 32H, 32I, 32J, 32K:
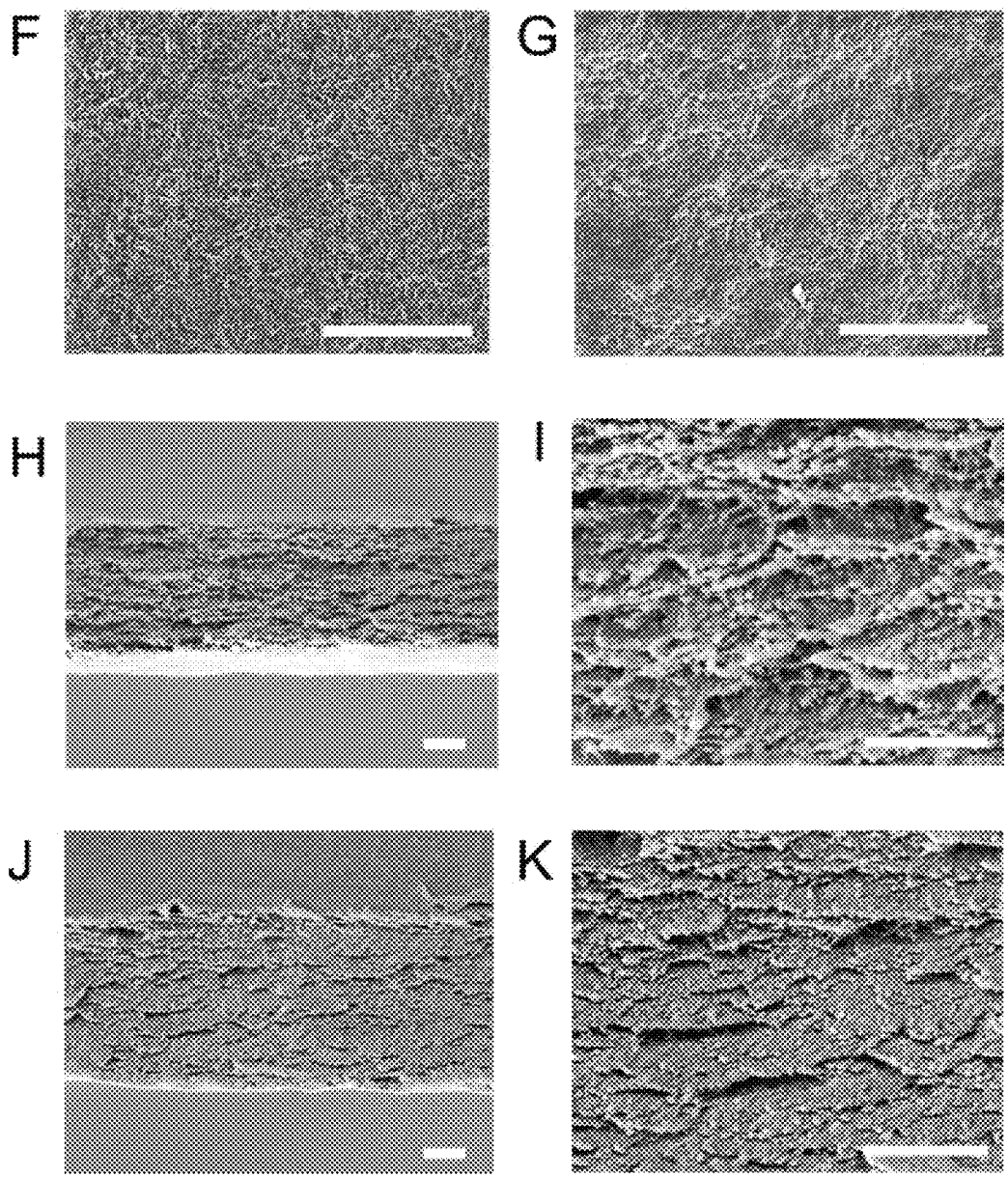

The water uptake and swelling ratio of the PVA, QAFPVA and QAFPVA/ANFs membranes were measured according to the following method. First, the samples were immersed in DDI water at room temperature for 24 hours. After water was removed from the membrane surface, the weight and dimension of the membranes were immediately measured. Then the samples were dried at room temperature until a constant weight and dimension were obtained. The water uptake (WU) and swelling ratio both in-plane (I-SR) and through-plane (T-SR) were evaluated according to the following equations:

$$I - SR(\%) = \frac{S_{wet} - S_{dry}}{S_{dry}} \times 100$$

$$T - SR(\%) = \frac{T_{wet} - T_{dry}}{T_{dry}} \times 100$$

where W$_{wet}$ (g), S$_{wet}$ (mm$^2$) and T$_{wet}$ (mm) are the weight, surface area, and thickness of hydrated membrane, respectively. W$_{dry}$ (g), S$_{dry}$ (mm$^2$) and T$_{dry}$ (mm) are the weight, surface area, and thickness of dried membrane, respectively In addition to having outstanding ionic conductivity, the QAFPVA/ANFs exhibit a significantly enhanced ion exchange capacity (IEC) of 2.96 mmol g$^{-1}$ and a high ion concentration of 1.15 mmol cm$^{-3}$, which is much higher than that of the QAFPVA (2.08 mmol g$^{-1}$, 0.76 mmol cm$^{-3}$) and PVA gel membrane (0.41 mmol g$^{-1}$, 0.28 mmol cm$^{-3}$ (Table 9). The improvement in IEC and ion concentration might be due to the ion-capture ability of the QA moieties, high amorphousness (as confirmed by the XRD data; FIG. 32C) and the presence of ion-conducting channels for QAFPVA/ANFs and QAFPVA.

While not limiting the present teachings to any particular theory, the surprising increase of electrochemical performance transitioning from QAFPVA to composite instead of the reduction due to the excluded volume taken by the ANFs framework is believed to be attributable to a favorable chemical environment in the composite due to the presence of the hydrophilic amide functional groups on ANFs, which facilitate transport. Not only does the QAFPVA/ANFs have a 16.6% and 5% higher water content than QAFPVA and PVA (Table 9), but it also displays a much lower expansion and shrinkage ratio than those of QAFPVA and PVA. The swelling ratio of QAFPVA/ANFs is only 6.3% and 5.7% in plane; 9.3% and 7.7% through-plan of that of the QAFPVA and PVA, respectively (Table 9). The lower expansion and shrinkage eliminate the shape change during the water gain and loss process and thus ensure good interfacial contact between the electrode and electrolyte. This is quite different from those high IEC designs where high ionic conductivity was gained at the expense of dimensional stability.

Encouraged by the unique combination of mechanical and ion-transport properties found in QAFPVA/ANF composite, its charge storage performance as a solid-state electrolyte membrane is tested in a rechargeable zinc-air battery (FIG. 37). The electrochemical reactions of the rechargeable zinc-air battery are shown in FIG. 37. During the discharge process, the generated hydroxide ions migrate from the reaction site of the air electrode to the zinc electrode forming zinc oxide. While charging, the QAFPVA/ANFs transport the hydroxide ions produced at the zinc electrode to the air electrode, at which the oxygen evolution reaction occurs.

It is informative to compare the galvanostatic discharge performance of zinc-air battery with different electrolytes, namely PVA, QAFPVA and QAFPVA/ANFs, to highlight the advantages of biomimetic design of the solid-state electrolytes prepared in accordance with certain aspects of the present disclosure. The discharge plateaus QAFPVA/ANFs decreases by only 0.17 V, from 1.27 V at 1.0 mAcm$^{-2}$ to 1.10V at 5.0 mAcm$^{-2}$, which is superior to those of PVA and QAFPVA (FIG. 35A). As shown in FIG. 35C, the maximum discharge capacity of QAFPVA was up to 506.5 mAh g$^{-1}$ Zn while that of PVA was only 358.9 mAh g$^{-1}$ Zn. An increase of capacity 624.3 mAh g$^{-1}$ Zn was observed for QAFPVA/ANFs compared to QAFPVA, confirming reflecting the accelerated hydroxide transport. While both PVA and QAFPVA/ANFs-based batteries have high open-circuit voltage of approximately 1.35 V, the cell with QAFPVA/ANFs displays smaller charge-discharge gap and higher power density (FIG. 35D-35E). The maximum power density of 120.3 mW cm$^{-2}$ is much higher than that of QAFPVA (90.1 mW cm$^{-2}$) and PVA-based cells (68.5 mW cm$^{-2}$), and comparable to the best solid or gel flexible zinc-air batteries known thus far (Table 10), while the charge voltage is lower and the discharge voltage is higher (FIGS. 35F-35H). Importantly, the QAFPVA/ANFs zinc-air battery displays negligible potential loss stability with voltage stability improved by almost 100% even after 108h (325 cycles) of charge-discharge polarizations, compared to QAFPVA (66h, 198 cycles) and prototypical PVA (42h, 126 cycles) electrolytes that shows an increasing performance fade over multiple charge-discharge cycles.

TABLE 10

Summary of solid or gel state flexible rechargeable Zn-air batteries with various electrocatalysts and electrolytes.

| Membrane | Catalyst | Power density (mW cm$^{-2}$) | Cycle performance | Cell temperature (° C.) | Reference |
|---|---|---|---|---|---|
| QAFPVA/ANFs (Example 2) | Pt/C IrO$_2$ | 120.5 | 108 h (20 min per cycle) | r.t. | |
| QAFPVA (Example 2) | Pt/C IrO$_2$ | 90.1 | 66 h (20 min per cycle) | r.t. | |
| PVA (Example 2) | Pt/C IrO$_2$ | 68.5 | 42 h (20 min per cycle) | r.t. | |
| A201 | Co$_3$O$_4$ | 41.6 | 5 h (20 min per cycle) | r.t. | 35,36 |
| PVA gel | Fe, N-CNS | 128.7 | 10 h (20 min per cycle) | r.t. | 37 |
| PVA gel | NiCo$_2$O$_4$ @ N-OCNT | 3.87 | 50 min (400s per cycle) | r.t. | 38 |
| PVA gel | Fe, Co/N-GCNT | 97.8 | 12 h (10 min per cycle) | r.t. | 39 |
| PVA gel | Ultrathin Co$_3$O$_4$ | — | 10 h (20 min per cycle) | r.t. | 40 |
| PVA gel | Co$_3$O$_4$/CNT aerogel | — | 20 h (1 h per cycle) | r.t. | 41 |
| PVA gel | Co$_4$N/carbon fiber | — | 12 h (20 min per cycle) | r.t. | 42 |
| PVA gel | LaNiO$_3$/NCNT | | 40 h (20 min per cycle) | r.t. | 43 |
| PVA gel | Co$_3$O$_4$/N-rGO | — | 20 h (20 min per cycle) | r.t. | 44 |
| PVA-TEAOH | Co$_3$O$_4$ | 74.11 | 25 h (20 min per cycle) | r.t. | 45 |
| PVA/SiO2 | Co$_3$O$_4$ | 62.6 | 48 h (20 min per cycle) | r.t. | 46 |
| PAA gel | Co$_3$O$_4$/Ag | 108 | 1000 min (10 min per cycle) | r.t. | 47 |
| PAA gel | Hollow Co$_3$O$_4$ | 95.4 | 10 h (20 min per cycle) | r.t. | 48 |
| PGG-GP | Pt/C IrO$_2$ | 50.2 | 9 h (10 min per cycle) | r.t. | 49 |
| CS-PDDA | Pt/C IrO$_2$ | 48.9 | 2.8 h (10 min per cycle) | r.t. | 36 |
| QAFC | Co$_3$O$_4$ | 50.9 | 2000 min (60 min per cycle) | r.t. | 1 |
| QAFC | Co$_3$O$_4$ | 160 | 500 h (20 min per cycle) | r.t. | 50 |
| QAFP | Co$_3$O$_4$ | 16 | 40 h (20 min per cycle) | r.t. | 51 |
| QAFCGO | Co$_3$O$_4$ | 44.1 | 10 h (20 min per cycle) | r.t. | 35 |
| Acrylic acid gel | MnO$_x$-GCC | 32 | 58 h (20 min per cycle) | r.t. | 52 |
| Acrylic acid gel | NC-Co/CoNx | 41.5 | 1500 min (20 min per cycle) | r.t. | 53 |

TABLE 10-continued

Summary of solid or gel state flexible rechargeable
Zn-air batteries with various electrocatalysts and electrolytes.

| Membrane | Catalyst | Power density (mW cm$^{-2}$) | Cycle performance | Cell temperature (° C.) | Reference |
|---|---|---|---|---|---|
| Functionalized bio-cellulose | Mn/Fe-HIB-MOF | 193 | 600 h (10 min per cycle) | r.t. | 54 |
| Functionalized cellulose | S-C2NA | 187 | 450 h (30 min per cycle) | r.t. | 55 |

CS-PDDA: chitosan-poly(diallyldimethylammonium chloride);
PGG-GP: poly(vinyl alcohol)/guar hydroxypropyltrimonium chloride;
QAFC: Quaternary ammonia-functionalized nanocellulose;
QAFCGO Quaternary ammonium-functionalized celllulose and graphene oxide composite;
QAFP: Quaternary ammonium polyvinyl alcohol;
PVA: Polyvinyl alcohol;
PDDA: Poly dimethyl diallyl ammonium chloride.

[35] J. Zhang et al., Laminated cross-linked nanocellulose/graphene oxide electrolyte for flexible rechargeable Zinc-air batteries. *Adv. Energy Mater.* 6, 1600476 (2016).
[36] Y. Wei et al., Alkaline exchange polymer membrane electrolyte for high performance of all-solid-state electrochemical devices. *ACS Appl. Mater. Interfaces.* 10, 29593-29598 (2018).
[37] M. Wang, S. Liu, N. Xu, T. Qian, C. Yan, Active Fe-Nx sites in carbon nanosheets as oxygenreduction electrocatalyst for flexible all-solid-state Zinc-air batteries. *Adv. Sustain.* 1, 1700085 (2017).
[38] S. Zeng et al., All-in-one bifunctional oxygen electrode films for flexible Zn-air batteries. *Small.* 14, 1803409 (2018).
[39] C. Y. Su et al., Atomic modulation of FeCo-nitrogen-carbon bifunctional oxygen electrodes for rechargeable and flexible all-solid-state Zinc-air battery. *Adv. Energy Mater.* 7, 1-12 (2017).
[40] X. Chen et al., Ultrathin Co$_3$O$_4$ layers with large contact area on carbon fibers as high-performance electrode for flexible Zinc-air battery integrated with flexible display. *Adv. Energy Mater.* 7, 1700779 (2017).
[41] S. Zeng et al., Crosslinked carbon nanotube aerogel films decorated with cobalt oxides for flexible rechargeable Zn-air batteries. *Small.* 13, 1700518 (2017).
[42] F. Meng, H. Zhong, D. Bao, J. Yan, X. Zhang, In situ coupling of strung Co$_4$N and intertwined N-C fibers toward free-standing bifunctional cathode for robust, efficient, and flexible Zn-air batteries. *JACS.* 138, 10226-10231 (2016).
[43] J. Fu et al., Flexible high-energy polymer-electrolyte-based rechargeable Zinc-air batteries. *Adv. Mater.* 27, 5617-5622 (2015).
[44] Y. Li et al., Atomically thin mesoporous Co$_3$O$_4$ layers strongly coupled with N-rGO nanosheets as high-performance bifunctional catalysts for 1D knittable Zinc-air batteries. *Adv. Mater.* 30, 1703657 (2018).
[45] M. Li et al., Long-shelf-life polymer electrolyte based on tetraethylammonium hydroxide for flexible Zinc-air batteries. *ACS Appl. Mater. Interfaces.* 11, 28909-28917 (2019).
[46] X. Fan et al., Porous nanocomposite gel polymer electrolyte with high ionic conductivity and superior electrolyte retention capability for long-cycle-life flexible zinc - air batteries. *Nano Energy.* 56, 454-462 (2019).
[47] Q. Wang, H. Miao, S. Sun, Y. Xue, Z. Liu, One-pot synthesis of Co$_3$O$_4$/Ag nanoparticles supported on N-doped graphene as efficient bifunctional oxygen catalysts for flexible rechargeable Zinc-air batteries. *Chem. Eur. J.* 24, 14816-14823 (2018).
[48] C. Guan et al., Hollow Co$_3$O$_4$ nanosphere embedded in carbon arrays for stable and flexible solid-state Zinc-air batteries. *Adv. Mater.* 29, 1704117 (2017).
[49] M. Wang, N. Xu, J. Fu, Y. Liu, J. Qiao, High-performance binary cross-linked alkaline anion polymer electrolyte membranes for all-solid- state supercapacitors and flexible rechargeable zinc-air batteries. *J. Mater. Chem. A*, 11257-11264 (2019).
[1] Fu, J.; Zhang, J.; Song, X.; Zarrin, H.; Tian, X.; Qiao, J.; Rasen, L.; Li, K.; Chen, Z. A Flexible Solid-State Electrolyte for Wide-Scale Integration of Rechargeable Zinc-air Batteries. *Energy Environ. Sci.* 2016, 9, 663-670.
[50] J. Fu et al., Flexible rechargeable Zinc-air batteries through morphological emulation of human hair array. *Adv. Mater.* 28, 6421-6428 (2016).
[51] C. Lin et al., Solid-state rechargeable Zinc-air battery with long shelf life based on nanoengineered polymer electrolyte. *ChemSusChem.* 11, 3215-3224 (2018).
[52] A. Sumboja et al., All-solid-state, foldable, and rechargeable Zn-air batteries based on manganese oxide grown on graphene-coated carbon cloth air cathode. *Adv. Energy Mater.* 7, 1700927 (2017).
[53] C. Guan et al., Decorating Co/CoNx nanoparticles in nitrogen-doped carbon nanoarrays for flexible and rechargeable zinc-air batteries. *Energy Storage Mater.* 16, 243-250 (2019).
[54] S. S. Shinde, H. Lee, J. Jung, N. K. Wagh, J. Lee, Unveiling dual-linkage 3D hexaiminobenzene metal-organic frameworks towards long-lasting advanced reversible Zn-air batteries. *Energy Environ. Sci.* 12, 727-738 (2019).
[55] S. S. Shinde et al., Hierarchically designed 3D holey C$_2$N aerogels as bifunctional oxygen electrodes for flexible and rechargeable Zn-air batteries. *ACS Nano.* 12, 596-608 (2018).

Figures 38A, 38B, 38C, 38D, 38E, 38F, 38G, 38H, 38I:
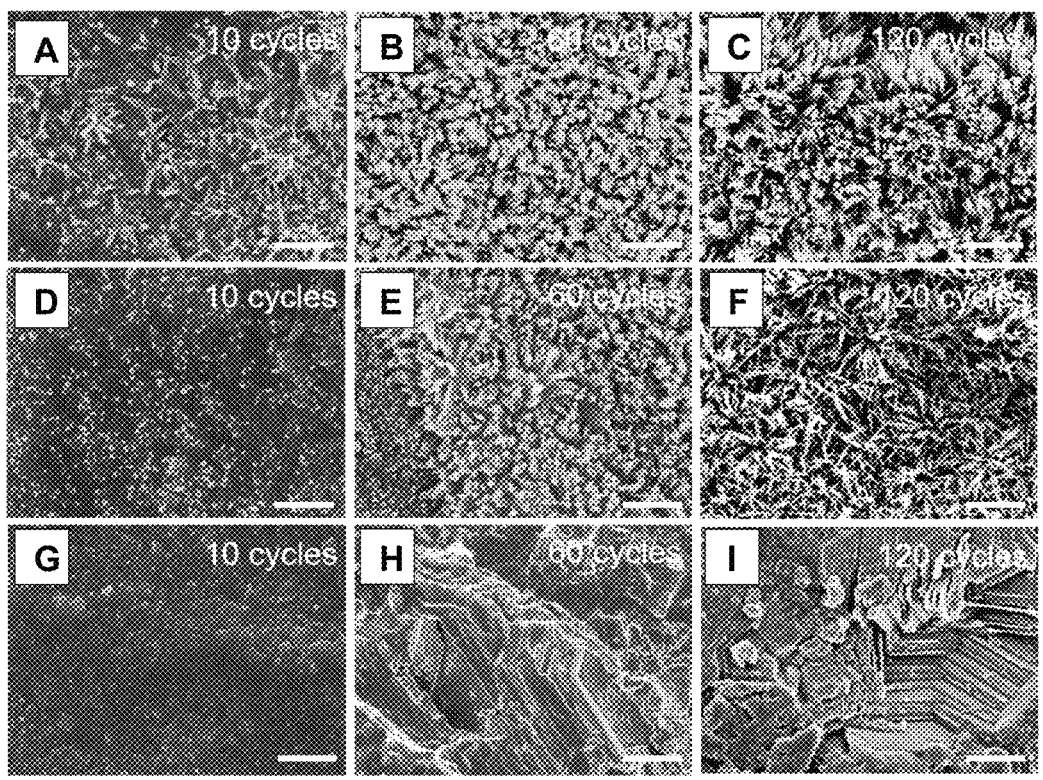

Multiple materials performance parameters of QAFPVA/ANFs composites prepared in accordance with the present disclosure are responsible for the excellent electrochemistry performance of the zinc-air rechargeable batteries. In addition to the decrease of delamination, QAFPVA/ANFs also effectively suppress dendrite growth. To test this hypothesis, SEM images of the zinc electrodes are compared with different separator-based batteries before and after cycling. The uniformly distributed needle-like crystals of zinc and zinc oxide identified with XRD analysis emerge as cycling increased on the electrode in contact with PVA (FIGS. 38A-38C) and QAFPVA (FIGS. 38D-38F). On the contrary, a smooth and flat zinc electrode surface is observed when paired with QAFPVA/ANFs (FIGS. 38G-38I). The drastic difference in SEM image demonstrates the advantages of QAFPVA/ANFs separator for dendrite suppression to keep battery stability.

Figures 39A, 39B, 39C, 39D, 39E:
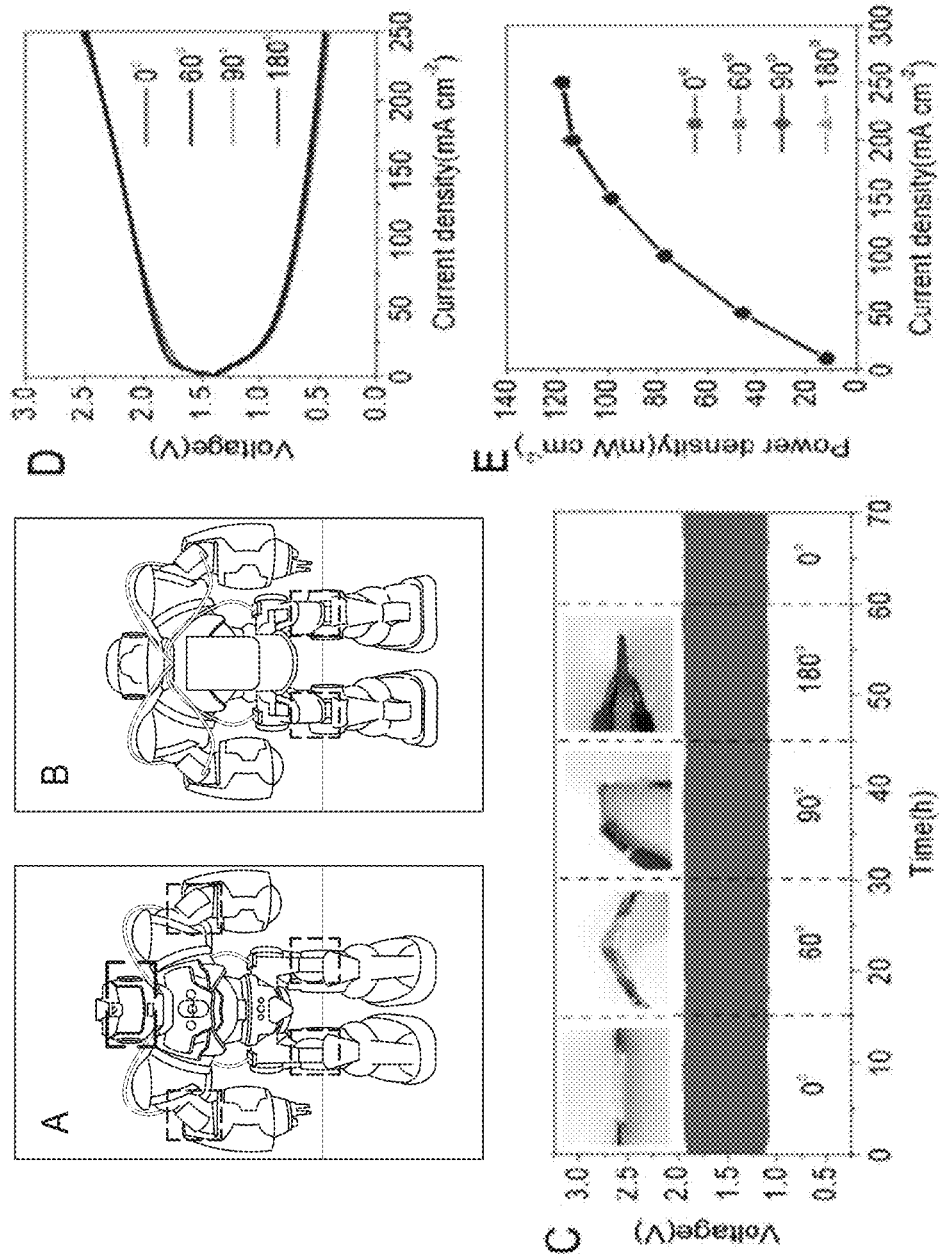

According to FIG. 35C, the discharge capacity of zinc-air is 624.3 mAh g$^{-1}_{Zn}$ (around 83.5 mAh cm$^{-2}$ based on the area of the carbon cloth 2.5 cm×3.0 cm) at a current density 5 mAcm$^{-2}$. If the structural batteries are used to cover an entire robot, as shown in FIGS. 39A-39B, the electricity generated is around from 27.8 Ah to 55.0 Ah in comparison to the parameter of original Li battery (3.7V, 2.22 Wh, the electricity is 2.22/3.7=0.6 Ah). See Table 11. Hence, it is estimated that the total electricity of the structural batteries replacing the protective covers will be 170-340 times higher than the current stand-alone Li-ion battery

TABLE 11

Summary of the surface area of the robot with different part of robot

| | $S_{body}$ (cm$^2$) | $S_{legs}$ (cm$^2$) | $S_{arms}$ (cm$^2$) | $S_{total}$ (cm$^2$) | Electricity (Ah) |
|---|---|---|---|---|---|
| Minimum | 341.8 | 568.7 | 328.8 | 1239.3 | 103.4 |
| Maximum | 526.4 | 1166.0 | 762.2 | 2454.6 | 205.0 |

The assembled battery is deformation tolerant (FIGS. 39A-39B and 40A-40C) which enable biomorphic design of the entire cells that complements biomimetic design of the membrane material. A zinc-air battery with QAFPVA/ANFs electrolyte was tested under various bending conditions from 0° to 180° angles. At any given shape and bending angle, the charge-discharge cycling curves of the battery almost remained virtually unchanged and showed no significant polarizations even after 70 h of cycling (FIG. 39C). The stability of the voltage, charge-discharge polarization curves, power density and ion conducting for different bend angles (FIGS. 39D-39E and FIGS. 40-41) also confirms that stable ion transport and output power is not restricted under stressed conditions, due to the robustness and flexibility of the electrolyte membrane. The total capacity of the structural biomorphic batteries replacing the protective covers of the robot will be 170-340 times higher than the current stand-alone Li-ion battery. Such structural batteries open the possibility to reduce the weight and increase operational time in the new generation of robotic devices.

Example 3

FIG. 43 is a photograph of a wearable electronic watch device, an Apple Watch™ that is modified to have three structural batteries prepared in accordance with certain aspects of the present disclosure. As shown in the schematic, the smart watch band is replaced with three lightweight structural batteries that are connected to the device's built-in battery to extend the total battery life. Each structural battery provides 1.26V, which cumulatively adds 3.78V, to the battery's energy storage capabilities, thus extending the battery life of the smart watch.

Successful realization for high-energy batteries, such as zinc-air batteries requires development of a new class of ion-conductors that can display high mechanical, ion-transport, and solvation-expansion characteristics, simultaneously, that were so far difficult to design and produce. However, the present disclosure provides composite solid electrolyte membranes that combine optimally high mechanical strength, toughness, stiffness, ionic conductivity, and electrolyte retention.

The cartilage-like nanofiber network design of PZB composites prepared in accordance with certain aspects of the present disclosure results in a combination of a fast ion transport and high mechanical properties. Hence, PZB and similar materials can serve as solid electrolytes/membranes that support reasonable discharge rate combined with effective dendrite suppression. Their structural design offers a pathway towards the solid-state electrolytes for other multivalent ions, such as $Mg^{2+}$ or $Al^{3+}$ needed for energy technologies. The ability of the Zn batteries with composite electrolytes, such as PZB-931 electrolyte, to plastically deform and remain functional differentiates them from other promising charge storage devices, including electrochemical capacitors and supercapacitors that can withstand predominantly elastic deformations in bending. This unusual property for charge storage devices originates from (1) plasticity and inflammability of Zn anodes and (2) re-configurability of the fibrous cartilage-like network.

In certain variations, these ion-conducting membranes can be utilized as state-of-the-art hydroxide-transporting electrolyte for flexible, rechargeable zinc-air batteries. For example, where the composite comprises a QAFPVA/ANFs electrolyte, the nanoscale architecture enables the development of safe solid-state electrochemical energy storage systems for a wide variety of devices with distributed charge storage enabling reduced both higher performance, greater reliability and reduced weight.

From a practical standpoint, battery plasticity translates into marked increase of the battery safety and impact resistance. Plastic deformability makes it possible to stamp the batteries into a variety of shapes, including ones that have complex convex-concave topography for load-bearing applications, such as corrugated structures leading to a large family of structural batteries. The lightness and deformability of battery cells prepared in accordance with certain aspects of the present disclosure enables them to successfully serve as a load bearing and charge storage elements in several commercial UAVs. These composite electrolytes can provide the next generation of distributed energy storage in transport and other applications of structural batteries.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A composite solid electrolyte comprising:
   a plurality of branched nanofibers comprising an aromatic polyamide polymer; and an ionically conductive polymer, wherein the composite solid electrolyte has an ionic conductivity of greater than or equal to about 1 mS/cm.

2. The composite solid electrolyte of claim 1, wherein the composite solid electrolyte has an ionic conductivity of greater than or equal to about 55 mS/cm.

3. The composite solid electrolyte of claim 1 wherein the plurality of branched nanofibers have an average diameter of greater than or equal to about 25 nm to less than or equal to about 300 nm.

4. The composite solid electrolyte of claim 1 comprising a plurality of pores with an average pore size diameter of less than or equal to about 50 nm.

5. The composite solid electrolyte of claim 1 having an ion exchange capacity (IEC) of greater than or equal to about 2.9 mmol $g^{-1}$ and an ion concentration of greater than or equal to about 1 mmol $cm^{-3}$.

6. The composite solid electrolyte of claim 1 having a Young's modulus of less than or equal to about 6.5 GPa and an ultimate tensile strength of greater than or equal to about 110 MPa.

7. The composite solid electrolyte of claim 1, further comprising a divalent ion salt.

8. The composite solid electrolyte of claim 7, wherein the divalent ion salt comprises zinc trifluoromethanesulfonate $Zn(CF_3SO_3)_2$ and a ratio of the ionically conductive polymer to the divalent ion salt to the plurality of nanofibers is about 9:3:1.

9. The composite solid electrolyte of claim 1, wherein the ionically conductive polymer comprises poly(ethylene oxide) or quaternary ammonia functionalized polyvinyl alcohol (QAFPVA).

10. The composite solid electrolyte of claim 1, wherein the ionically conductive polymer is present at greater than or equal to about 15 weight % to less than or equal to about 95 weight % in the composite solid electrolyte and the plurality of branched nanofibers is present at greater than or equal to about 1 weight % to less than or equal to about 60 weight % of the composite solid electrolyte.

11. An electrochemical cell comprising:
a negative electrode comprising zinc; a positive electrode; and
a composite solid electrolyte comprising:
a plurality of branched nanofibers comprising an aromatic polyamide polymer; and
an ionically conductive polymer, wherein the composite solid electrolyte is disposed between the negative electrode and the positive electrode and has an ionic conductivity of greater than or equal to about 1 mS/cm.

12. The electrochemical cell of claim 11, wherein the composite solid electrolyte has an ionic conductivity of greater than or equal to about 55 mS/cm.

13. The electrochemical cell of claim 11, wherein the ionically conductive polymer comprises poly(ethylene oxide) or quaternary ammonia functionalized polyvinyl alcohol (QAFPVA).

14. The electrochemical cell of claim 11, wherein the composite solid electrolyte further comprises zinc trifluoromethanesulfonate $Zn(CF_3SO_3)_2$.

15. The electrochemical cell of claim 11, further comprising a divalent ion salt, wherein a ratio of the ionically conductive polymer to the divalent ion salt to the plurality of branched nanofibers is about 9:3:1.

16. The electrochemical cell of claim 11, wherein the positive electrode comprises manganese dioxide ($MnO_2$) and the electrochemical cell is a zinc-manganese dioxide battery.

17. The electrochemical cell of claim 11, wherein the positive electrode is an air electrode comprising at least one catalyst and the electrochemical cell is a zinc-air battery.

18. The electrochemical cell of claim 11, wherein the electrochemical cell is rechargeable and is capable of reversibly cycling zinc ions between the positive electrode and the negative electrode.

19. A corrugated solid-state electrochemical cell comprising: a negative electrode comprising zinc;
a positive electrode; and
a flexible composite solid electrolyte comprising:
a plurality of branched nanofibers comprising an aromatic polyamide polymer; and
an ionically conductive polymer, wherein the composite solid electrolyte is disposed between the negative electrode and the positive electrode and has an ionic conductivity of greater than or equal to about 1 mS/cm, wherein the negative electrode, the positive electrode, the composite solid electrolyte together define at least one protruding region and at least one recessed region.

20. The corrugated solid-state electrochemical cell of claim 19, wherein the corrugated solid-state electrochemical cell comprises a plurality of protruding regions and a plurality of recessed regions that define a corrugated pattern so that the corrugated solid-state electrochemical cell is load-bearing.

21. A composite solid electrolyte comprising:
a plurality of branched nanofibers comprising an aromatic polyamide polymer; and an ionically conductive polymer, wherein the composite solid electrolyte has an ionic conductivity of greater than or equal to about 0.001 mS/cm and an ion exchange capacity (IEC) of greater than or equal to about 2.9 mmol $g^{-1}$ and an ion concentration of greater than or equal to about 1 mmol $cm^{-3}$.

* * * * *